United States Patent
Laubach

(10) Patent No.: US 10,228,833 B2
(45) Date of Patent: Mar. 12, 2019

(54) INPUT DEVICE USER INTERFACE ENHANCEMENTS

(71) Applicant: Intellitact LLC, Beverly Hills, CA (US)

(72) Inventor: Kevin Laubach, Beverly Hills, CA (US)

(73) Assignee: Intellitact LLC, Beverly Hills, CA (US)

( * ) Notice: Subject to any disclaimer, the term of this patent is extended or adjusted under 35 U.S.C. 154(b) by 541 days.

(21) Appl. No.: 14/949,836

(22) Filed: Nov. 23, 2015

(65) Prior Publication Data

US 2016/0077721 A1    Mar. 17, 2016

Related U.S. Application Data

(63) Continuation of application No. 13/423,270, filed on Mar. 18, 2012, now Pat. No. 9,195,321.

(Continued)

(51) Int. Cl.
| | |
|---|---|
| *G06F 3/0484* | (2013.01) |
| *G06F 3/033* | (2013.01) |
| *G09G 5/08* | (2006.01) |
| *G06F 3/0489* | (2013.01) |
| *G06F 3/02* | (2006.01) |

(Continued)

(52) U.S. Cl.
CPC .......... *G06F 3/04845* (2013.01); *G06F 3/023* (2013.01); *G06F 3/0213* (2013.01); *G06F 3/033* (2013.01); *G06F 3/0485* (2013.01); *G06F 3/04812* (2013.01); *G06F 3/04883* (2013.01); *G06F 3/04886* (2013.01); *G06F 3/04895* (2013.01); *G06F 3/04897* (2013.01); *G06F 21/31* (2013.01); *G09G 5/08* (2013.01)

(58) Field of Classification Search
CPC .... G06F 3/04845; G06F 3/0213; G06F 3/023; G06F 3/033; G06F 3/04812; G06F 3/0485; G06F 3/04883; G06F 3/04886; G06F 3/04895; G06F 3/04897; G06F 21/31; G09G 5/08
USPC ........................................................ 345/163
See application file for complete search history.

(56) References Cited

U.S. PATENT DOCUMENTS

| | | |
|---|---|---|
| 8,325,151 B1 | 12/2012 | Chan et al. |
| 2006/0187216 A1 | 8/2006 | Trent et al. |

(Continued)

OTHER PUBLICATIONS

International Search Report and Written Opinion for PCT/US12/29593, dated Jun. 13, 2012, 6 pages.

*Primary Examiner* — Fred Tzeng
(74) *Attorney, Agent, or Firm* — Ansari Katiraei LLP; Arman Katiraei; Sadiq Ansari

(57) ABSTRACT

Some embodiments provide a device, method, system, computer program product and user interface for pointer movement analysis with modal continuous controller conversion. Specifically, some embodiments adapt movements issued from a mouse input device, trackpad, or touchscreen to adjust a position of a UI element. Some embodiments analyze a first set of movements and adapt a subsequent second set of movements to adjust the position of the UI element within a range of UI element positions when the first set of movements satisfies a movement threshold. The movement threshold includes a spiral pattern. In some embodiments, adjusting the position of the UI element includes performing scrolling within a scroll area based on the second set of movements when the first set of movements satisfies the spiral pattern.

19 Claims, 48 Drawing Sheets

Related U.S. Application Data

(60) Provisional application No. 61/465,345, filed on Mar. 17, 2011, provisional application No. 61/465,308, filed on Mar. 17, 2011, provisional application No. 61/465,309, filed on Mar. 17, 2011, provisional application No. 61/493,525, filed on Jun. 6, 2011.

(51) Int. Cl.
  *G06F 3/023*  (2006.01)
  *G06F 3/0485*  (2013.01)
  *G06F 3/0488*  (2013.01)
  *G06F 21/31*  (2013.01)
  *G06F 3/0481*  (2013.01)

(56) References Cited

U.S. PATENT DOCUMENTS

| | | |
|---|---|---|
| 2007/0236475 A1 | 10/2007 | Wherry |
| 2009/0102817 A1 | 4/2009 | Bathiche et al. |
| 2010/0211920 A1 | 8/2010 | Westerman et al. |
| 2010/0309147 A1 | 12/2010 | Fleizach et al. |

INPUT DEVICE USER INTERFACE ENHANCEMENTS

CLAIM OF BENEFIT TO RELATED APPLICATIONS

This application is a continuation of U.S. non-provisional application Ser. No. 13/423,270, entitled "Input Device User Interface Enhancements", filed Mar. 18, 2012 which claims the benefit of U.S. provisional application 61/465,345, entitled "Input Device User Interface Enhancements", filed Mar. 17, 2011, U.S. provisional patent application 61/465,308, entitled "Keyboard Enhanced Interface", filed Mar. 17, 2011, U.S. provisional application 61/493,525, entitled "Keyboard with Integrated Trackpad Functionality", filed Jun. 6, 2011, and U.S. provisional application 61/465,309, entitled "Touch Enhanced Interface", filed Mar. 17, 2011. The contents of applications Ser. No. 13/423,270, 61/465,345, 61/465,308, 61/493,525, and 61/465,309 are hereby incorporated by reference.

TECHNICAL FIELD

The present invention generally relates to software and hardware user interface enhancements for input devices on computer systems and electronic devices.

BACKGROUND ART

The keyboard is an integral component to many computer systems and remains the primary means to insert (type) text. In the many years since its introduction, the keyboard has had some evolution such as the introduction of function keys, numeric keypads, and navigation keys. Nevertheless, these evolutionary enhancements have failed to overcome the keyboard's inability to efficiently navigate a graphical user interface (GUI) and invoke output actions therein. As a result, the keyboard remains relegated substantially to text insertion. Other input devices, such as the mouse, trackpad or touchscreen, are typically used to navigate the GUI and invoke output actions such as launching an application or playing a music file.

Though useful in navigating the GUI and invoking the output actions, the mouse and touchscreen input devices are unable to leverage many of the advantages inherent in the use of the keyboard. Firstly, the mouse and touchscreen input devices are spatially dependent whereas the keyboard is a discrete input device. This spatial dependence limits the speed by which an output action is invoked. Specifically, to invoke an output action with the mouse, a user first identifies a current (random) location of the mouse pointer on-screen. Next, the user identifies a path to an on-screen user interface (UI) element that invokes the desired output action. The user moves the mouse pointer from its existing location to the UI element where a click or double click of a mouse button invokes the output action. With a touchscreen interface, the user avoids the former step, but still performs the spatial identification of the UI element before moving the hand and fingers to invoke the output action with a touch gesture.

The speed by which a user can invoke the output action using the mouse or touchscreen input device is further limited when the UI element is obscured by the three dimensional nature of the GUI. For example, UI elements may be layered atop one another or hidden behind windows. Furthermore, the desired UI element may reside within various menu layers, graphical ribbons, folders, etc., that require the user to memorize and navigate through an object hierarchy before arriving at the desired UI element.

The spatial dependence of these input devices also requires the user to develop fine motor skills A mouse click or touchscreen gesture does not invoke an output action unless the mouse click/drag or the touchscreen gesture occurs within a specifically defined region of the UI element that invokes the output action, which may be quite small. Conversely, the discrete inputs of the keyboard may be used to invoke an output action using a particular key press combination. However, these key press combinations (using "flag" keys such as command, option, control, shift, function, alt, etc.) are difficult to remember and inconsistent across different applications and different output actions. For this reason, the discrete input capabilities of the keyboard have not been fully realized in the context of navigating the GUI and invoking output actions.

Secondly, the mouse and touchscreen input devices are unable to leverage muscle memory because of their spatial dependency. Each time a particular output action is to be invoked using the mouse, the user identifies the position of the UI element that invokes the particular output action and the user moves the mouse pointer to the UI element before being able to invoke the particular output action. Conversely, the keyboard is driven by muscle memory. Through sufficient repetition, users automatically recreate a set of actions without conscious effort. The greater the amount of repetition, the faster the user is able to recreate an action. For example, after a sufficient number of iterations, the commands for undo (e.g., ctrl-z or command-z) and cutting text (e.g., ctrl-x or command-x) become ingrained in the user's muscle memory. However, the muscle memory capabilities of the user have been relegated to a select number of output actions due to the sheer number of key combinations and inconsistencies in key combinations between different applications.

Thirdly, alternating between multiple input devices (i.e., the mouse and touchscreen input devices for navigation and the keyboard for text insertion) introduces another layer of spatial dependency. The physical movement of the hand between the mouse/touchscreen input device and the keyboard introduces delay when switching between GUI navigation and text insertion. This delay is further exacerbated when moving away from or back to the keyboard as the user loses and must reorient the user's hand to the precise home position on the keyboard.

Accordingly, there is a need to enhance software and hardware to better leverage the existing input devices that are used to interface with a computer system. There is a need to adapt the advantages of the keyboard to GUI navigation and output action invocation. There is also a need to enhance mouse and touchscreen functionality to improve GUI navigation and output action invocation.

SUMMARY OF THE INVENTION

It is an object of the present invention to define devices, methods, systems, computer software products and user interfaces that increase the efficacy, expressivity, and enjoyment in the use of input devices for computer systems and electronic devices. A further object of the present invention is to seamlessly integrate a Keyboard Enhanced Interface (KEI) system with the devices and interfaces of the present invention. A further object of the present invention is to seamlessly integrate a Touch Enhanced Interface (TEI) system with the devices and interfaces of the present invention.

To achieve the objects and in accordance with the purpose of the invention, as embodied and broadly described herein, some embodiments provide a device, method, system, computer program product and user interface that provides a Keyboard Enhanced Interface (KEI) system that adapts keys of a key-based input device for direct output action invocation. In some embodiments, the KEI system includes a KEI engine, a KEI database, and an optional KEI viewer.

The KEI engine analyzes incoming events, the state of various system parameters, and previous user activity to generate enhanced events that are passed to the KEI database. The enhanced events are used within a computer system or electronic device to facilitate the invocation of output actions through direct means. Specifically, the KEI database identifies which output actions are invoked based on one or more enhanced events and system state information it receives. The database also identifies different symbols and widgets for the KEI viewer to display. The KEI viewer provides a dynamic visual reference of the output actions that may be invoked using keys of a key-based input device at any point in time.

To generate the enhanced events, the KEI engine intercepts events that have been generated by the system software of the device. These events encapsulate various user actions that are performed using a key-based input device such as a keyboard or other input devices such as a mouse, trackpad, touchscreen, stylus, etc.

The KEI engine categorizes the intercepted events by (i) detecting each keyboard key press separately from each keyboard key release and (ii) monitoring the order and timing with which the keyboard keys are pressed and released. The KEI engine analyzes the categorized events with various system state information. The KEI engine monitors system state information such as changes to the frontmost application, the key focus of the frontmost application, and whether a set of characters is selected in a text field of the frontmost application. Based on the categorization of the events and the analysis, the KEI engine enters one of several operational modes. The KEI engine then generates enhanced events according to the active operational mode and the intercepted events.

The enhanced events are used to invoke different output actions from the KEI database. Specifically, the enhanced events may be used to (1) perform text insertion, (2) invoke output actions that manipulate characters that are selected, (3) invoke application specific output actions for the frontmost application, and (4) invoke output actions for any non-frontmost application or process.

The KEI viewer displays a set of graphical keys. In some embodiments, the graphical keys correspond to the keys of the key-based input device. Displayed over some or all of the graphical keys are various symbols and widgets that are identified in the database by the enhanced events and system state information. Each symbol represents an output action that may be invoked using a key of the key-based input device that corresponds to the graphical key over which the symbol is displayed. In some embodiments, a widget includes one or more interactive elements that perform one or more output actions. The interactive elements of the widget can be manipulated using one or more keys that correspond to the one or more graphical keys over which the widget is displayed. In some embodiments, a widget provides status information about an application or an application element.

In some embodiments, the KEI viewer color codes the graphical keys over which symbols and widgets are displayed. This color coding better identifies which keys invoke which output actions when a particular operational mode is active. In some embodiments, different groups of graphical keys are colored differently to identify related output actions. For example, a first set of graphical keys are colored with a first color to identify global output actions and a second set of graphical keys are colored with a second color to identify application specific output actions.

Some embodiments provide an enhanced key-based input device with a set of illuminable keys. In some embodiments, the keys illuminate in conjunction with or independent of the color-coded graphical keys of the KEI viewer. In this manner, the key-based input device provides a direct visual reference as to which keys invoke output actions when a particular operational mode is active.

When used in conjunction with the KEI viewer, the illuminated keys provide a visual association to the color-coded graphical keys of the KEI viewer. This visual association allows a user to more readily identify the particular output action that may be invoked by a particular illuminated key of the enhanced key-based input device. The illuminated keys further assist in orienting user finger placement relative to the color-coded graphical keys of the KEI viewer.

Some embodiments provide a set of position indicators that are displayed over the graphical keys of the KEI viewer. The set of position indicators graphically mirror on the KEI viewer the user's finger placement and movement on the key-based input device. The mirroring allows a user to visualize the user's finger positioning relative to the symbols and widgets that are displayed over the graphical keys of the KEI viewer. In some embodiments, the mirroring of the set of position indicators is interpolated based on detected key presses and key releases.

Some embodiments provide an enhanced key-based input device with touch sensitive keys wherein finger contact can be detected even when the key is not depressed. In some such embodiments, the touch sensitive keys are used by the KEI viewer to directly mirror user finger placement and movement over the graphical keys of the KEI viewer via the set of position indicators.

Some embodiments adapt the touch sensitive keys to modify UI elements such as graphical sliders, scroll bars, and other incremental selection elements. In some embodiments, the UI elements include widgets that are displayed over the graphical keys of the KEI viewer. In some such embodiments, a user's touch and/or press that is applied over a particular touch sensitive key modifies the widget that is displayed over the graphical key that corresponds to the particular touch sensitive key.

In some embodiments, the touch sensitive keys can be used to issue a variety of touch gestures which may be specified within the operating system (OS). The touch gestures may include drag, expand, contract, rotate, and swipe as some examples. Applications can invoke different output actions in response to the various touch gestures that are issued over the touch sensitive keys.

Some embodiments adapt the touch sensitive keys to emulate the operation of a trackpad in performing GUI navigation. Specifically, movement of one or more fingers over one or more of the touch sensitive keys translates to on-screen pointer movements. In some embodiments, the trackpad emulation is used in conjunction with the KEI system such that the user's hands no longer leave the keys of the enhanced key-based input device when performing on-screen pointer movements, invoking output actions, and performing text insertion.

Some embodiments provide an enhanced key-based input device that includes a pressure sensitive layer beneath the keys. The pressure sensitive layer identifies and issues pressure values when one or more keys are held down and downward force is applied over one or more of the keys. The pressure value may be used in a variety of operations, such as adjusting the frequency with which key repeats are issued.

Some embodiments provide an enhanced key-based input device with a trackpad or touchscreen at the center. In this configuration, the keys are ergonomically positioned such that the user's hands are not placed directly adjacent to one another. Additionally, the user can perform GUI navigation with either hand while the other hand remains over the keys in order to perform text insertion, invoke output actions using the KEI system functionality, or modify the trackpad or touchscreen operation. In some embodiments, the center position may accommodate a dockable device such as an iPad Touch or iPhone in addition to or instead of a trackpad or touchscreen device.

Some embodiments enhance touchscreen input interfaces by repositioning graphical keys of a graphical keyboard according to finger positioning on a touchscreen. In some embodiments, the graphical keys are adapted in size to the user's hands and the distance between them. The graphical keys are adapted to the user's hands based on a detected geometry of the user's finger placement. When combined with the KEI system functionality, users can invoke output actions directly using the graphical keys. Moreover, the KEI viewer integrates with the graphical keyboard to provide the visual reference for which graphical keys invoke which output actions. Specifically, the KEI viewer displays the symbols and widgets that identify the output actions directly over the graphical keys of the graphical keyboard.

Some embodiments provide enhancements to the mouse input device, trackpad, and touchscreen input interface. One such enhancement activates scrolling within an application window using spiral or circular movements, without the need for any additional clicking, touching or gestures. The spiral or circular movements can be used to perform continuous scrolling within the application and the scroll speed is adjustable by varying the diameter of the spiral or circular movements.

Some embodiments provide an enhancement to the mouse input device and trackpad that causes the on-screen pointer to increase and decrease in size in response to movements. Such functionality allows a user to better identify the pointer location on-screen when the pointer is in motion, and shrink it to normal size after movement ceases.

BRIEF DESCRIPTION OF THE DRAWINGS

In order to achieve a better understanding of the nature of the present invention, a preferred embodiment of the input device user interface enhancements will now be described, by way of example only, with reference to the accompanying drawings in which.

DETAILED DESCRIPTION

In the following detailed description, numerous details, examples, and embodiments of the input device user interface enhancements are set forth and described. As one skilled in the art would understand in light of the present description, the input device user interface enhancements are not limited to the embodiments set forth, and the input device user interface enhancements may be practiced without some of the specific details and examples discussed. Also, reference is made to accompanying figures, which illustrate specific embodiments in which the invention can be practiced. It is to be understood that other embodiments can be used and structural changes can be made without departing from the scope of the embodiments of this invention.

The term "keyboard" as used in the description, figures, and embodiments presented herein is meant to include any key-based input device. Some such key-based input devices include a keyboard apparatus with a plurality of keys and virtual touchscreen keyboards with any number of keys that are arranged in a standard "qwerty" layout, other standard layouts (e.g., "azerty" layout), and other nonstandard layouts. In the figures accompanying this document, the keyboard and the KEI viewer are presented with the standard "qwerty" layout.

Some embodiments provide input device user interface enhancements. These enhancements include software enhancements and hardware enhancements.

I. Software Enhancements

Figure 1:
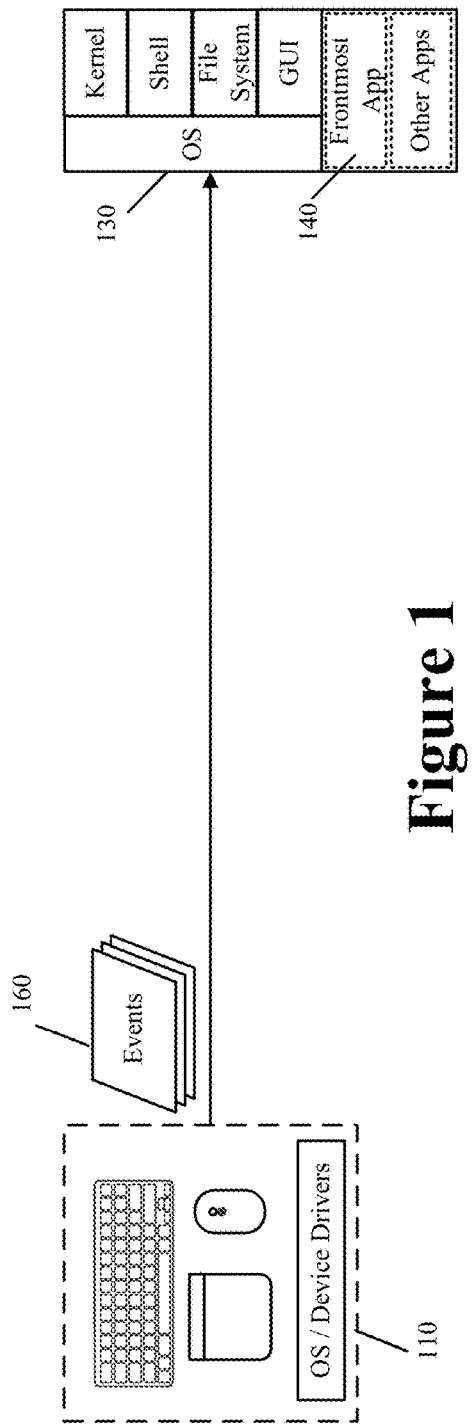
FIG. 1 illustrates functionality of a typical computer system or electronic device.
Figure 2:
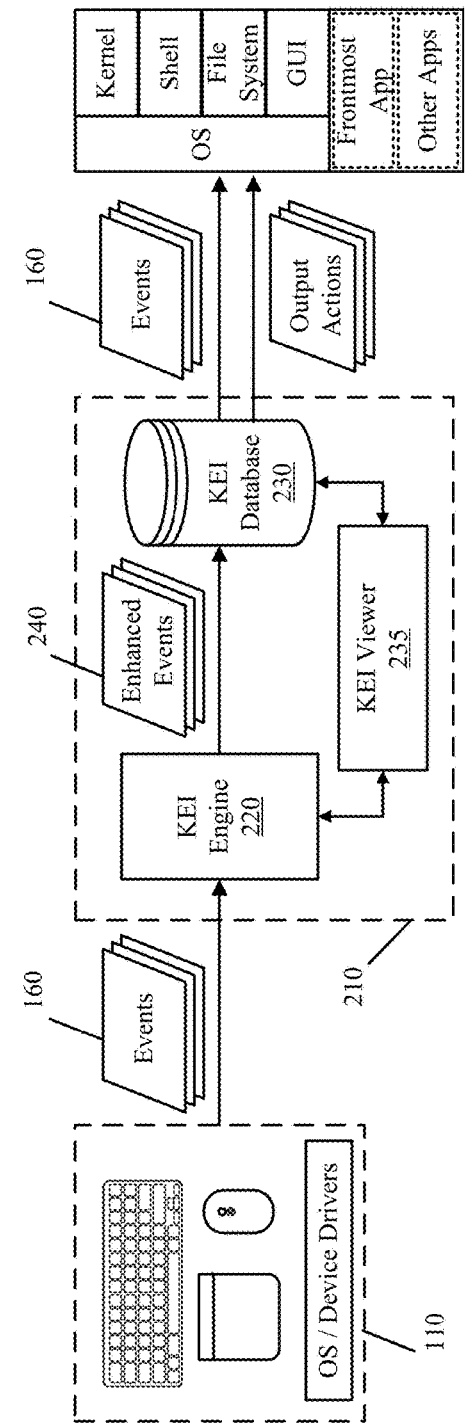
FIG. 2 illustrates enhancing the computer system or electronic device functionality with software enhancements of some embodiments.

FIG. 1 illustrates functionality of a typical computer system or electronic device. FIG. 2 illustrates enhancing the computer system or electronic device functionality with software enhancements of some embodiments.

As shown, FIG. 1 includes devices and device drivers 110, OS 130, and frontmost application 140. The devices 110 include a keyboard, mouse, trackpad, keypad, touchscreen tablet, pen based tablet, motion sensors, remote controls, and other devices or interfaces for providing inputs to the computer system or electronic device. User actions that are performed using the devices 110 are converted to events 160 within the computer system or electronic device. These events 160 are generated by various system software that is associated with the devices 110. The system software may include functional components of the OS or device drivers that are associated with the devices 110 as some examples. The OS 130 may also include a window server that dispatches events to appropriate targets (e.g., the frontmost application 140) within the computer system or electronic device. When the window server passes the events 160 to the frontmost application 140, an application event handler of the frontmost application 140 may invoke zero or more application output actions based on the events 160.

In many such computer systems or electronic devices, the events 160 are primarily used to invoke output actions through indirect means. Specifically, the events 160 are issued as a result of user actions that are performed relative to on-screen UI elements instead of the output actions directly. The on-screen UI elements provide graphical representations from which users access the output actions. For example, the user clicks on an on-screen UI element such as a menu item in order to invoke an output action that is associated with the UI element.

Keyboard key presses are user actions that also generate events. In many cases, the keyboard events are ignored by the OS or application event handlers unless (i) a text field of a frontmost application has key focus and a visible text insertion vertical bar, in which case the keyboard events are used to insert characters (type text) or (ii) the keyboard events specify a shortcut key or combination that includes various "flag" keys (e.g., ctrl, alt, command, option, shift, etc.). Keyboard events that specify a shortcut key combination are used in some instances to invoke output actions through direct means. For example, when a key press is combined with a press or hold of a flag key, the key press combination specifies a keyboard shortcut for directly invoking an output action (e.g., ctrl-X or command-X to cut a set of characters that is selected). However, most users are unaware of the vast majority of these key press combinations, or do not use the shortcuts because of the inconsistency between applications (e.g., ctrl-B in a web browser application opens a bookmarks window while ctrl-B in a text editing application bolds a set of characters that is selected). A further obstacle that prevents users from using such keyboard shortcuts is the sheer number of shortcuts and the need to memorize the shortcut key combinations in order to effectively use them.

In some embodiments, invoking an output action includes, for example, launching an application, opening a file (e.g., documents, images, videos, audio files, etc.), accessing folders, adjusting a widget, executing scripts, issuing calls to one or more application programming interfaces (APIs) or libraries, and performing other OS, UI, or application operations. In some embodiments, invoking an output action further includes invoking output actions that are associated with UI elements of various applications, windows, views, toolbars, etc. Such UI elements may include any graphical interactive element whose output action can be invoked by clicking or otherwise manipulating the UI element with a mouse pointer or touch when it is displayed on-screen. Some UI elements also accept text insertion A. KEI System FIG. 2 illustrates software enhancements of some embodiments that enhance the functionality of the computer system or electronic device of FIG. 1. The software enhancements include Keyboard Enhanced Interface (KEI) system 210.

In some embodiments, the KEI system 210 is integrated as part of the OS and in some embodiments, the KEI system 210 runs as an application under the OS. The KEI system 210 may be implemented to run on any existing OS (e.g., Apple® OSX, Microsoft Windows®, Linux, etc.). As shown, the KEI system 210 includes KEI engine 220, KEI database 230, and an optional KEI viewer 235. The KEI viewer 235 is described below with reference to FIG. 4.

i. KEI Engine

The KEI engine 220 intercepts events before they pass to the window server or frontmost application event handler. The KEI engine 220 adapts keyboard generated events for the direct invocation of output actions. Specifically, based on the intercepted events and/or system state information, the KEI engine 220 generates enhanced events 240. As will be discussed below, the system state information includes identifying the frontmost application, the key focus of the frontmost application, and whether text is selected in a text field of the frontmost application as some examples. System state information may also include identifying which screen of a multiple screen display or which computer of a multiple computer system has focus.

The enhanced events 240 are passed to the KEI database 230. Based on the enhanced events and/or system state information, the KEI database 230 identifies different output actions that are then directly invoked. In some embodiments, the KEI system 210 may pass existing events 160 to the frontmost application, or the KEI system 210 may create analogous events which are passed to the OS or application event handlers for processing. This may occur in response to enhanced events 240 that do not identify output actions from the KEI database 230.

Figure 3:
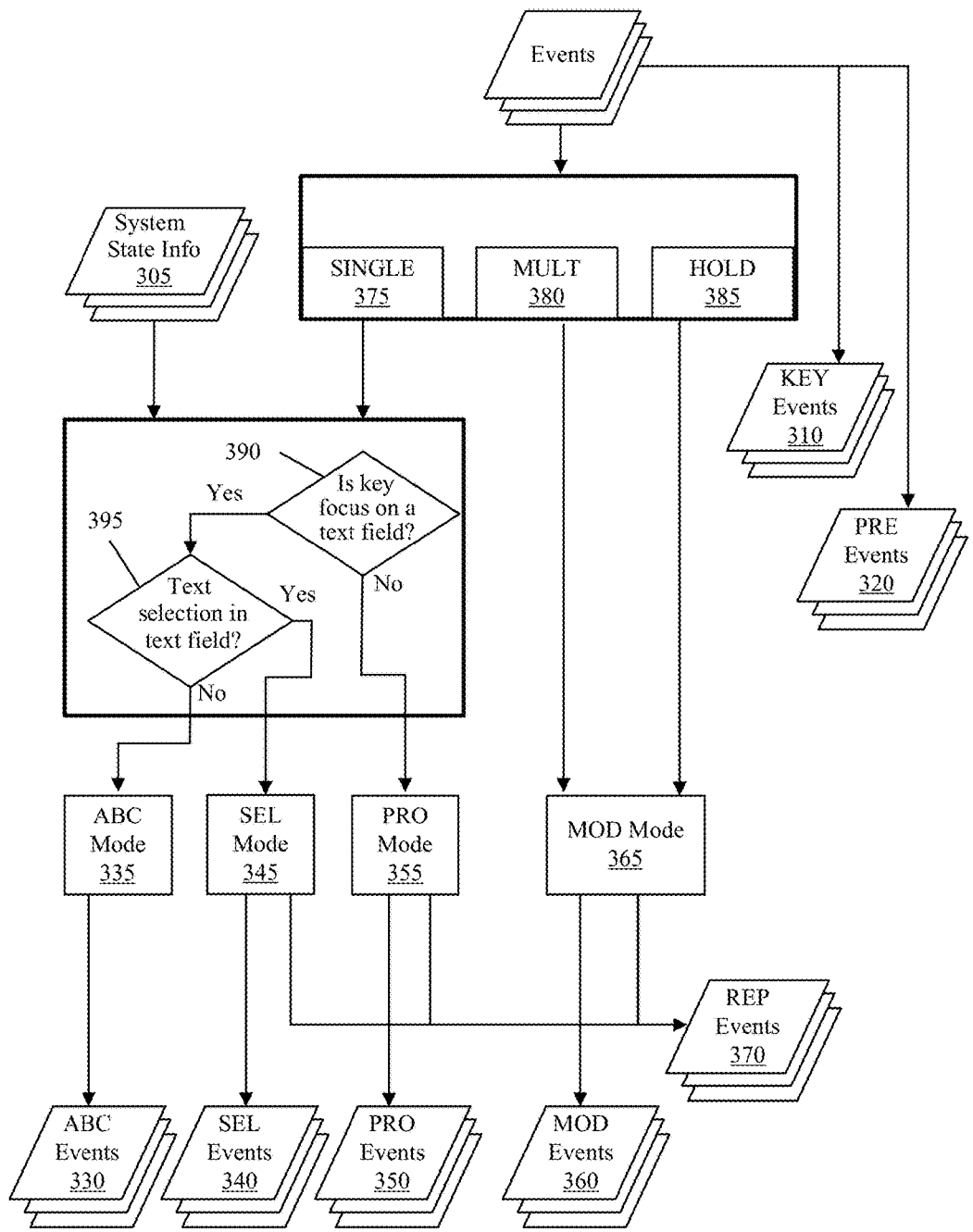
FIG. 3 presents a diagram for generating enhanced events in accordance with some embodiments.

FIG. 3 presents a diagram for generating enhanced events in accordance with some embodiments. The figure includes KEY 310, PRE 320, ABC 330, SEL 340, PRO 350, MOD 360, and REP 370 enhanced events. In some embodiments, a KEY enhanced event 310 is generated for every keyboard key press and key release. The KEY enhanced events mimic actual hardware key presses and key releases and may mirror the input events that are received from the system software.

The PRE events 320 are enhanced events that are optionally generated by the KEI engine based on factors such as an internal state of the KEI engine. The ABC 330, SEL 340, PRO 350, and MOD 360 events are enhanced events that are generated based on an active operational mode of the KEI engine. The operational modes include an ABC operational mode 335, SEL operational mode 345, PRO operational mode 355, and MOD operational mode 365. The KEI engine also generates the REP enhanced event 370 when in the SEL 345, PRO 355, and MOD 365 operational modes. The REP enhanced event 370 identifies the number of times a particular key is successively tapped where each tap occurs within a particular duration from a prior tap (e.g., 200 ms) without taps of another key. The REP enhanced event 370 is issued with a numerical integer value to represent the number of successive taps. For example, the KEI generates the REP3_Q enhanced event when the "Q" key is tapped three times with each tap occurring within 200 ms of a prior tap and the third tap is released at the completion of the tap.

To determine the active operational mode, the KEI engine categorizes the intercepted events by (i) detecting each keyboard key press separately from each keyboard key release and (ii) analyzing the order and timing with which the keyboard keys are pressed and released. In some embodiments, the KEI engine categorizes the keyboard key input events into one of three states: SINGLE 375, MULT 380, and HOLD 385.

The KEI engine categorizes input events that are issued using a normal key tap to the SINGLE 375 state. A normal key tap involves a key press and release of the same key before a particular time threshold is satisfied. In some embodiments, the time threshold is defined as a duration that if exceeded will cause the threshold to be satisfied. Accordingly, the KEI engine receives a first input event to indicate that a particular key is pressed and a second input event to indicate that the particular key is released. By monitoring the time between the events, the KEI engine determines whether the particular key is held down beyond a particular time threshold. In some embodiments, the particular time threshold is 300 milliseconds (ms). As one skilled in the art would understand in light of the present description, the particular time threshold can be greater or less than 300 ms in some other embodiments.

The KEI engine categorizes a key that is held down beyond the particular time threshold (i.e., 300 ms) before being released to the HOLD 385 state. In some embodiments, a key press that occurs in conjunction with another key that has been held down beyond the particular time threshold is categorized to the MULT 380 state. Keys that are categorized to the MULT 380 state or the HOLD 385 state are used by the KEI engine to generate enhanced events in the MOD operational mode 365. Based on the particular one or more keys that are held down, the KEI system enables access to different sets of output actions. While the particular one or more keys are held down, the KEI engine generates enhanced events that can be used to invoke a specific set of output actions. It should be noted that there are cases when KEI engine may not enter the MOD operational mode, even though more than one key of the keyboard is simultaneously held down.

In some embodiments, specifying the operational mode from a key that is categorized to the SINGLE 375 state requires a second stage of analysis. The second stage of analysis is dependent on various system state information 305. In some embodiments, the system state information 305 includes identifying the frontmost application, the key focus of the frontmost application, and whether the key focus is a text field with a set of selected characters.

In some embodiments, the KEI engine acquires the system state information by executing appropriate API calls when the KEI system is initialized. The API calls cause the OS to push requested system state information to the KEI system whenever the requested system state information changes. In some embodiments, the OS does not push any system state information to the KEI engine. Rather, the KEI system periodically monitors the frontmost application, the key focus within the frontmost application, and whether the key focus is a text field with a set of selected characters, among other relevant state information as required.

The KEI engine determines (at 390) whether the key focus of the frontmost application is a text field. When the key focus of the frontmost application is not a text field or it is otherwise determined that text input is not valid, the KEI engine enters the PRO operational mode 355. When the PRO operational mode 355 is active, the KEI engine generates PRO enhanced events 350 that can be used to invoke a set of output actions that are specific to the frontmost application.

When the key focus of the frontmost application is a text field, the KEI engine next determines (at 395) whether characters are selected within the text field. When characters are selected, the KEI engine enters the SEL operational mode 345. When the SEL operational mode 345 is active, the KEI engine generates SEL enhanced events 340 that can be used to invoke a set of output actions that include output actions for manipulating the selected characters (e.g., bold, italicize, etc.) without the use of any "flag" keys (e.g., ctrl, alt, command, option, shift, etc.). The enhanced events may also contract, expand, or move the selection, or invoke other output actions that are not be related to the manipulation of the selected characters (e.g., performing a text to speech operation on the selected characters).

When no characters are selected (at 395) within the text field, the KEI engine enters the ABC operational mode 335. When the ABC operational mode 335 is active, the KEI system passes through the intercepted events or generates one or more ABC enhanced events 330 that can be used to insert characters in the text field, or utilize an alternate means, such as a script.

When the ABC operational mode is active, the KEI engine generates KEY and ABC enhanced events for each key press and each key release. For example, pressing and releasing the "A" key generates the enhanced events:

$$KEY\_a \quad (1)$$

$$ABC\_a \quad (2)$$

$$KEY\_A \quad (3)$$

$$ABC\_A \quad (4)$$

The lower case letter indicates a key press and the upper case letter indicates a key release. When the shift key is held and the "A" key is pressed, the KEI engine generates the ABC enhanced event:

$$ABC\_1a \quad (5)$$

The number "1" preceding the letter "a" indicates that the "shift" key was down when the "A" key was pressed. The shift key is one of several "flag" keys. Other flag keys include the "ctrl", "alt", "option", and "command" keys of the keyboard. Each flag key is denoted by a different numerical value in the ABC enhanced event. In some embodiments, the information within the ABC enhanced event is ordered such that the flag keys are presented in numeric ordering.

When the SEL operational mode is active, the KEI engine generates KEY, SEL, and REP enhanced events for each key press and each key release. For example, pressing and releasing the "C" key generates the enhanced events:

$$KEY\_c \quad (6)$$

$$SEL\_c \quad (7)$$

$$KEY\_C \quad (8)$$

$$SEL\_C \quad (9)$$

$$REP1\_c \quad (10)$$

For the REP enhanced event, a tap may be completed with the particular key being held down or with the particular key being released. A different enhanced event is generated based on how the tap is completed. In (10) above, a single tap of the "C" key is performed with the key being released within a specified duration as denoted by the integer value 1 after REP.

When the PRO operational mode is active, the KEI engine generates KEY, PRO, and REP enhanced events for each key press and each key release. In many cases, invoking an output action when the MOD operational mode is active requires a first key to be held to enter the MOD operational mode and a second key to be tapped to invoke a particular output action. The MOD enhanced events below illustrate a sequence of key presses, holds, and releases and the corresponding MOD enhanced events:

"M" is held down beyond the time threshold-
>MOD_m (11)

"M" remains held and "B" is pressed->MOD_m_b (12)

"M" remains held and "B" is released->MOD_m_B (13)

"M" remains held and "C" is pressed->MOD_m_c (14)

"M" and "C" remain held and "D" is
pressed->MOD_m_c_d (15)

"M" and "D" remain held and "C" is
released->MOD_m_C_d (16)

"D" remains held and "M" is released->
MOD_M_C_d (17)

All keys are released->MOD_M_C_D, MOD_M_C,
and MOD_M (18)

As shown, the MOD enhanced events track the key press ordering. Keys that are released are removed when they are the last key in the MOD enhanced event. Otherwise, the released key is denoted by an uppercase letter and the key is subsequently removed when it becomes the last key in the MOD enhanced event.

In some embodiments, when the MOD operational mode first becomes active from a different operational mode (ABC, SEL, or PRO), the KEI engine generates a MOD_start enhanced event. When all keys are released, the KEI engine generates a MOD_end enhanced event. In some embodiments, the start and end messages are used to update the display of the KEI viewer with the symbols and widgets of the active MOD operational mode or to revert the symbols and widgets to a previous ABC, SEL, or PRO operational mode when the MOD operational mode is exited.

The enhanced events are passed to the KEI database 230 of FIG. 2. The KEI database utilizes the enhanced events in addition to or independent of system state information to identify and invoke various output actions. The KEI database stores code, scripts, instructions, function calls, API calls, library calls, indirect or direct invocation of a UI element through an application or GUI, or OS system calls for invoking the output actions. In some embodiments, the database contains an execution engine that executes any identified output actions based on the enhanced events and/or system state information. For example, the execution engine executes the following system call to invoke an output action that is identified by a particular enhanced event when a particular operational mode is active. In some embodiments, the system call opens a document "file.txt": "C:\Programs\TextEditApp_X.exe -o file.txt". In some embodiments the KEI database passes information back to the KEI engine to execute any identified output actions.

In some embodiments, the KEI database categorizes the output actions hierarchically to define a functional scope for each output action. Each output action may be categorized to an overlay functional scope, application functional scope, or global functional scope. The different functional scopes allow the same enhanced event to identify and invoke different output actions based on the system state information or other relevant information. For example, different output actions can be categorized to different overlay scopes for the same frontmost application such that the same enhanced event invokes different output actions depending on which field within the frontmost application has focus. As another example, different output actions can be categorized to different application scopes for different frontmost applications such that the same enhanced event invokes different output actions when a first application is frontmost than when a second application is frontmost.

In some embodiments, the KEI system executes API calls that cause the OS to provide system state information to the KEI engine. In some embodiments, the system state information includes identifying changes to the frontmost application and various states within the frontmost application. In some embodiments, an identified state would be when a field within the frontmost application has focus or when another UI element has focus. Based on the system state or other relevant information, an enhanced event can be used to access and invoke a particular output action at a particular functional scope.

In some embodiments, the generated enhanced events are passed to the KEI database where they are first used to identify output actions at the overlay functional scope when an overlay functional scope is specified from the system state information. When an output action is not identified by an enhanced event at the overlay functional scope, the enhanced event is next used to identify an output action at the application functional scope when an application functional scope is specified from the system state information. Otherwise, the enhanced event is used to identify an output action at the global functional scope. When a matching enhanced event is identified at any of the functional scopes, the corresponding output action or actions are invoked at the first such functional scope. If the enhanced event does not identify an output action at any functional scope, the enhanced event is ignored and no operation is performed as a result of that enhanced event. Accordingly, any output action of the computer system or device can be invoked at any time irrespective of which UI element (e.g., button, view, field, toolbar, etc.) has key focus.

It should be noted that each key press may generate multiple enhanced events. In some such embodiments, one or more of the enhanced events may identify and invoke different output actions at various functional scopes and the other enhanced events that do not identify an output action are ignored or are passed to an OS or frontmost application event handler. For example, when the KEI engine is in the PRO mode, a set of enhanced events are generated based on a single tap of the "Y" key. These enhanced events include the KEY_y, KEY_Y, PRO_y, PRO_Y, and REP1_Y enhanced events. The PRO_Y enhanced event may invoke an output action at the application functional scope of the KEI database when a first application is frontmost while the other enhanced events do not identify any output actions at any functional scopes and the REP1_Y enhanced event may invoke an output action at the global functional scope of the KEI database when a second application is frontmost while the other enhanced events do not identify any output actions.

ii. KEI Viewer

Figure 4:
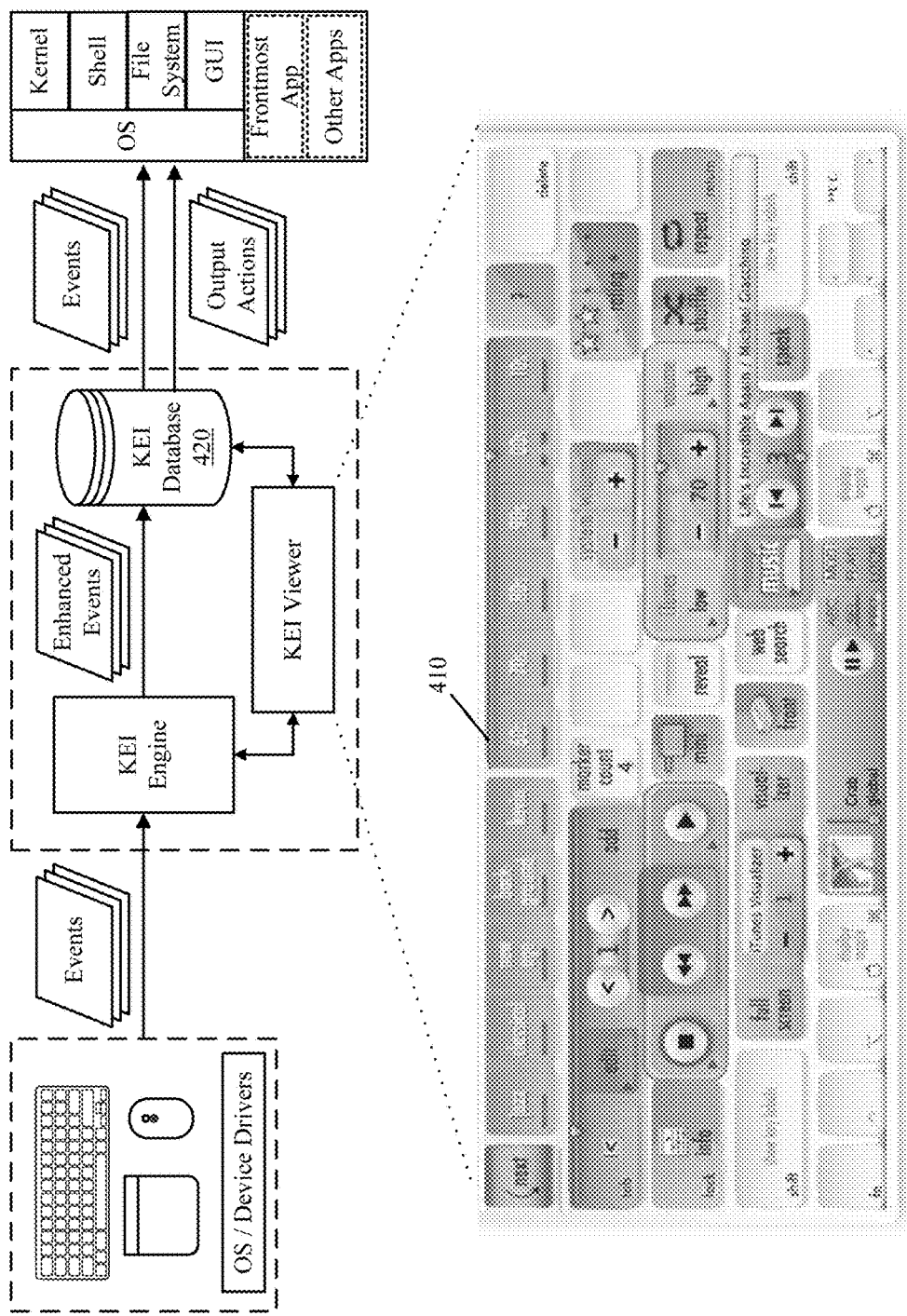
FIG. 4 illustrates the optional KEI viewer of the KEI system in accordance with some embodiments.

In some embodiments, the KEI system includes an optional KEI viewer. FIG. 4 illustrates the optional KEI viewer 410 of the KEI system in accordance with some embodiments. The KEI viewer 410 provides a dynamic visual reference for the output actions that may be invoked using the keyboard keys.

Specifically, the KEI viewer 410 displays a set of graphical keys. In some embodiments, the graphical keys correspond to the keys of the keyboard. Displayed over some or all of the graphical keys are various symbols and/or widgets that are provided by the KEI database 420 based on the enhanced events and/or system state information at any point in time.

Each symbol may provide graphical and/or textual descriptions. Audible descriptions may also be associated with a particular graphical key. The descriptions identify an output action that may be invoked using a keyboard key that corresponds to the graphical key over which the symbol is displayed. In some embodiments, a symbol displays a remotely specified symbol(s) and action over one or more graphical keys of the KEI viewer.

In some embodiments, a widget includes one or more interactive elements that perform one or more output actions. The interactive elements may also include areas for text insertion (e.g., text fields). The user may manipulate interactive elements of the widget using one or more keyboard keys, or touches that correspond to the one or more graphical keys over which the widget is displayed. Additionally, the user may manipulate interactive elements using the mouse pointer or touch inputs. In some embodiments, a widget provides status information about an application or an application parameter or state. In some embodiments, a widget corresponds to a UI element that exists within the existing UI of an application. In some embodiments, a widget corresponds to a UI element that does not exist within the existing UI of any application, but provides added application or system functionality. In some embodiments, a widget provides control over new functionality for a particular application that has not yet been implemented in the particular application through scripting or any of a variety of means provided by the particular OS.

The KEI viewer may be manually or automatically displayed or hidden at any time without interfering with the operation of the UI, applications, or the KEI engine. The operation of the KEI engine is not dependent on the operation of the KEI viewer. Accordingly, the keyboard keys may be used to invoke output actions using enhanced events of the KEI engine even when the KEI viewer is not displayed on-screen.

Figure 5:
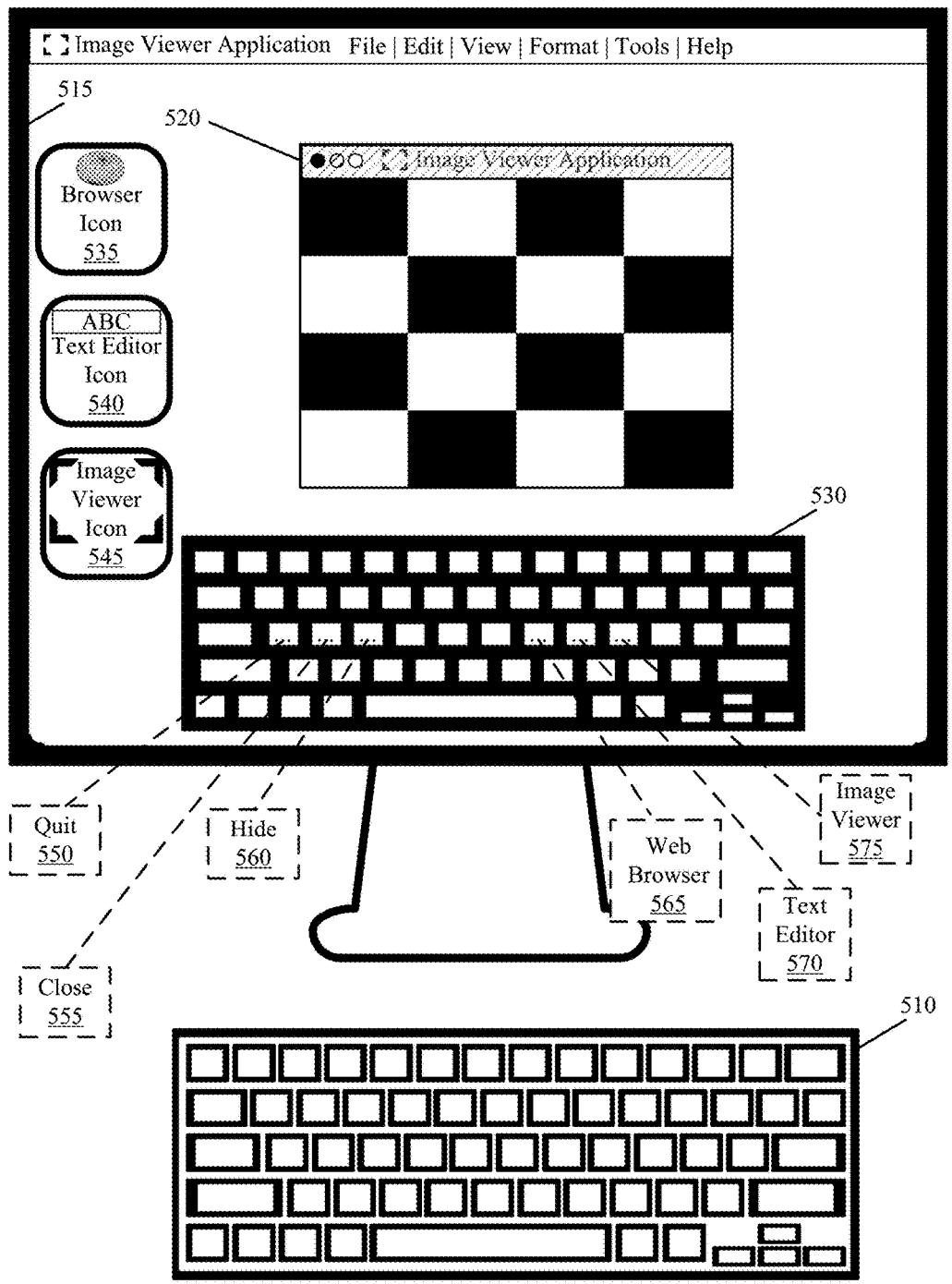
FIG. 5 illustrates operation of the KEI engine in conjunction with the KEI viewer in accordance with some embodiments.

FIG. 5 illustrates operation of the KEI engine in conjunction with the KEI viewer in accordance with some embodiments. The figure includes keyboard 510 and display 515. The display 515 shows frontmost application 520, KEI viewer 530, and application launch icons 535, 540, and 545. The KEI engine is not displayed in the figure, though the KEI engine in this figure and in subsequent figures may include an application that is running on the computer system or electronic device or the KEI engine may be incorporated into the system software.

The KEI viewer 530 includes graphical keys that correspond to the keys of the keyboard 510. The KEI viewer 530 displays symbols 550-575 over some of the graphical keys. The symbols 550-575 identify the output actions that may be invoked using the keyboard keys that correspond to the graphical keys over which the symbols 550-575 are displayed. For example, the symbol 565 identifies that a web browser application may be launched using the "J" key. This output action produces the same result as when the user navigates to the web browser launch icon 535 on the desktop and performs a double click over the icon 535 with the mouse.

From the KEI viewer 530 display, the user can quickly determine which keyboard keys can be used to invoke which output actions. Accordingly, the user does not have to memorize the key presses that invoke the output actions. However, through repeated use, the user is able to automatically take advantage of muscle memory. The same key presses can be repeated to invoke the same output actions. Therefore over time, the user can invoke the output actions without first referencing the KEI viewer.

In some embodiments, the KEI engine operates independent of the KEI viewer such that the output actions identified by the symbols 550-575 are still invocable even when the KEI viewer is not displayed on-screen. In some embodiments, users can specify settings that control if and when the KEI viewer is displayed. For example, the KEI viewer is displayed when a first operational mode is active and is not displayed when a second operational mode is active. As another example, users can specify the KEI viewer to display 100 ms after a first operational mode becomes active and 1 second after a second different operational mode becomes active.

Figure 6:
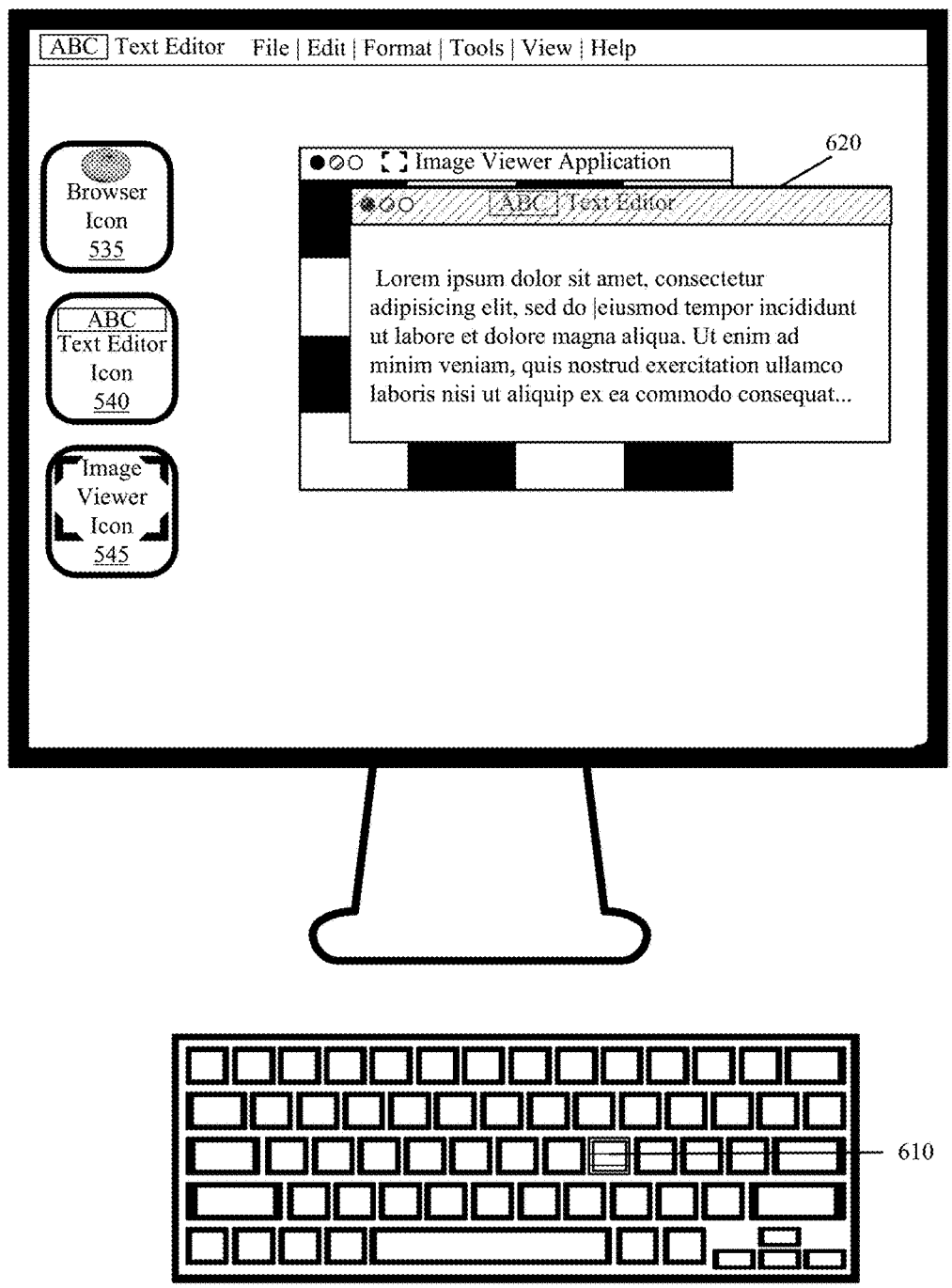
FIG. 6 illustrates using the functionality of the KEI engine to invoke an output action without the KEI viewer being displayed on-screen in accordance with some embodiments.

FIG. 6 illustrates using the functionality of the KEI engine to invoke an output action without the KEI viewer being displayed on-screen in accordance with some embodiments. In this figure, the KEI viewer is not displayed. However, the KEI engine runs in the background to provide access to the output actions that were shown in FIG. 5. Accordingly, when the user taps the "K" keyboard key 610 (as denoted by the horizontal lines), the KEI engine generates the enhanced event that results in the text editor application 620 being launched or brought frontmost.

B. TEI System

In addition to or instead of the KEI system described above, other software enhancements for use with the input device user enhancements described in Sections II and III below include a Touch Enhanced Interface (TEI) system for performing various operations including output action invocation, character insertion (typing text), and text operations based on variations of a combinational touch. In some embodiments, the combinational touch includes an individual or multiple touches of the index, middle, ring, and little fingers. In some other embodiments, the combinational touch may incorporate use of fingers and thumbs of either hand, palms, and inputs from multiple devices acting in concert. Through these various touch combinations, users can (i) gain access to different sets of operations and (ii) perform specific operations in an accessed set of operations with various taps, holds, directional slides, and directional flicks.

In some embodiments, the TEI system includes a TEI engine, a TEI database, and a TEI viewer. The TEI system operates in one of several operational modes. Each operational mode includes zero or more sub-modes. Each sub-mode provides access to a different set of operations. Each operation can invoke an output action, insert a character, or perform a text manipulation action.

Figure 7:
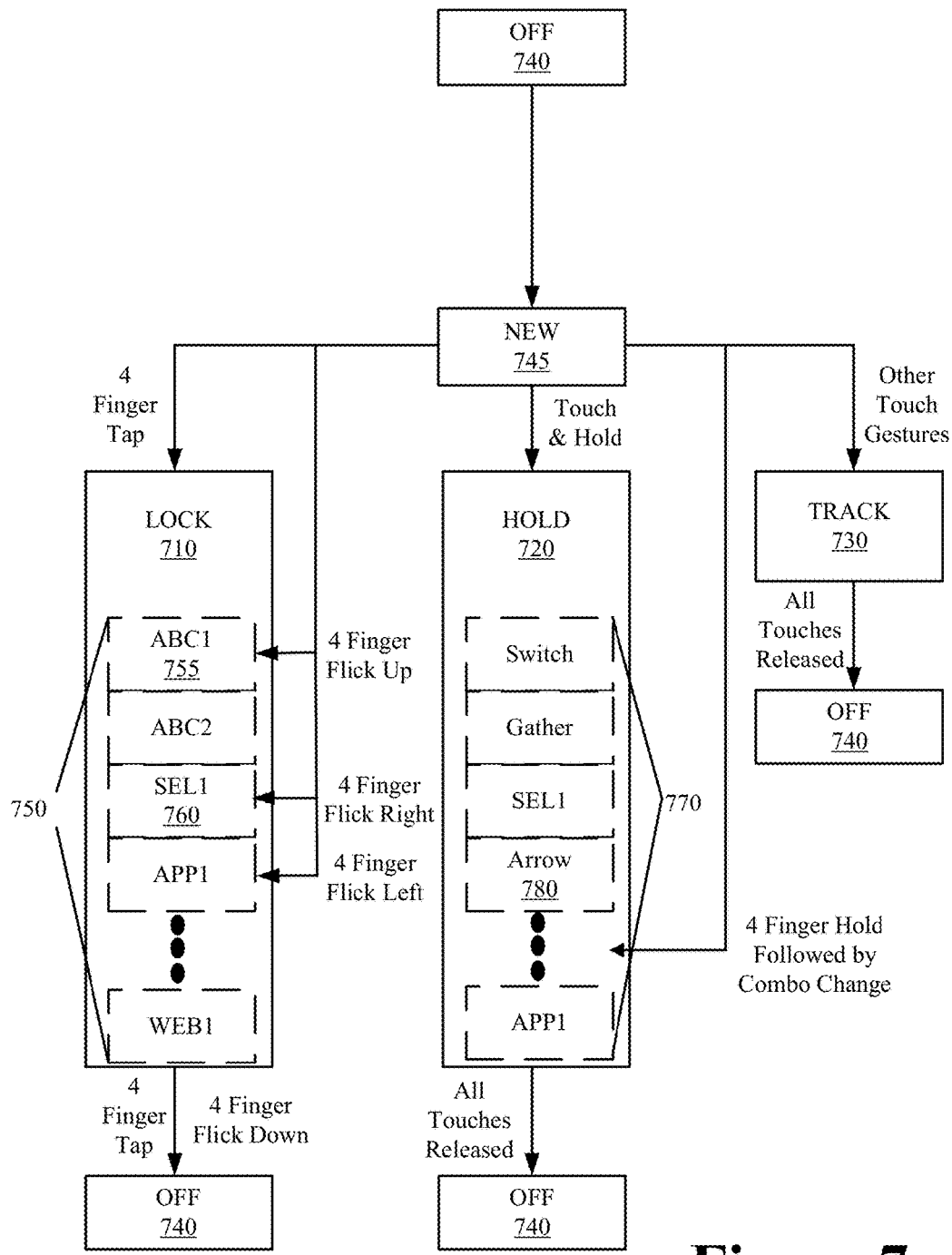
FIG. 7 illustrates the various operational modes of the TEI system and steps to access different sub-modes within a particular operational mode in accordance with some embodiments.

FIG. 7 illustrates the various operational modes of the TEI system and steps to access different sub-modes within a particular operational mode in accordance with some embodiments. As shown, the TEI system includes a LOCK operational mode 710, a HOLD operational mode 720, and a TRACK operational mode 730. The LOCK operational mode 710 includes sub-modes 750. The HOLD operational mode 720 includes sub-modes 770. In this figure, each sub-mode is represented by a rectangular box that identifies the set of operations that are available in that sub-mode. Each sub-mode is also associated with a set of symbols, speech, audio, zipper text, etc. that identify the corresponding set of operations through the TEI viewer. The TRACK operational mode 730 does not include any sub-modes.

When starting the TEI system and before any touches are detected, the TEI system is in the OFF state 740. The TEI system transitions from the OFF state 740 to the NEW state 745 upon receiving events that include raw data for identifying user touches. In the NEW state 745, the TEI system analyzes the events to determine which operational mode and, more specifically, which sub-mode to enter.

The TEI system enters a sub-mode 750 of the LOCK operational mode 710 when a user issues a four finger tap or a four finger directional flick in the up, left, or right directions in some embodiments. From the OFF state 740, the TEI system enters the last accessed sub-mode in the LOCK operational mode 710 when the TEI system receives a four finger tap. For example, if sub-mode 760 was last accessed before exiting the LOCK operational mode 710, a four finger tap will cause the TEI system to reenter sub-mode 760 and provide access to the set of operations that are associated with sub-mode 760.

In some embodiments, the TEI system remains in the selected sub-mode until an operation is performed, another four finger tap is issued, or a four finger downward directional flick is performed. When one of these three actions is performed, the TEI system exits the LOCK operational mode 710 and reverts to the OFF state 740 and in some embodiments, the TEI viewer will be dismissed from the display.

The user can cycle between the different sub-modes 750 when already in the LOCK operational mode 710 by performing a four finger directional flick in one of two directions in some embodiments. Each four finger directional flick in one of the specified directions causes the TEI system to enter a different LOCK sub-mode, thereby providing the user with access to a different set of output actions that are associated with the active sub-mode. Switching between sub-modes may be depicted on the TEI viewer with a corresponding animation. For example, the TEI viewer swaps out the symbols that identify a set of operations of a first sub-mode (e.g., sub-mode 755) with the symbols that identify a set of operations of a second sub-mode (e.g., sub-mode 760).

In addition to or instead of a four finger tap, the TEI system allows users to enter a specific sub-mode of the LOCK operational mode 710 from the OFF state 740 by using four finger directional flicks in the up, left, and right directions. Each directional flick (i.e., up, left, or right) causes a different sub-mode to become active from the OFF state 740 and thereby provides the user with immediate access to a different set of operations. For example, an upward four finger flick causes the TEI system to enter sub-mode 755 of the LOCK operational mode 710 when previously in the OFF state 740 or when in another LOCK sub-mode. A rightward four finger flick causes the TEI system to enter sub-mode 760 of the LOCK operational mode 710 when previously in the OFF state 740.

From the OFF state 740, the TEI system enters a sub-mode 770 of the HOLD operational mode 720 when a user performs a touch and hold with any one or more fingers or when the user performs a four finger touch and immediately thereafter releases some of the touches while continuing to hold other touches. Each sub-mode 770 of the HOLD operational mode 720 provides access to a different set of operations. The sets of operations may include zero or more sets of operations that were accessible from the sub-modes 750 of the LOCK operational mode 710 or may include different sets of operations. The TEI system remains in the selected HOLD sub-mode so long as the at least one touch that is used to gain access to that sub-mode remains held and not moved beyond a distance defined from the original position of the touch, also referred to as a distance threshold. In some embodiments, the distance threshold is defined to be some surrounding area or region of regular or irregular shape and size that if moved beyond or outside of will cause the threshold to be satisfied. The user can switch between the different HOLD sub-modes 770 by altering which one or more touches are held.

The TRACK operational mode 730 allows users to perform traditional preexisting touch gestures of the device. For example, when the TEI system is used in conjunction with a trackpad, the TRACK operational mode 730 allows touches on the trackpad to revert to preexisting trackpad operations such as pointer movements (one finger trackpad operation) or scrolling (two finger trackpad operation). In this manner, the TEI system does not interfere or prevent preexisting touch gestures from being performed.

Like the KEI system, the TEI system includes a TEI viewer which displays a set of symbols that identify the set of operations that can be performed using the various touch combinations when in a particular sub-mode of the LOCK operational mode 710 or HOLD operational mode 720 is active.

Figure 8:
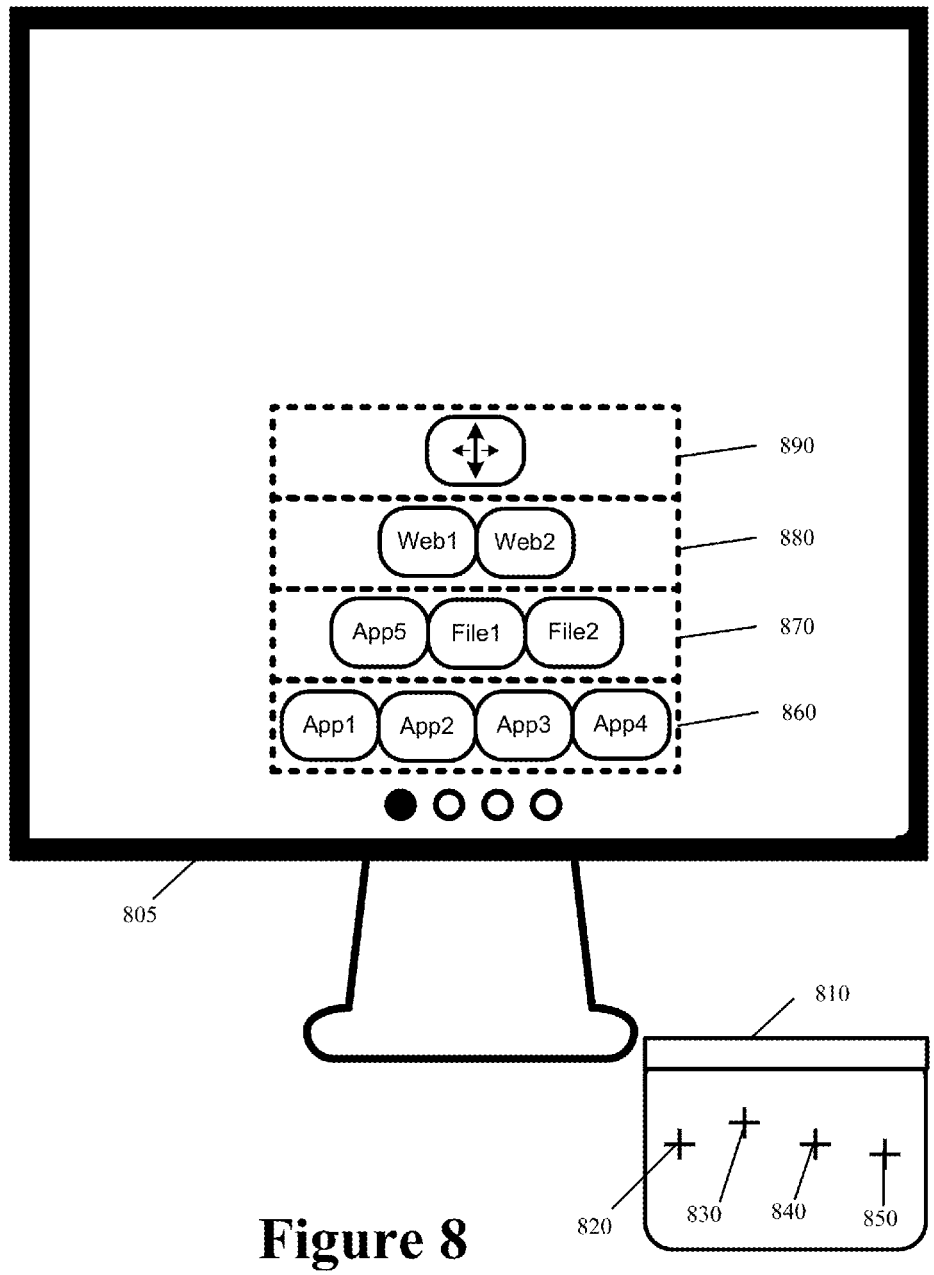
FIG. 8 illustrates displaying the TEI viewer of some embodiments by issuing a four finger tap on an external trackpad device running under a pointer-based UI.

FIG. 8 illustrates displaying the TEI viewer of some embodiments by issuing a four finger tap on an external trackpad device 810 running under a pointer-based UI. The trackpad 810 can be used separately or in conjunction with other input devices (e.g., keyboard, touchscreen, etc.) to operate the computer system 805. The trackpad 810 may also be built into a laptop or notebook or its functionality may be incorporated into a display.

In FIG. 8, each tap that is performed by a finger is depicted by a "+". For example, 820, 830, 840, and 850 represent an essentially simultaneous four finger tap that is performed on the trackpad 810 with the right hand. In this figure, the tap 820 is performed by the index finger of the right hand, the tap 830 is performed by the middle finger of the right hand, the tap 840 is performed by the ring finger of the right hand, and the tap 850 is performed by the little finger of the right hand. The four finger tap causes the TEI system to enter the sub-mode that was last accessed when in the LOCK operational mode.

The four finger tap 820-850 causes the TEI viewer to display on-screen with rows of symbols 860-890. The first row of symbols 860 includes four symbols in some embodiments which identify different operations that can be performed by flicking different individual touches in a particular direction (e.g., up, down, left, or right). These operations may include different output actions that can be invoked such as launching an application or visiting a web site, different characters that can be inserted, and/or different text operations that can be performed.

The second row of symbols 870 that is displayed above the first row 860 includes three symbols in some embodiments which can be accessed by simultaneously flicking different pairs of adjacent touches in a particular direction. The third row of symbols 880 that is displayed above the second row 870 includes two symbols in some embodiments which can be performed by simultaneously flicking different sets of three adjacent touches in a particular direction. The fourth row 890 that is displayed above the third row 880 includes a single symbol in some embodiments that is accessed when all four fingers are touching.

In some such embodiments, the user performs a touch and hold of one or more fingers to cause the TEI system to enter a sub-mode of the HOLD operational mode from the OFF state. Specifically, the TEI system enters different HOLD sub-modes based on which combination of one or more fingers are held (e.g., index, middle, ring, or little) for at least a time threshold (i.e., some defined amount of time) without at least one touch moving beyond a distance threshold (i.e., some distance from the original position of the touch). For example, holding just the index finger for the time threshold without movement beyond a distance threshold enables access to a first set of operations of a first HOLD sub-mode and holding the index finger in conjunction with the middle finger for the time threshold without movement beyond the distance threshold enables access to a different second set of operations of a second HOLD sub-mode.

The TEI system provides other methods with which to access different sub-modes of the HOLD operational mode. In some embodiments, the TEI system enters a particular HOLD sub-mode when a user (i) performs a four finger touch and (ii) then releases some but not all of the touches. In some embodiments, the TEI system changes between different HOLD sub-modes when the user changes the touch combination that is held by adding or removing one or more touches to the right or left of the initial hold touch combination. The TEI system remains in a particular HOLD sub-mode until all touches are released, in which case the TEI system reverts to the OFF state. In some cases the issuance of a tap, hold, slide or flick in a particular HOLD sub-mode executes an output action and then reverts to the OFF state. In some HOLD sub-modes and within some initial time windows, the sub-mode changes when the touch combination being held changes (e.g., one or more touches are added or removed), or when some or all touches are moved. Additionally, there are cases where the HOLD sub-mode is cancelled and the TEI system reverts to the OFF state. Such cases would include when a new touch is added which exceeds the expected maximum number of touches, and when a new touch is added which falls outside of the expected hand/finger geometric range.

Many of the input device user interface enhancements described in Sections II and III below are shown in conjunction with the KEI system. However, some of these enhancements may be adapted to operate in conjunction with the TEI system. Accordingly, the input device enhancements shown below in conjunction with the KEI system are not intended to be limiting and these enhancements can be adapted for operation with the TEI system as well as the KEI system.

II. Keyboard Enhancements

A. Illuminated Keyboard

Figure 9:
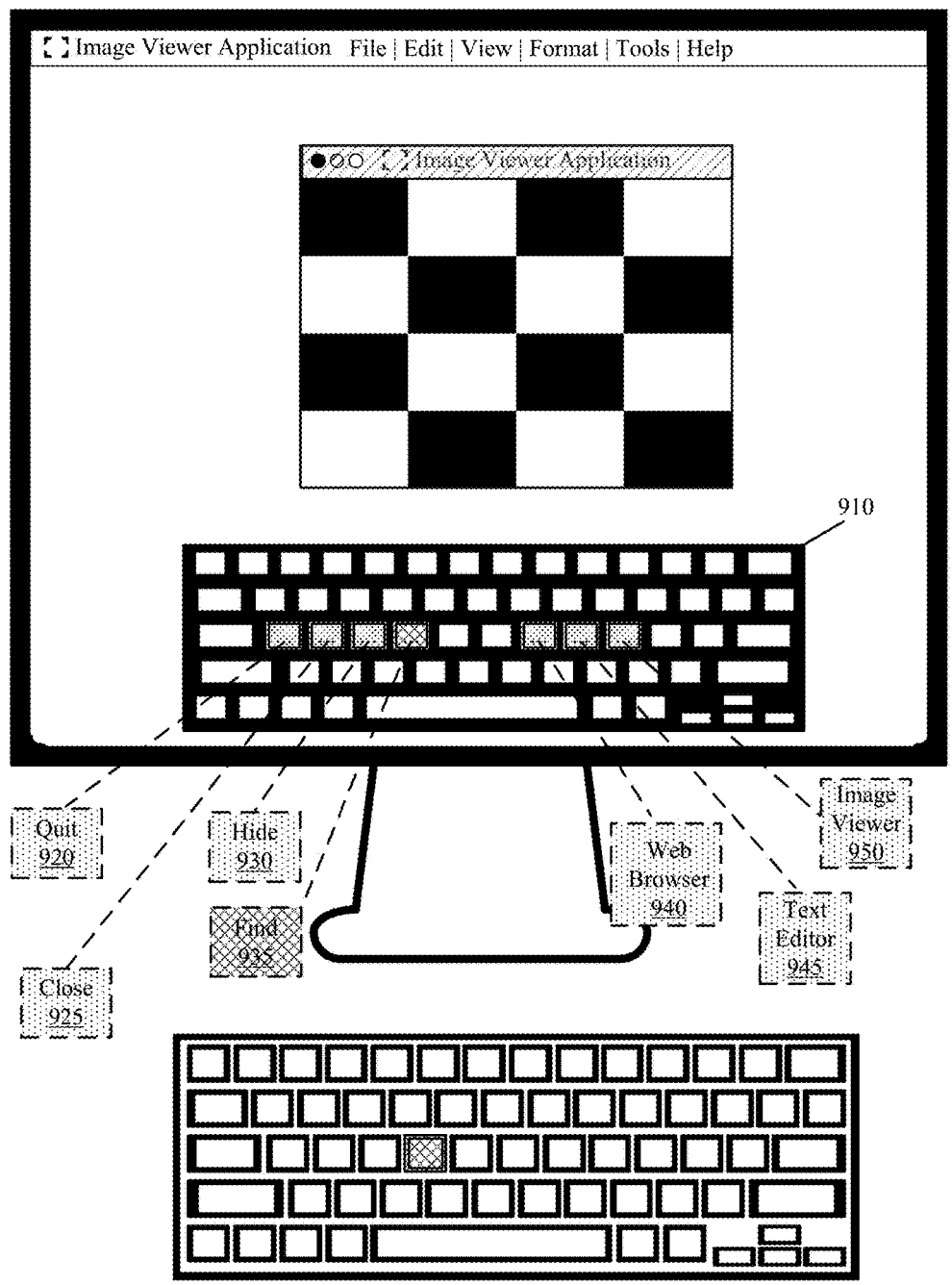
FIG. 9 illustrates color-coded graphical keys of the KEI viewer in accordance with some embodiments.

Some embodiments color-code the graphical keys of the KEI viewer to better identify the set of output actions that may be invoked when a particular operational mode is active. FIG. 9 illustrates color-coded graphical keys of the KEI viewer 910 in accordance with some embodiments.

The KEI viewer 910 displays symbols 920-950 over the "A", "S", "D", "F", "J", "K", and "L" graphical keys of the KEI viewer 910. To better identify the symbols 920-950, the KEI viewer 910 color-codes the graphical keys as shown by the shaded graphical keys. In some embodiments, the color coding includes: coloring a graphical key, coloring a border around a graphical key, or coloring a border around a group of consecutive graphical keys. In some embodiments, the color coding is applied under the symbols 920-950. The color coding changes when the symbols and/or widgets displayed over the graphical keys change in response to different operational mode becoming active, change in the key or keys that are used to specify a MOD operational mode, change in the frontmost application, or change in the key focus of the frontmost application.

In some embodiments, the graphical home keys (i.e., "A", "S", "D", "F", "J", "K", "L", and ";") are color-coded to identify the active operational mode. Specifically, the graphical home keys are colored a first color when ABC mode is active, a second color when SEL mode is active, a third color when PRO mode is active, and a fourth color when MOD mode is active. In some other embodiments, a different set of graphical keys may be color-coded to identify what operational mode is active. Alternatively, the space bar graphical key may include various color indicators which become illuminated based on the active operational mode.

Some embodiments provide an enhanced keyboard with illuminable keys. The keyboard keys may illuminate in conjunction with or independent of the color-coded graphical keys of the KEI viewer. The illumination of specified keyboard keys provides a direct visual reference as to which keys invoke output actions when a particular operational mode is active.

When used in conjunction with the KEI viewer, the illuminated keys provide a visual association to the color-coded graphical keys of the KEI viewer. This visual association allows a user to more readily identify the particular output action that may be invoked by a particular illuminated key of the enhanced keyboard of some embodiments.

Figure 10:
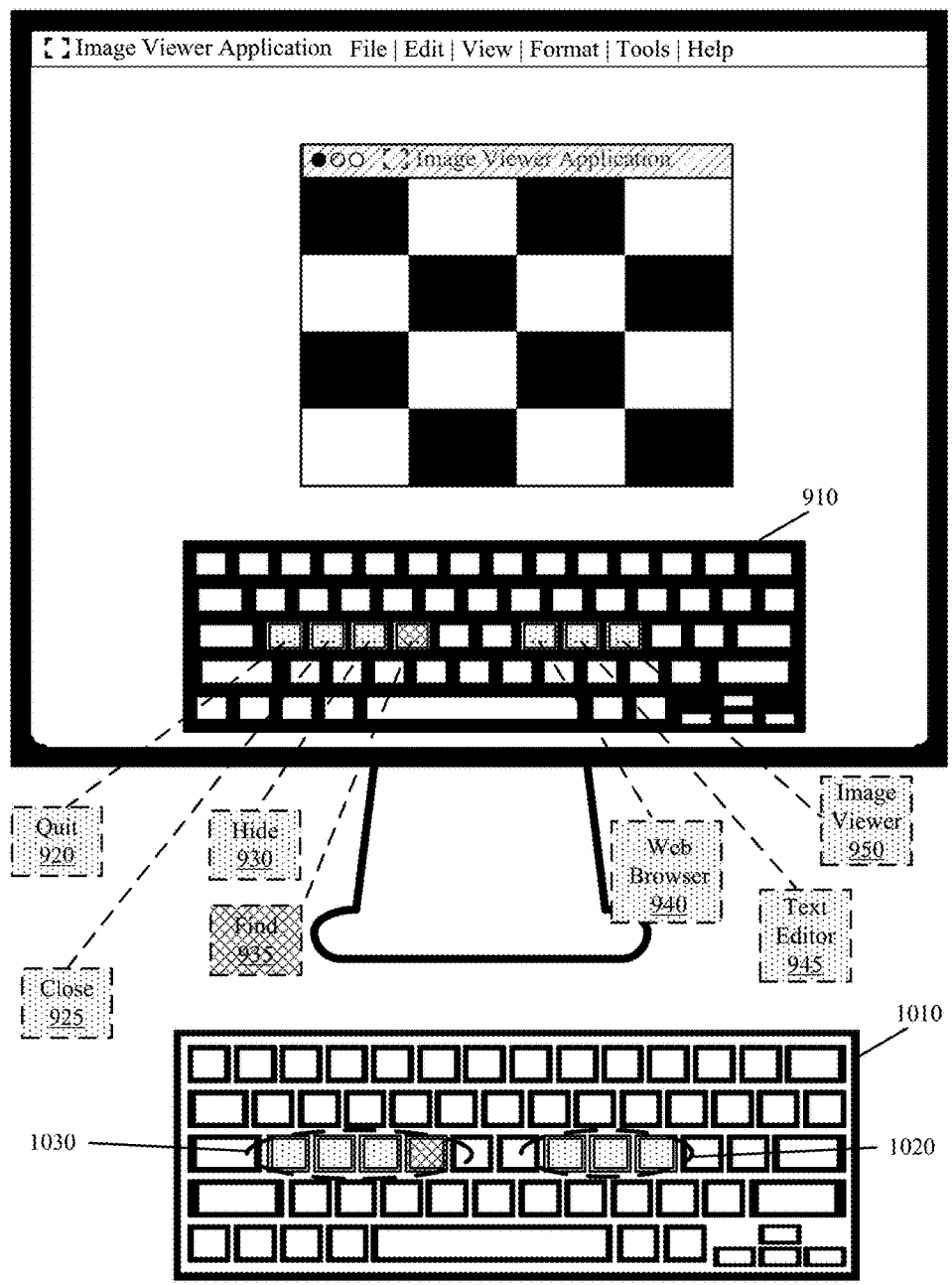
FIG. 10 illustrates operation of the enhanced keyboard with illuminable keys in accordance with some embodiments.

FIG. 10 illustrates operation of the enhanced keyboard 1010 with illuminable keys in accordance with some embodiments. This figure illustrates the enhanced keyboard 1010 operating in conjunction with the KEI viewer 910 of FIG. 9.

The KEI viewer 910 displays the symbols 920-950 that identify the output actions that may be invoked when the KEI engine is in the "F" key MOD operational mode. The KEI viewer 910 color-codes the graphical keys over which the symbols 920-950 are displayed.

The sets of keyboard keys 1020 and 1030 are also illuminated. The illumination of the sets of keyboard keys 1020 and 1030 is illustrated by the shaded boxes. The sets of keyboard keys 1020 and 1030 correspond to the color-coded graphical keys of the KEI viewer 910. By making the visual association between the illuminated sets of keyboard keys 1020 and 1030 and the color-coded graphical keys of the KEI viewer 910, the user can identify the particular output action that may be invoked by tapping a particular illuminated key.

The illuminated sets of keyboard keys 1020 and 1030 also assist in orienting the user's finger positioning. Specifically, the user can identify the user's finger placement on the illuminated keys relative to the color-coded graphical keys of the KEI viewer 910. Consequently, the user may determine the finger movement that is necessary to invoke a particular output action without having to realize the particular key that invokes the output action.

Different sets of keyboard keys are illuminated in response to the changing operation of the KEI engine. More specifically, different keys are illuminated when the KEI engine changes operational modes, the user changes the key hold used to specify a MOD operational mode (e.g., holding the "E" key instead of the "F" key), the frontmost application changes, or the key focus of the frontmost application changes.

In some embodiments, the enhanced keyboard 1010 includes (1) a plurality of semi-transparent keys with one or more controllable light sources under each of the semi-transparent keys, (2) a controller that controls the illumination of the keys and (3) a mechanism by which the controller communicates with the host device. The light source may utilize any appropriate technology such as LED or OLED. The controller includes software that can individually address each of the keys or groups of keys as a set. The controller may interface with the KEI system or other processes or applications using a protocol such as USB or Bluetooth, which may or may not be the same protocol that handles traditional key up/down communication. Through the controller, the KEI system can issue instructions that cause the enhanced keyboard to illuminate each key independently or cause a group of keys to illuminate to preset values. Instructions that control the illumination of a group of keys are used to reduce the overall communication between the KEI system and the controller. For example, the KEI system can issue a single "clear" instruction to the controller to turn off the illumination of any keyboard keys rather than send an off instruction for each key of the keyboard to the controller. Accordingly, the enhanced keyboard may also include a processor to decode and perform instructions that control the illumination of groups of keys. Based on different instructions from the KEI system, the processor can further provide for variations in the illumination of the keys such as illumination flashing, changing colors, fading brightness, fading between colors, and displaying bitmap graphics using the illumination of the keys as some examples.

In some embodiments, the light sources are capable of illuminating each key independently with a specified color.

By using various colors on various keys, groups of related output actions may be color-coded. For example, a first color identifies application specific output actions and a second color identifies global output actions. In some embodiments, the keyboard home keys (i.e., the "A", "S", "D", "F", "J", "K", "L", and ";" keys) illuminate a first color when the KEI engine is in the ABC operational mode and a second color when the KEI engine is in the SEL operational mode.

Figure 11:
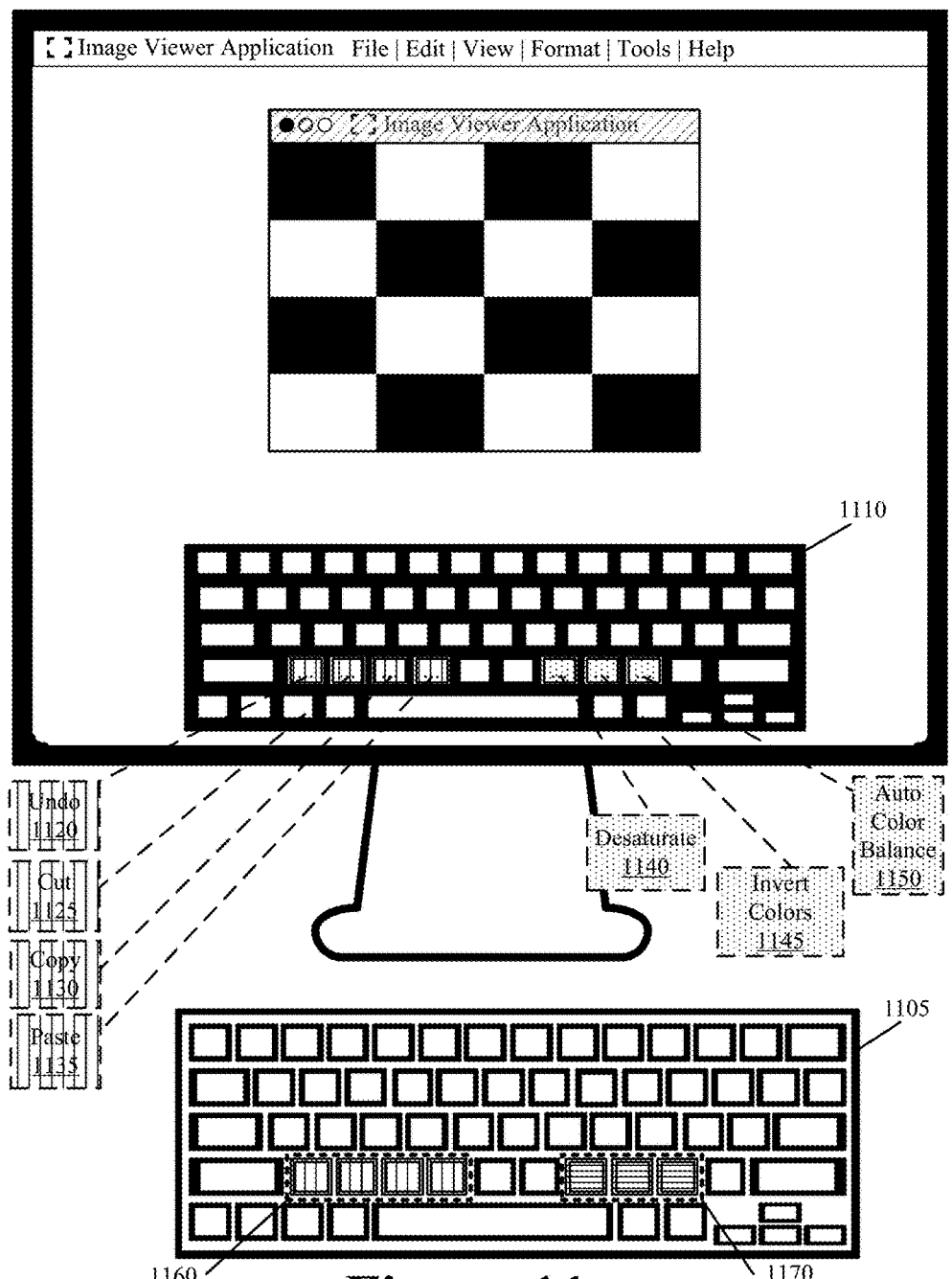
FIG. 11 illustrates the enhanced keyboard with different sets of keyboard keys that are illuminated with different colors in accordance with some embodiments.

FIG. 11 illustrates the enhanced keyboard 1105 with different sets of keyboard keys that are illuminated with different colors in accordance with some embodiments. In this figure, the KEI viewer 1110 displays symbols for two groups of related output actions. The first set of symbols 1120-1135 identify the general output actions: undo, cut, copy, and paste. The second set of symbols 1140-1150 identify the application specific output actions: desaturate, invert colors, and auto color balance. The KEI viewer 1110 also color-codes the graphical keys for each group of output actions a different color as denoted by the different shading (e.g., vertical lines and scattered dots).

The enhanced keyboard 1105 illuminates the corresponding sets of keyboard keys 1160 and 1170 with colors to match those of the graphical keys. The set of keys 1160 corresponds to the graphical keys over which the first set of symbols 1120-1135 are displayed. Accordingly, the set of keys 1160 is illuminated the same color as the graphical keys that display the symbols 1120-1135. The set of keys 1170 corresponds to the graphical keys over which the second set of symbols 1140-1150 is displayed. Accordingly, the set of keys 1170 is illuminated the same color as the graphical keys that display the symbols 1140-1150.

As one skilled in the art would understand in light of the present description, the keys of the enhanced keyboard may be illuminated even when the KEI viewer is not displayed on-screen. In some such embodiments, the keys are illuminated to identify the keys that invoke output actions based on, for example, the operational mode of the KEI engine, particular key holds that specify a particular MOD operational mode, the identified frontmost application, and/or the identified key focus of the frontmost application.

Figure 12:
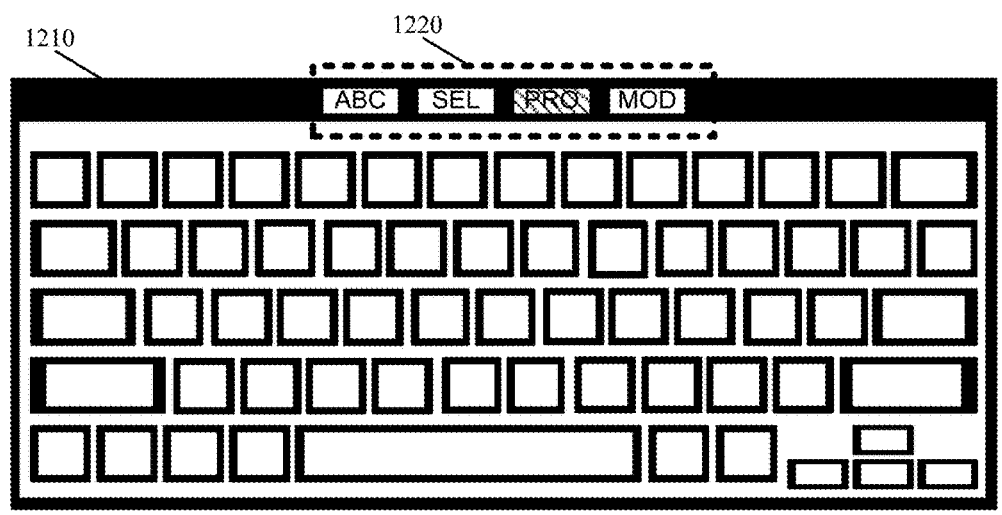
FIG. 12 illustrates the illuminable keyboard with operational mode indicator lights in accordance with some embodiments.

To identify the operational mode of the KEI engine separately from identifying which keys can be used to invoke output actions, some embodiments of the enhanced keyboard include one or more operational mode indicator lights. FIG. 12 illustrates the illuminable keyboard 1210 with operational mode indicator lights 1220 in accordance with some embodiments.

The keyboard 1210 includes illuminable keys as described above. Additionally, the keyboard 1210 includes indicator lights 1220 that illuminate to indicate which operational mode (e.g., ABC, SEL, PRO, and MOD) is active. In some embodiments, a single indicator light is used to indicate the active operational mode. In some such embodiments, a first color identifies a first active operational mode, a second color identifies a second active operational mode, etc. In another embodiment, the indicator lights may be placed on the side, edge, under the keys as a backlight, or in multiple locations on the device.

B. Touch Sensitive Keyboard

Some embodiments provide an enhanced keyboard with a plurality of touch sensitive keys. Each of the touch sensitive keys includes one or more touch sensitive layers that detect touch and motion over the key using capacitive, resistive, or other touch or presence sensing technologies. The enhanced keyboard also includes a controller that converts the raw touch data into appropriate real-time messages. Such messages are then communicated via an appropriate protocol such as USB or Bluetooth to the host device. In some embodiments, the controller is implemented with firmware that is executed using an integrated circuit (IC) of the enhanced keyboard.

Figure 13:
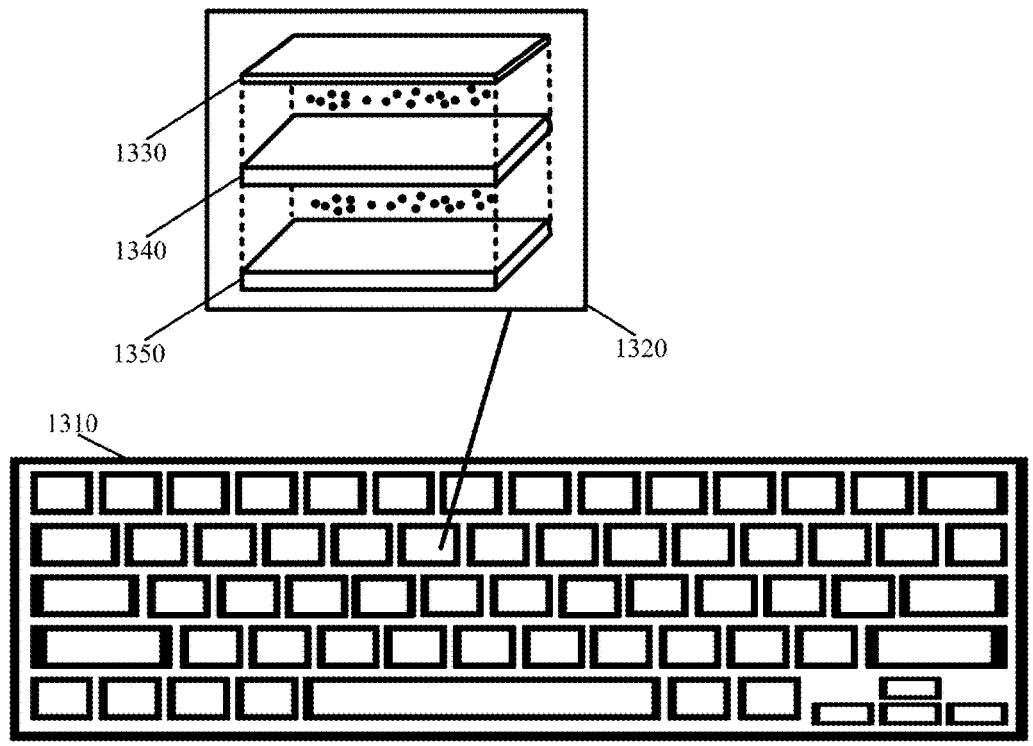
FIG. 13 illustrates the enhanced keyboard with touch sensitive keys in accordance with some embodiments.

FIG. 13 illustrates the enhanced keyboard 1310 with touch sensitive keys in accordance with some embodiments. Specifically, this figure presents the various layers of a single touch sensitive key in accordance with some embodiments.

It should be well understood that the following described touch sensing technology is presented as one of any number of methods to ascertain raw touch data from a composite surface. The present invention is able to work with data from a wide range of such touch sensing technologies, which would be known to one skilled in the art. For example, some technologies provide sensor output even before actual contact. This proximity sensing capability would be utilized to further increase the accuracy of certain palm/hand/finger tracking models.

As shown in the key detail 1320, each touch sensitive key comprises at least three layers 1330, 1340, and 1350. In some embodiments, the layers 1330-1350 are separated by a flexible insulating material.

The first or topmost layer 1330 is a protective layer. The protective layer may be composed of a thin glass or plastic material. In some embodiments, the second layer 1340 and the third layer 1350 are touch sensitive layers that may be coated with resistive materials such as indium tin oxide (ITO). In some embodiments, the second layer 1340 includes a set of horizontally spanning electrode strips and the third layer 1350 includes a set of vertically spanning electrode strips that create an array of x and y sensors. The controller measures the mutual capacitance from each of the horizontal electrodes to each of the vertical electrodes. When a finger touches the key, the capacitance at the electrodes over which the touch occurs changes. The controller measures the change to produce a touch x-coordinate and a touch y-coordinate.

Figure 14:
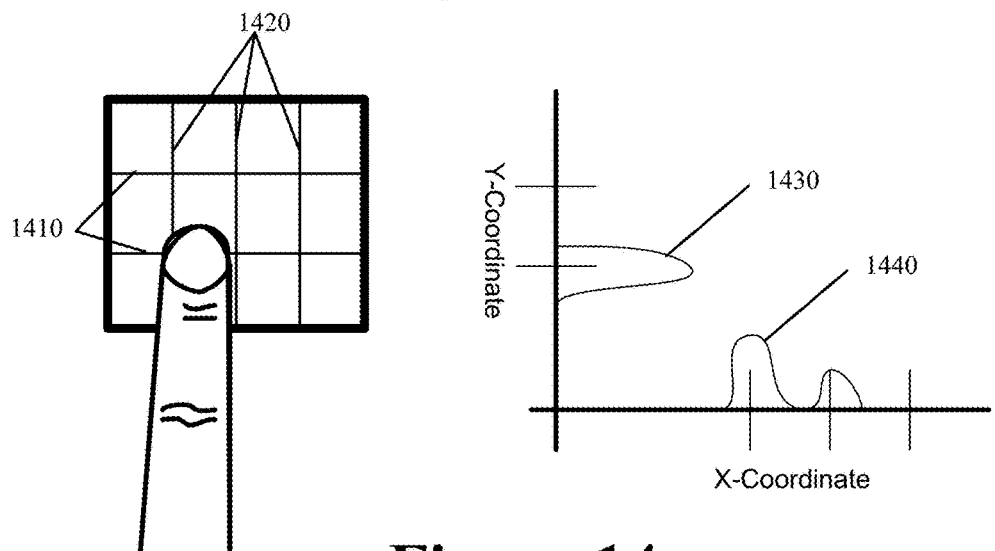
FIG. 14 illustrates generating the touch x-coordinate and the touch y-coordinate from a touch sensitive key of some embodiments.

FIG. 14 illustrates generating the touch x-coordinate and the touch y-coordinate from a touch sensitive key of some embodiments. As shown, the touch sensitive key includes two horizontally spanning electrode strips 1410 and three vertically spanning electrode strips 1420. When the key is touched at a particular location, the capacitance changes at that location. The controller produces intensity signals 1430 and 1440 based on the change in capacitance. The intensity signals 1430 and 1440 can then be converted into a touch x-coordinate and a touch y-coordinate.

Figure 15:
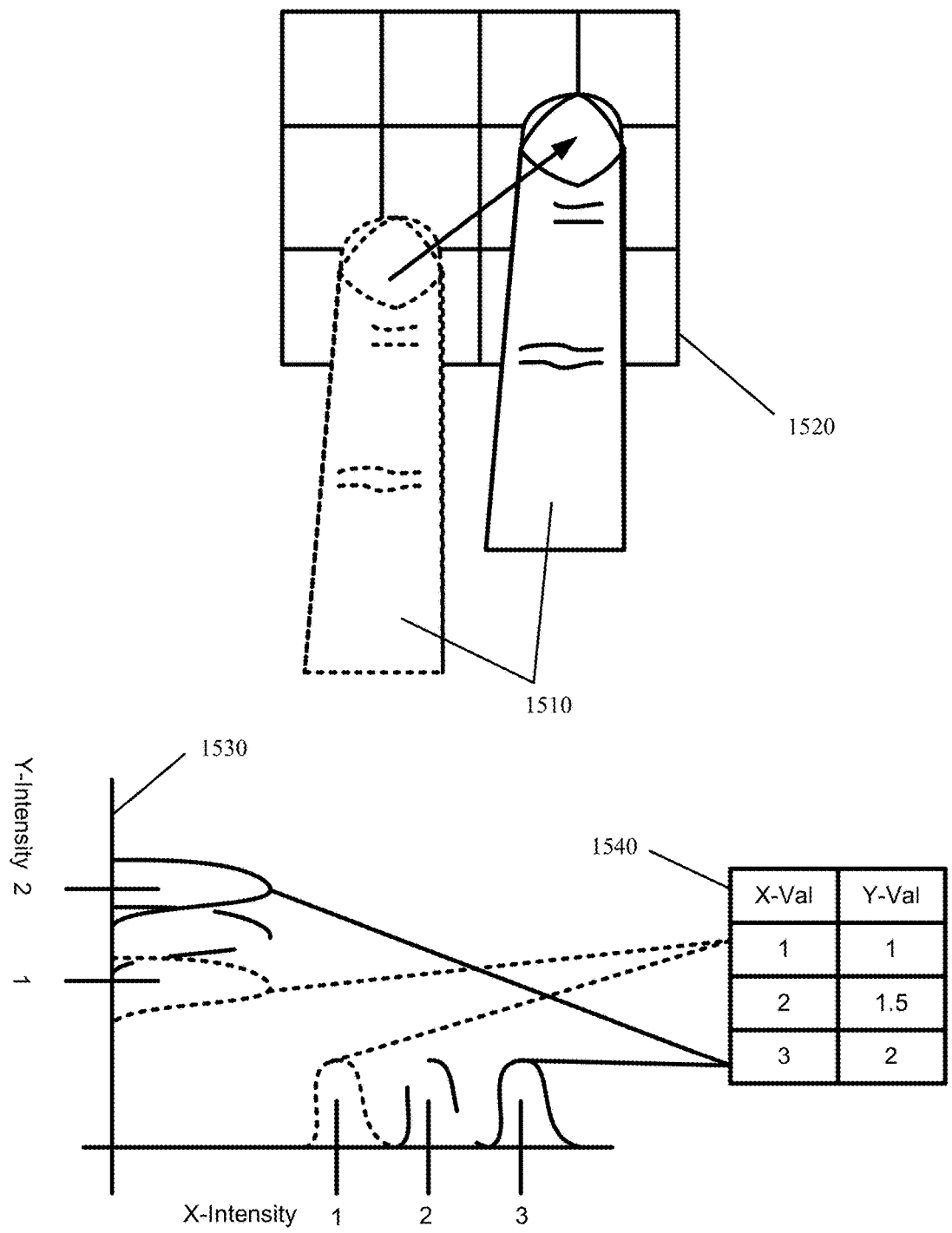
FIG. 15 illustrates motion tracking across a touch sensitive key in accordance with some embodiments.

FIG. 15 illustrates motion tracking across a touch sensitive key in accordance with some embodiments. This figure illustrates finger 1510 moving from the lower left portion of the touch sensitive key 1520 to the upper right portion of the key 1520. The graph 1530 illustrates the change in the intensity signals as the finger moves. The table 1540 illustrates the x and y coordinates that are derived from the intensity signals and that show the motion using x and y coordinate values.

In some embodiments, motion is tracked continuously across multiple touch sensitive keys, or the entire enhanced keyboard. To differentiate between which key is touched, the controller generates unique x and y touch coordinates for each touch sensitive key. For example, the controller produces an x-coordinate in the range of 1-3 when the "A" keyboard key is touched, produces an x-coordinate in the range of 4-6 when the adjacent "S" keyboard key is touched, and produces an x-coordinate in the range of 25-27 when the "L" keyboard key is touched. As a result, different functionality can be invoked for touches that are issued to different keys.

The controller accounts for the offsets between the keyboard keys when determining the x and y coordinates across multiple keys. Key offsets include the spacing gaps between adjacent keys. Furthermore, in many keyboards, keys are not vertically aligned and are instead offset by some distance. For example, the "U" key is not directly above the "J" key. Instead, the "U" key is offset to the left of the "J" key. Both vertical and horizontal gaps are taken into account when the controller calculates the appropriate origin offset for each key.

Some embodiments account for the gap between adjacent keys by factoring the exact inter-key physical distance into the individual key coordinate ranges. For example, the x-coordinate range for the "A" key is 1-3 and the x-coordinate range for the adjacent "S" key is 4-6. The x-coordinate value of 3.5 is issued when a touch is centered on the gap between these two keys.

In addition to the entire keyboard surface being continuously mapped for unique x/y touch coordinates, specific groups of touch sensitive keys can be combined to form different tracking areas. Each tracking area can be used in conjunction with a different UI element (e.g., scrollbar, graphical slider, etc.) to invoke different output actions.

To facilitate these tracking operations, the real-time messages created by the controller include data such as the time of the event, the unique id of the event, the status of the event (e.g. began, moved, ended), the key id (e.g., "A", "S", "D"), and the x/y coordinates of the event.

Furthermore, such data may be sent in a variety of forms such as (1) per-key raw data, wherein values from the individual sensors are sent, (2) per-key x/y interpolation, wherein x/y coordinates are sent for each touched key, (3) per-key binary, wherein the began and ended status is sent and the moved status is ignored, (4) global x/y interpolation, wherein the x/y coordinates for each touch are expressed in terms of the overall keyboard surface as a whole, including key gaps, (5) key group slider emulation, wherein a single key or a contiguous set of keys or defined key areas can be configured such that values representing motions on those keys are sent, (6) trackpad emulation, wherein a defined key area sends x/y coordinates and other relevant trackpad data such as move, click, drag, scroll and the like. It should be noted that combinations of the real-time message forms may be sent simultaneously, such as global x/y with per-key binary.

Touch data may further be categorized by the controller or software running on the host device into various combinations of touch, hold, tap, slide, flick events. For example, in some embodiments, the keyboard controller coalesces nearly simultaneous flick motions on multiple keys to a single event sent to the host device, or the keyboard controller may send an event when, for example, the "a", "s", "d" and "f" keys are all being touched, and another event when one or more of those keys are no longer being touched. The keyboard controller may also respond to a request for a list of its supported capabilities. The touch sensitive key motions can be used for any number of output action invocations. Also, detected touch motions atop assigned keys can employ dynamic inertial scrolling techniques, wherein a flick causes a value to continue to change for some time period after a touch is released or until a touch is detected on one of the specified keys. The speed and characteristics of such motions are proportional to the rate at which the value is modified, such that the resulting effect is similar to inertial scrolling techniques which should be evident to one skilled in the art.

To avoid excessive data transmission, certain thresholds can be set for a variety of parameters, such as minimum distance and delta time requirements. The controller utilizes these settings to minimize jitter and other undesirable data artifacts. As one example, when a touch is detected but is not moved beyond a distance threshold, no data is sent from the controller.

It should be noted that a single touch may come in contact with multiple keys, either at rest or when in motion. This type of contact is accommodated in some of the real-time message formats, and as such the user can slide one or more fingers in the gaps between the keys and utilize such movement for any number of control purposes (e.g., scrolling, zooming, etc.), either in a horizontal or vertical orientation. For example, if the user slides a finger horizontally in the gap between the "JKL" and "UIO" rows, and that mapped rectangle (which includes only the lowest area of the "UIO" keys and the highest area of the "JKL" keys) is defined in the keyboard controller as a slide controller area, the event generated by the keyboard controller contains the identification of the particular slide controller, and a value representing the position of the touch x and y coordinates with the prescribed rectangle. In some embodiments, minimum maximum and scale values may be sent to the keyboard controller so that flicks, touches and slides result in an inertial scrolling type of value change. Multiple touches in the tracked area may generate multiple simultaneous values, or additional touches may modify the inertial rate of value change when multiple fingers are used. Multiple touches in a single scrolling zone may also switch the parameter(s) being modified (e.g., one touch scrolls horizontally, and two touches scroll vertically). As a comparison, when the same area of the keyboard is touched and a slide area has not been defined, individual keys send touch data simultaneously. In other words, when individual (rather than global) key tracking is active, a single finger touching the bottom of the "U" key and the top of the "J" key produces two discrete touch events, even though the touch identification will be same since the same finger generated the touches.

i. Graphical Position Indicators

In some embodiments, the touch sensitive keys are used in conjunction with a set of graphical position indicators that are displayed over the graphical keys of the KEI viewer. In real-time, the graphical position indicators mirror the user's finger placement, angle, and movement from the touch sensitive keyboard keys to the graphical keys of the KEI viewer.

In a preferred embodiment, each graphical finger depiction is rendered semi-transparently with a clear area at the focal point, which enables the user to clearly view the symbols and widgets beneath. This is in contrast to the physical keys where the printed symbols may be obscured by the fingers, especially those keys that the user is already touching. Rather than lifting the hands and looking down, the user can leave the fingers in place, maintain focus on the screen, and still have confidence in their actions. This facilitates users overcoming a long-standing and very inefficient "hunt-and-peck" typing style.

This same benefit is realized when invoking output actions rather than typing, since the graphical position indicators allow users to visualize their finger positions relative to the symbols and widgets that are displayed over the graphical keys of the KEI viewer, without regard to the typing symbols (e.g., "A", "S", "D", "F"). Users can therefore identify the finger movement needed to invoke an output action and be confident of their selection, because the KEI viewer always displays symbols and widgets that are relevant for the current application, key focus and state.

Figure 16:
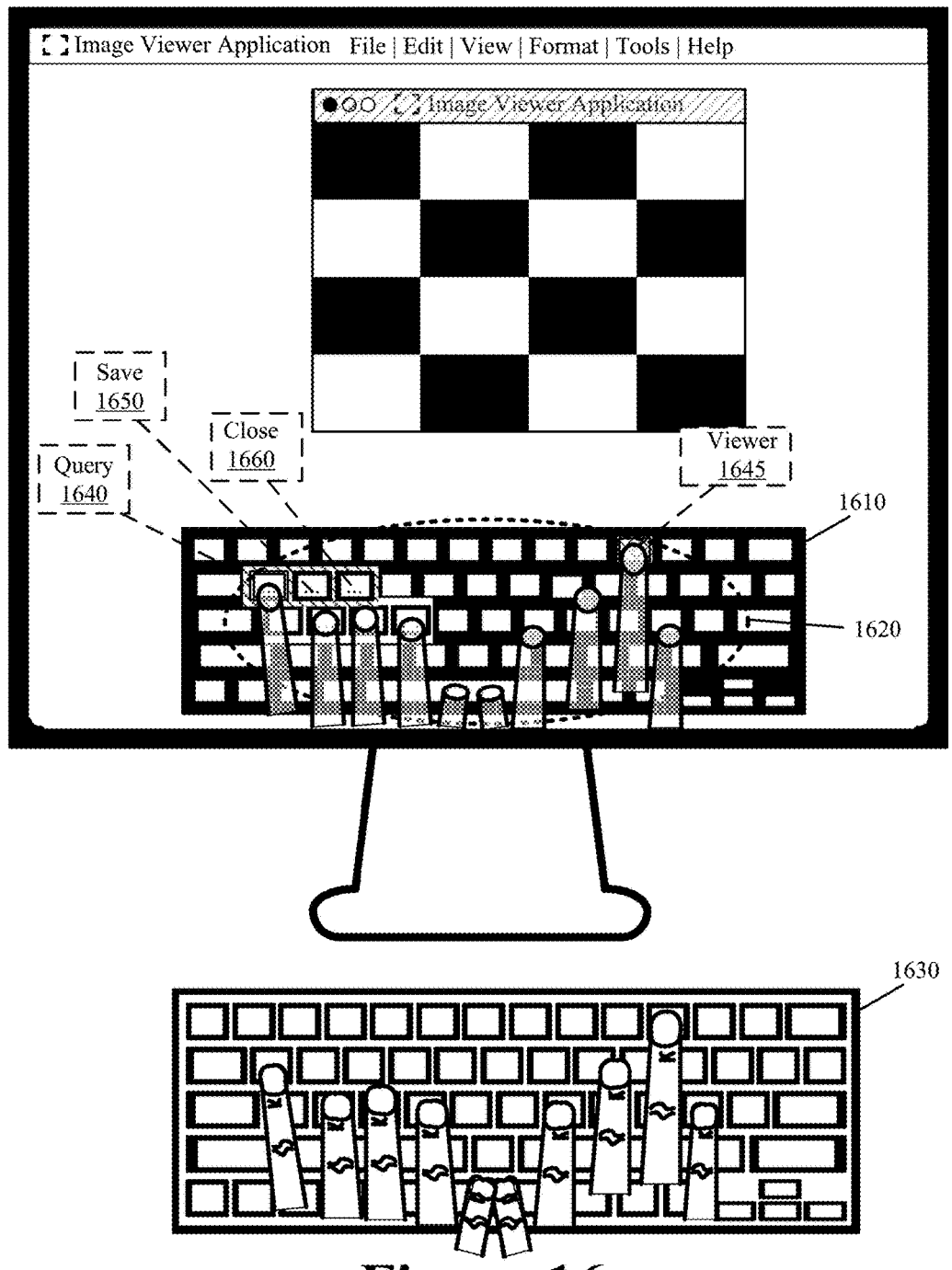
FIG. 16 illustrates the graphical position indicators of some embodiments in accordance with the enhanced touch sensitive keyboard of some embodiments.

FIG. 16 illustrates the graphical position indicators of some embodiments in accordance with the enhanced touch sensitive keyboard of some embodiments. In FIG. 16, the KEI viewer 1610 displays a set of symbols and graphical position indicators 1620 over the graphical keys of the KEI viewer 1610.

The graphical position indicators 1620 include a set of digits that resemble a user's fingers. The graphical position indicators 1620 mirror the user's finger placement, angling, and movement on the touch sensitive enhanced keyboard 1630 over the graphical keys of the KEI viewer 1610.

To perform the mirroring, the KEI viewer 1610 monitors in real-time user touches over the touch sensitive keys of the keyboard 1630. The KEI viewer 1610 processes the detected touches to determine which fingers are on which keys, the angle with which the keys are touched, and which fingers move from one key to another.

In some embodiments, the hand determination (e.g., right or left hand) is made based on which keys are touched and the relative distance between the touches and keys. The keyboard keys that are adjacent to the "A", "S", "D", and "F" home keyboard keys are normally touched by the fingers of the left hand and the keyboard keys that are adjacent to the "J", "K", "L", and ";" home keyboard keys are touched by the fingers of the right hand.

The KEI viewer adjusts the angle of the position indicators 1620 based on which sensors are being touched. To do so, the KEI viewer analyzes a mathematical model of palm/hand/finger geometry relative to the touched sensors in order to determine the angle of the position indicators 1620. The finger placement is then displayed over the graphical keys of the KEI viewer 1610 by the graphical position indicators 1620.

The KEI viewer 1610 mirrors finger movement over the touch sensitive keys by animating the position indicators 1620. Finger movements are animated by following the touch progression from the touch sensors of one key to the touch sensors of another. The touch progression includes initially sensing touch at a first key, losing the touch at the first key when the user raises the finger off of the first key, and sensing a touch on a second key. In some cases the user may slide between keys and there may be periods where two or more keys are simultaneously in contact with the same touch.

When there is a rapid succession of finger movements, the logic determines which finger moves to which key by monitoring the distance between a loss of touch on one key and a sense of touch on another. For example, when the fingers are located over the home keys (e.g., over the "A", "S", "D", "F", "J", "K", "L", and ";" keys) and touch is lost on the "L" and ";" keys followed by a detected touch on the "0" key, the logic determines that the ring finger of the right hand and not the pinky finger of the right hand is the finger that performs the touch on the "0" key. The logic determines that the ring finger is the most common finger used to perform the touch of the "0" key from the default home position. Once the determination is made, the corresponding animation of the graphical position indicators 1620 is shown on the KEI viewer 1610.

In some embodiments, the KEI viewer further animates the graphical position indicators by sliding one or both hands off the KEI viewer when the user's hands are removed from the keyboard, such as when the user operates a mouse or other input device. When the fingers return to the keyboard, the KEI viewer mirrors the repositioning of the hand over the keys using the graphical position indicators.

From the graphical position indicators 1620 of FIG. 16, the user is able to quickly identify that the user's fingers are directly atop the keyboard keys that invoke the output actions that are identified by the symbols 1640 and 1645. Additionally, the graphical position indicators 1620 identify that additional output actions may be invoked using the keys that are directly above the middle finger and the ring finger of the user's left hand (e.g., symbols 1650 and 1660). By orienting the user's fingers relative to the graphical position indicators, the user does not need to know which key has to be pressed in order to invoke an output action. Rather, the user identifies a movement from a current position. Accordingly, the user is able to more quickly invoke various output actions.

The graphical position indicators 1620 may be turned on and off by the user. In some embodiments, the graphical position indicators 1620 may be turned on and off by oscillating finger positions over a set of touch sensitive keys. Alternatively, the KEI system may automatically turn on and off the graphical position indicators 1620. For example, when the user's fingers are touching the home keys, the graphical position indicators 1620 are turned off. As the user's fingers move away from the home keys, the KEI system turns on the graphical position indicators 1620. This aids the user in locating keys that are at the periphery of the keyboard or are otherwise prone to mistyping. In some embodiments, settings within the KEI system specify when to turn on and off the graphical position indicators 1620 based on the active operational mode of the KEI system. For example, the graphical position indicators 1620 are displayed when a MOD operational mode is active and not displayed when the ABC operational mode is active. In some embodiments, the touch sensitive functionality can be used to control other functionality such as turning on, turning off, and resizing the KEI viewer by, for example, simultaneously sliding or flicking touches of either the left hand or the right hand at the home position keys in an up, down, left, or right direction. In some embodiments, an oscillating motion of the touch sensitive keys is sensed by the KEI engine and causes the KEI viewer to invoke. In some embodiments, an essentially simultaneous flick in an essentially upward direction causes the KEI viewer to invoke. Furthermore, in some embodiments, essentially simultaneous slides of four fingers in an essentially upward direction cause the KEI viewer to increase in size, and essentially simultaneous slides or flicks in an essentially downward direction cause the KEI viewer to decrease in size.

Figure 17:
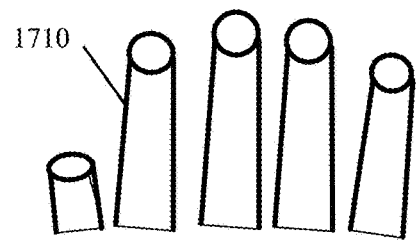
FIG. 17 illustrates four different graphical position indicators that are used to distinguish between different user actions in accordance with some embodiments.
Figure 17:
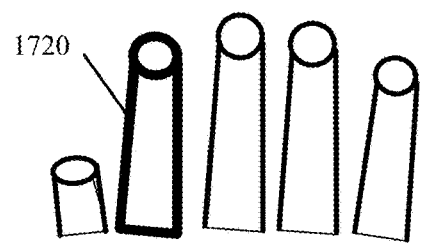
Figure 17:
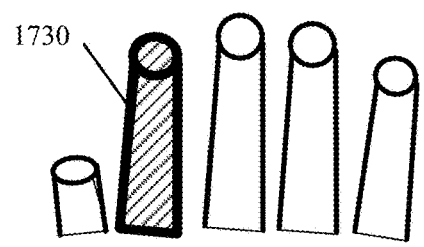
Figure 17:
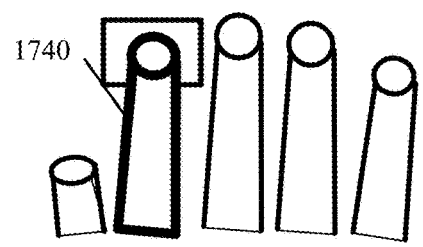

In some embodiments, the KEI viewer alters the display of the graphical position indicators in order to distinguish between (i) a user's finger that is in proximity to a key but that is not in contact with that key, (ii) a user's finger that is in contact with a key, (iii) a key press that invokes an output action, and (iv) a user's finger that is pressing down a key and an amount of pressure that is applied to that key. FIG. 17 illustrates four different graphical position indicators 1710, 1720, 1730, and 1740 that are used to distinguish between different user actions in accordance with some embodiments. The first graphical position indicator representation 1710 may be used to identify a user's finger that is in proximity to a keyboard key but that is not in contact with that key. The second graphical position indicator 1720 is depicted with bold outlining to identify a user's finger that is in contact with keyboard key. The third graphical position indicator 1730 contains various degrees of shading within the indicator to identify an amount of pressure that is being applied to a key that is pressed down. The fourth graphical position indicator 1740 is shown with a highlighted box to identify an output action that is invoked as a result of a key press.

In some embodiments, the graphical position indicators are displayed on the KEI viewer without the use of the touch sensitive keyboard. In some such embodiments, the mirroring of the set of digits is interpolated based on key events that are issued from a non-touch sensitive keyboard (i.e., a standard keyboard). Specifically, the KEI viewer identifies finger placement and movement from key presses and key releases. In this setting, additional animation techniques are also employed to compensate for the lack of touch data and simulate smoother graphical hand and finger movement.

In some such implementations, the graphical position indicators are initially shown over the graphical home keys of the KEI viewer. Once a new key event is received (e.g., a keyboard key is pressed or released), the KEI viewer logic performs the above described determination for which finger is likely to have moved from the current position to issue the key event. The graphical position indicators are then animated to show the determined finger movement.

In the following example, the graphical position indicators are initially displayed over the graphical home keys. When the "H" key is pressed on a non-touch sensitive keyboard, the KEI viewer logic determines that the index finger of the right hand is the proper finger for pressing the "H" key from the home key position. Accordingly, an animation is shown illustrating the movement of the graphical position indicator for the right hand index finger from the "J" key (i.e., home key position) to the "H" key. The animation occurs immediately after the user has performed the press of the "H" key. The graphical position indicator for the right hand index finger retains this position until the "H" key is released at which time, the right hand index finger returns to the "J" home key.

In some embodiments, the touch sensitive keys are illuminable. As described above, the touch sensitive keys illuminate to better identify which output actions may be invoked by which keys while simultaneously providing touch sensitive functionality.

ii. UI Element Control

Some embodiments adapt the touch sensitive keys to modify user interface (UI) elements such as graphical sliders, graphical rotary controls, and scroll bars. In some embodiments, the UI elements include the widgets that are displayed over the graphical keys of the KEI viewer. In some such embodiments, a touch gesture is applied over a particular touch sensitive key that modifies a widget that is displayed over the graphical key that corresponds to the particular touch sensitive key. In some other embodiments, the UI elements includes the symbols of the TEI viewer such that touches applied over the touch sensitive keys of the enhanced keyboard can be used to control and perform operations of the TEI system.

Figure 18:
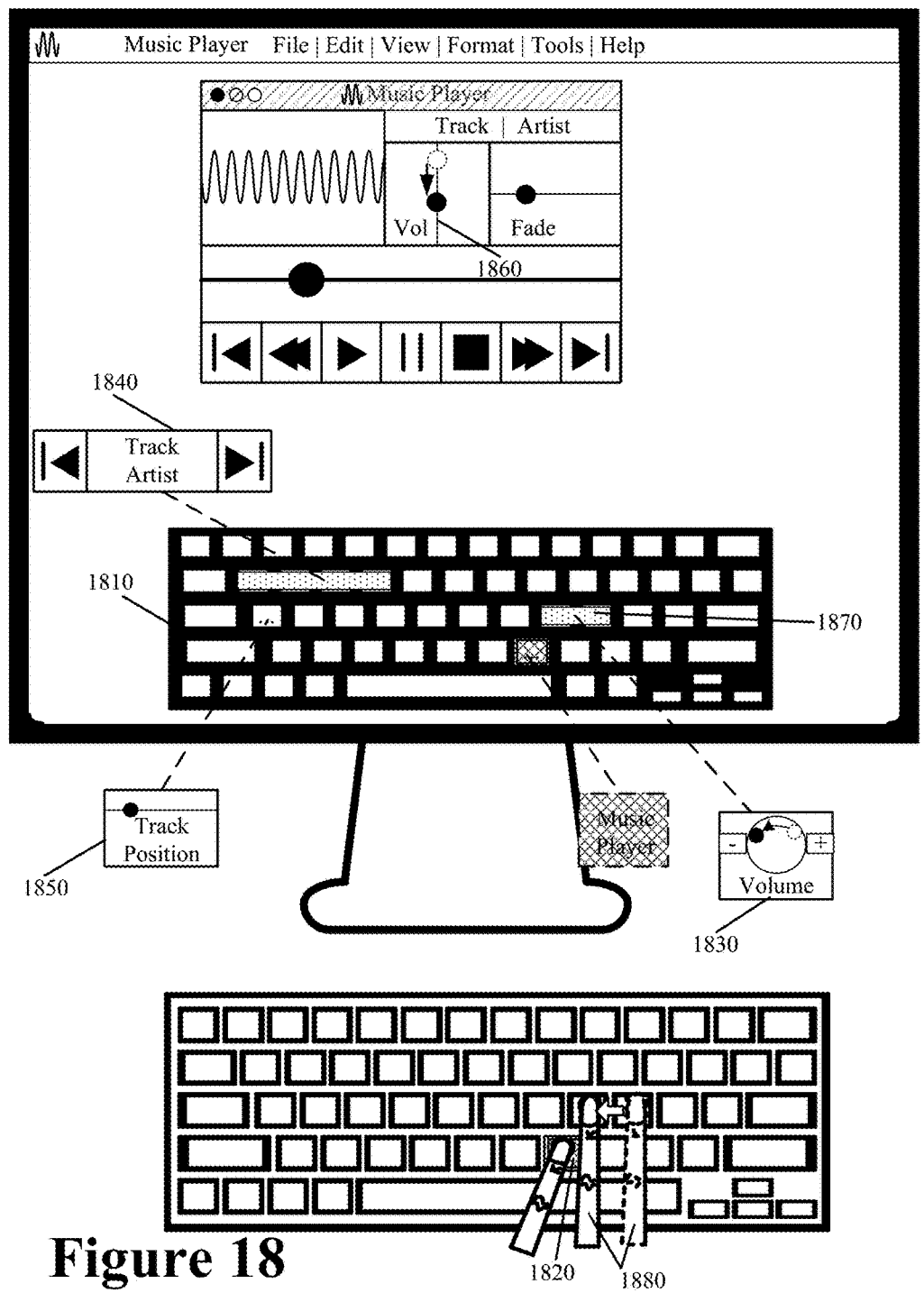
FIG. 18 illustrates using touch sensitive keys with the KEI engine and the KEI viewer to control a UI element in accordance with some embodiments.

FIG. 18 illustrates using touch sensitive keys with the KEI engine and the KEI viewer 1810 to control a UI element in accordance with some embodiments. In this figure, the "M" key on the keyboard 1820 is held down as denoted by the overlapping crossing lines. The holding of the "M" key causes the KEI engine to enter the MOD operational mode. The KEI viewer 1810 displays the symbols and widgets 1830-1850 for the output actions that may be invoked while the KEI engine is in the "M" key MOD operational mode.

In this figure, touch sensitive functionality is automatically enabled for a set of keyboard keys that can be used to invoke the output actions associated with the widgets 1830 and 1850 on-screen. Other keyboard keys may still sense and track touches, but the touches do not invoke any particular output actions when the KEI engine is in this particular operational mode. In some embodiments, the touch functionality for the other keys may be adapted for pointer movements as described below.

The widget 1830 is displayed over the "K" and "L" graphical keys 1870 of the KEI viewer 1810. Besides showing the current application volume, the widget 1830 allows a user to increase a unit of volume by tapping the "K" key and decrease a unit of volume by tapping the "L" key. Additionally, the widget 1830 includes a graphical rotary control that can be continuously modified (instead of incremental unit modifications) using touch sensing functionality. Accordingly, a user can modify the widget 1830 and the corresponding output action (i.e., volume adjustments) by sliding a finger over the "K" and "L" keys. The user can slide the user's finger 1880 over the "K" and "L" keyboard keys to the right to increase the volume and slide the user's finger 1880 to the left to decrease the volume.

In this figure, the user slides the user's finger 1880 to the left thereby decreasing the volume. The display of the widget 1830 is modified to indicate the decrease in volume. A similar change is made within the graphical volume slider 1860 of the application, because the widget 1830 provides control over the graphical volume slider 1860.

In some embodiments, the full range of the widget 1830 is accessible by a single finger slide over the "J" and "K" keyboard keys. For example, the user initiates a touch at a first location over the "J" key or the "K" key. The user then slides the user's finger to a second location over the "J" and "K" keys and retains the finger position at the second location. Such a movement causes the graphical slider of the widget 1830 to begin sliding. The graphical slider continues to slide so long as the user retains the finger position at the second location. When the user removes the finger, the sliding halts.

In some embodiments, sliding a finger over both of the "K" and "L" keys modifies the widget 1830 and thereby modifies the volume by some amount that is less than the full range of the widget 1830. In some such embodiments, repeated touch gestures may be used to access the full range of the widget 1830.

Different touch gestures may be used to provide different means with which to access the full range of the widget 1830. For example, a finger flick (i.e., touch followed by an accelerated movement of the finger and an immediate release of the touch) may cause the widget to move to the end of the range, whereas a slow gradual movement over the key(s) produces a gradual movement across the range. The flick can also be used to emulate inertial scrolling techniques, wherein a flick causes a value to continue to change for some time period after a touch is released. A user can halt the changing of the value at any time by issuing a touch on the same one or more keys on which the flick originated. As would be apparent to one of ordinary skill in the art, this is consistent with existing implementations of inertial scrolling techniques.

Figure 19:
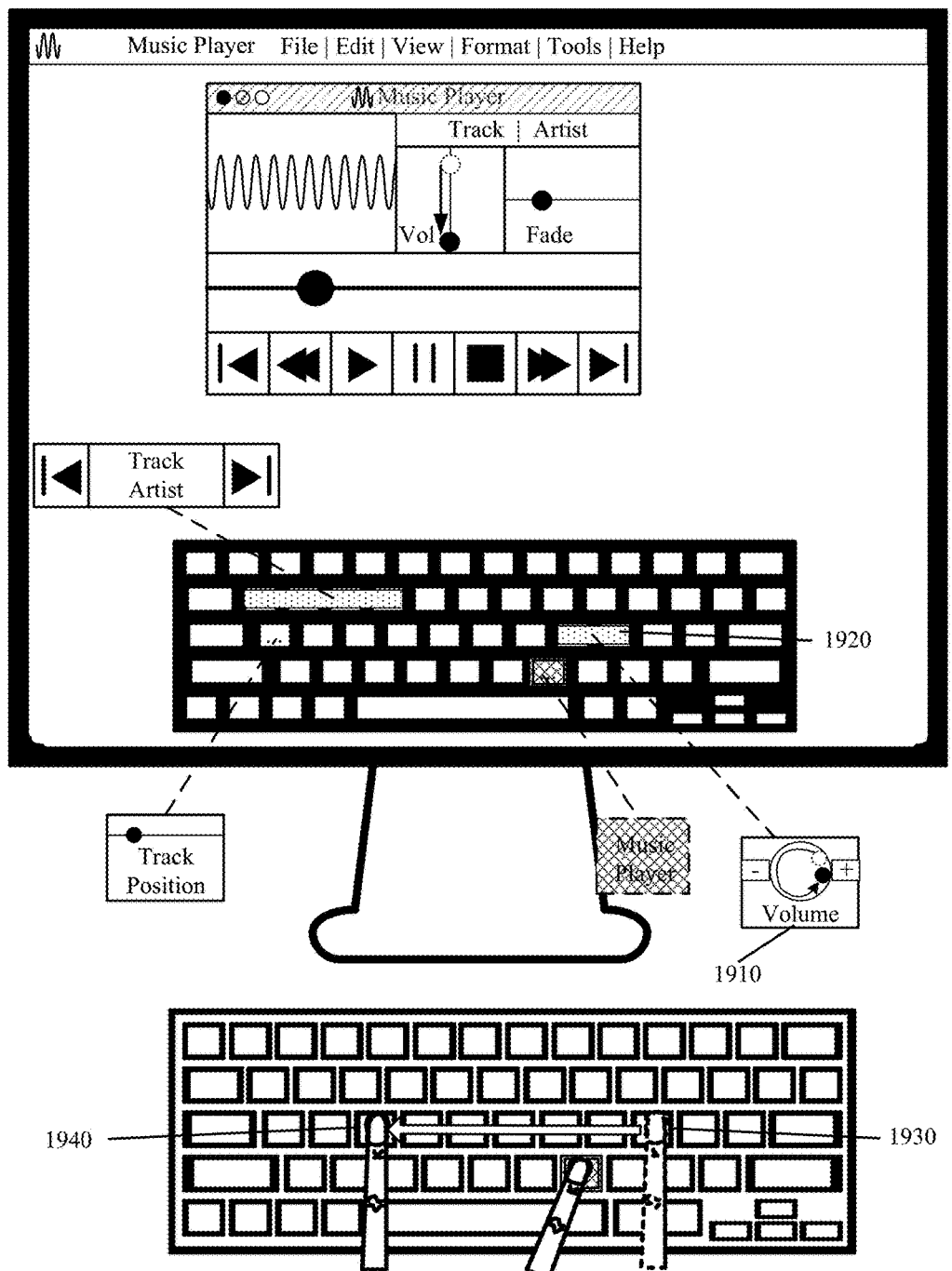
FIG. 19 illustrates continuing a touch beyond the set of keys that are associated with a widget in accordance with some embodiments.

Some embodiments track a touch beyond the set of keys that are associated with the widget 1830 in order to access the widget's 1830 full range. FIG. 19 illustrates continuing a touch beyond the set of keys that are associated with a widget in accordance with some embodiments. In this figure, as in FIG. 18 above, the graphical rotary volume control of the widget 1910 is displayed over the "K" and "L" graphical keys 1920 of the KEI viewer. However, the full range of the widget 1910 is accessible by extending a touch beyond the "K" and "L" keyboard keys.

The user begins the touch over either of the "K" and "L" keys that are associated with the widget 1910. In this figure, the touch begins over the "L" key 1930. In so doing, the KEI engine knows to process the touch in conjunction with the widget 1910.

The touch continues horizontally until the "D" keyboard key 1940. The touch is detected over all the keys that are in between the "D" keyboard key and the "L" keyboard key (e.g., "K", "J", "H", "G", and "F" keys). The KEI engine translates the touch into one continuous modification of the widget 1910 whereby the full range of the widget 1910 is accessed.

Figure 20:
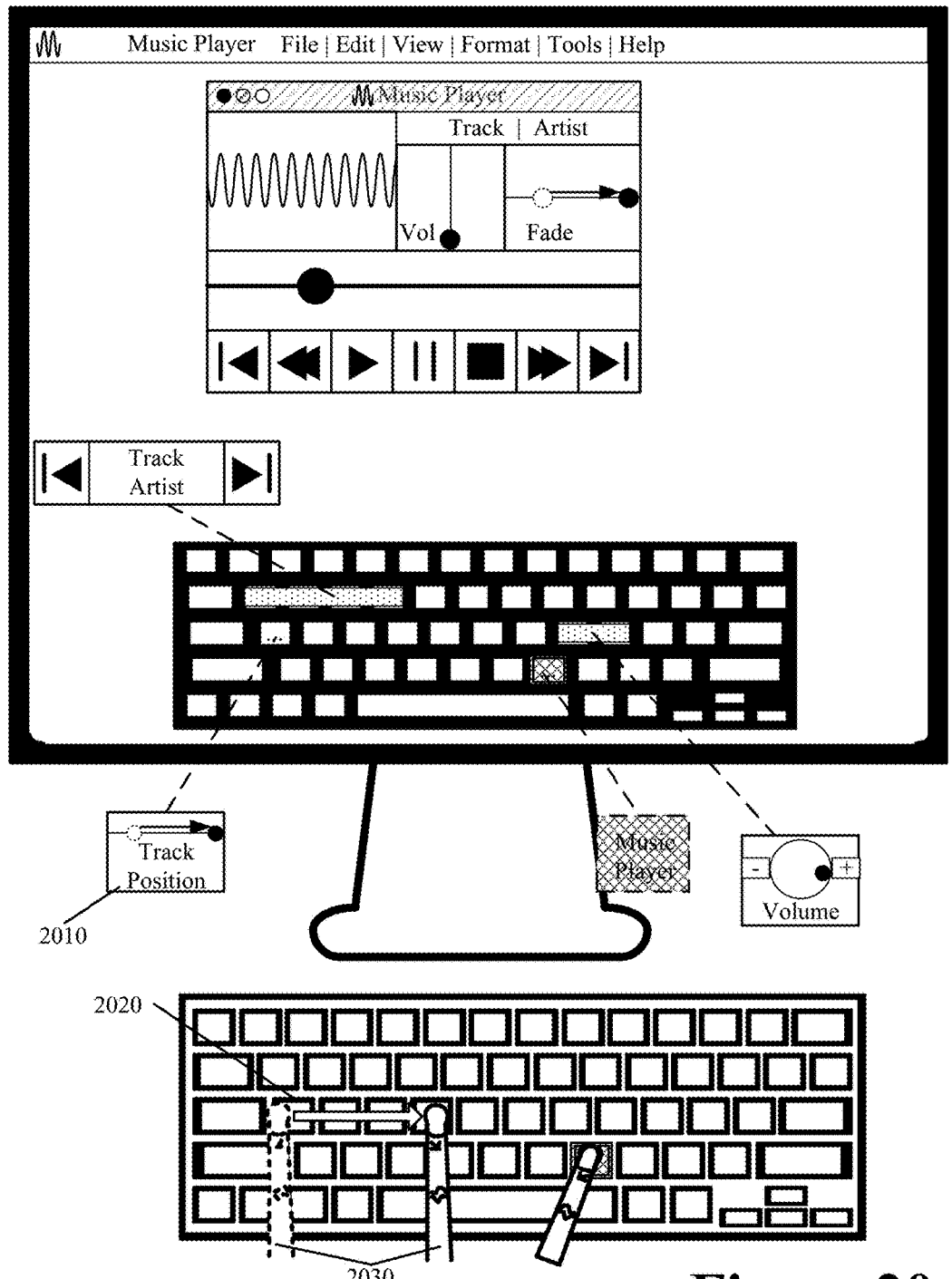
FIG. 20 illustrates modifying a track position widget using a set of keys that were used to modify the volume widget in FIG. 19.

In this manner, one or more of the same touch sensitive keys may be used to modify different output actions or widgets provided that the user's touch is initiated at different keyboard keys. FIG. 20 illustrates modifying the track position widget 2010 using a set of keys that were used to modify the volume widget in FIG. 19. As shown, the track position widget 2010 is displayed over the "A" graphical key. Therefore, to adjust the track position widget 2010 to the right, the user begins a touch 2030 over the "A" keyboard key 2020 and slides the touch 2030 to the right. In this figure, the touch 2030 spans the "S", "D", and "F" keys where the "D" and "F" keys were used in the previous figure to modify the volume widget when the touch began at the "L" key.

Figure 21:
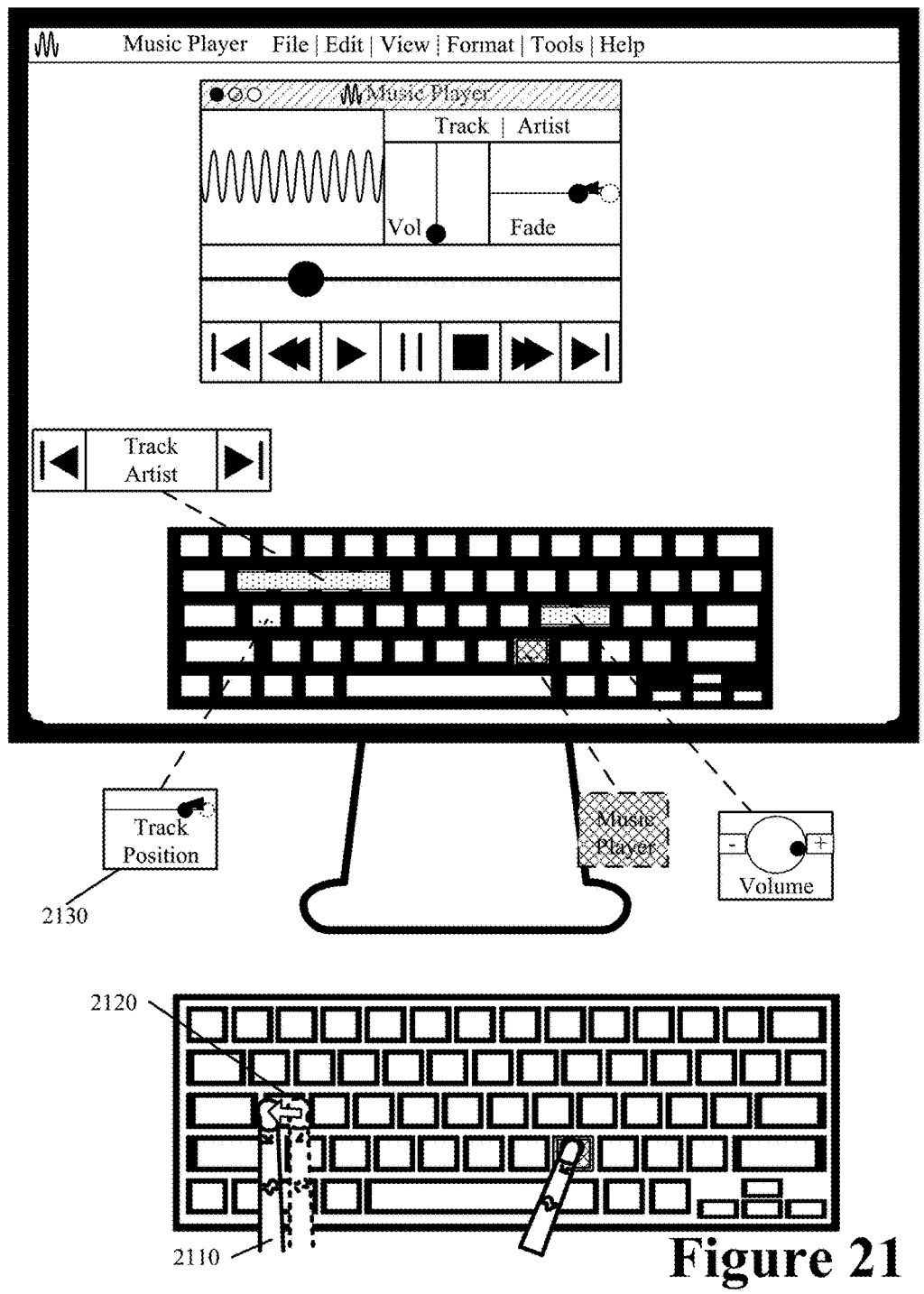
FIG. 21 illustrates adjusting a track position widget to the left by sliding a finger from right to left over the touch sensitive "A" key.

As one skilled in the art would understand in light of the present description, the track position widget 2010 can be adjusted by issuing a touch only over the "A" key. As shown in FIG. 21, the user adjusts the track position widget 2130 to the left by sliding finger 2110 from right to left over the touch sensitive "A" key 2120. The user could have extended the touch over the "shift" key that is adjacent to the "A" key to further adjust the track position widget 2130 to the left.

Figure 22:
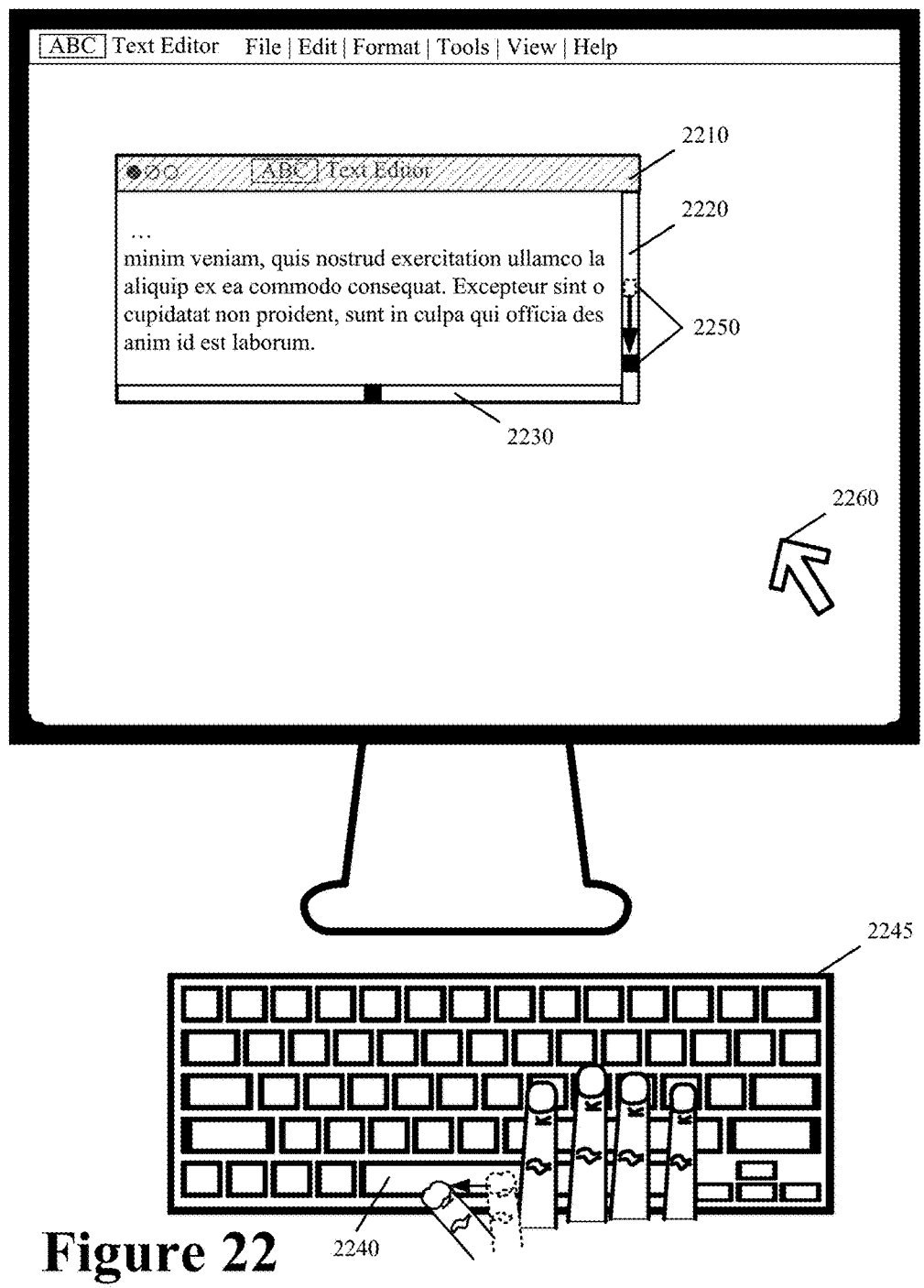
FIG. 22 illustrates performing scrolling within an application using a touch motion in accordance with some embodiments.

In some embodiments, the touch sensitive functionality is used independent of the KEI viewer and the KEI engine to directly control UI elements of an application. Accordingly, some embodiments adapt the touch sensitive keys to perform application specific functions. In some such embodiments, application developers provide event handlers that process the touch events that are produced from applying a touch over the keys to application specific functionality. FIG. 22 illustrates performing scrolling within an application using a touch motion in accordance with some embodiments.

In this figure, application 2210 is frontmost and the application 2210 includes a vertical scrollbar 2220 and a horizontal scrollbar 2230. When the user performs a left slide of the thumb over the spacebar 2240 of the touch sensitive keyboard 2245, a downward scroll 2250 (i.e., vertical scroll) is performed. To perform an upward scroll, the user slides the thumb in the opposite direction over the spacebar 2240.

Figure 23:
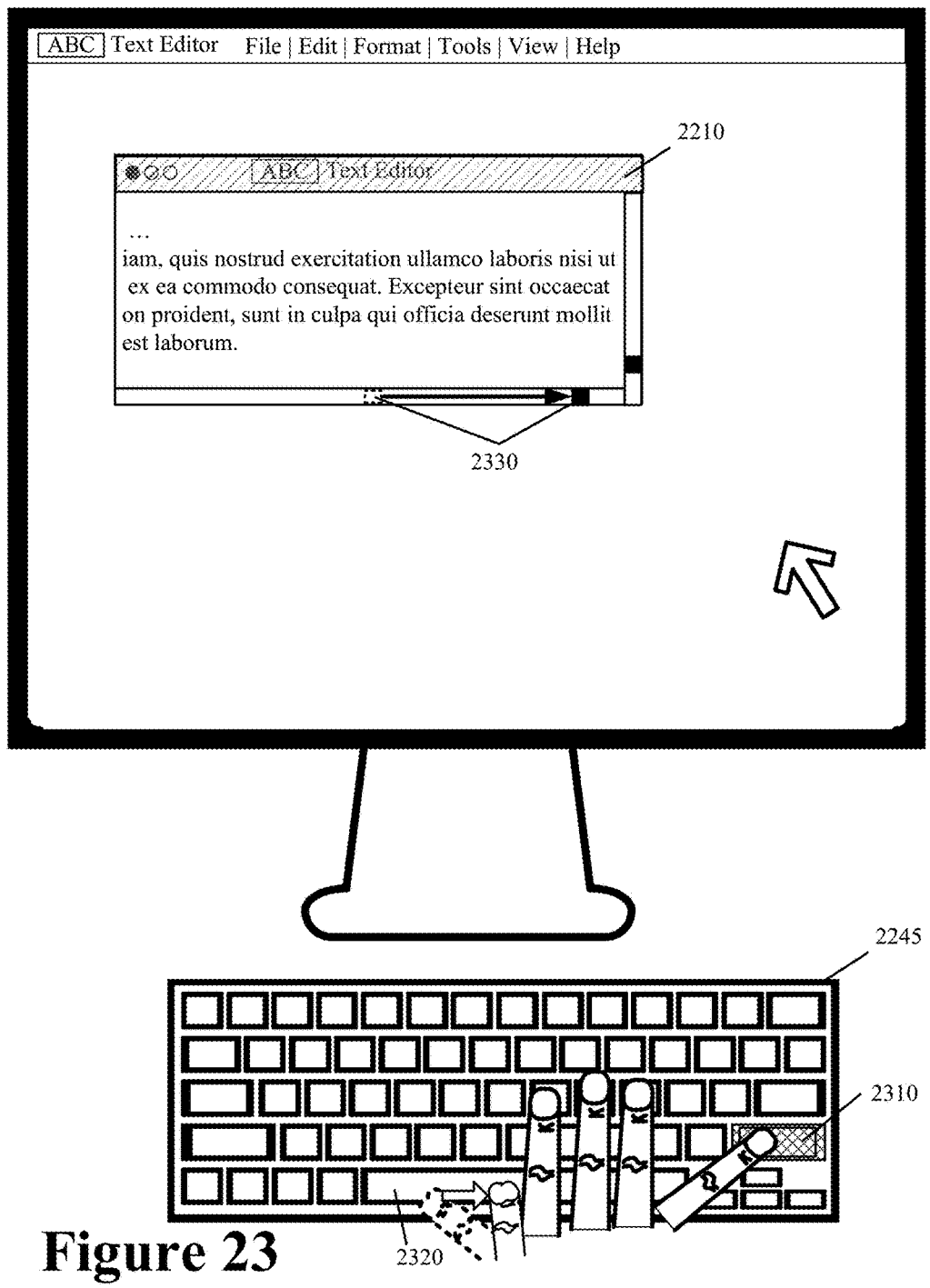
FIG. 23 illustrates holding down a particular key that enables horizontal scrolling instead of vertical scrolling when sliding a finger over the spacebar.

In FIG. 23, holding down a particular key 2310 enables horizontal scrolling instead of vertical scrolling when sliding a finger over the spacebar 2320. As shown, a right thumb slide over the spacebar 2320 performs a rightward scroll 2330 (i.e., horizontal scroll) when the particular key 2310 is held down. A left thumb slide over the spacebar 2320 can be used to perform a leftward scroll when the particular key 2310 is held down. In some embodiments, separate touch sensitive keys may be used to perform vertical and horizontal scrolling and other keys besides the spacebar may be adapted to perform scrolling functionality.

In some embodiments, software associated with the enhanced keyboard detects that the mouse pointer is over a UI element of particular application. The software may include the KEI system, event handlers of the OS, or event handlers of the particular application. The software automatically adapts the touch gesture performed on the spacebar 2240 or 2320 to provide scrolling for the particular application. When the mouse pointer moves over a second different application, the spacebar is used to control scrolling for the second application.

Figure 24:
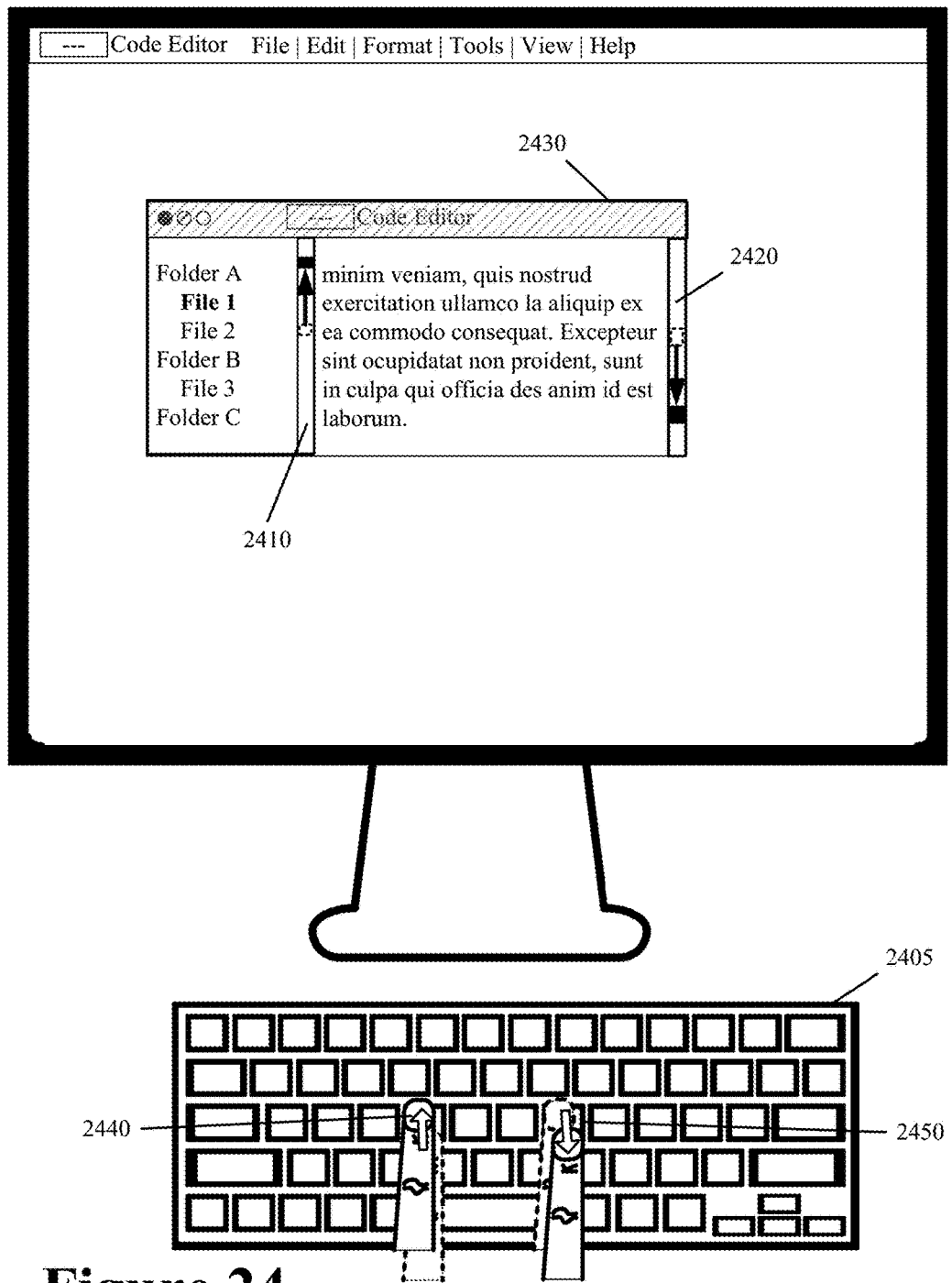
FIG. 24 illustrates adapting the touch sensitive keyboard of some embodiments to perform scrolling in different scroll areas of an application using different keys.

In some embodiments, scrolling within different scroll areas of an application is controllable using different touch sensitive keys. FIG. 24 illustrates adapting the touch sensitive keyboard 2405 of some embodiments to perform scrolling in different scroll areas 2410 and 2420 of an application 2430 using different keys. As shown, a first touch sensitive key 2440 performs scrolling within the first scroll area 2410 of the application 2430 and a second touch sensitive key 2450 performs scrolling within the second scroll area 2420 of the application 2430.

In some embodiments, software associated with the touch sensitive keyboard of some embodiments distinguishes touches from typing so that the above described output actions are not invoked when typing. To distinguish a touch from typing, the software uses a small delay to detect whether a key is pressed in conjunction with a touch or whether there is no key press associated with the touch. For example, if a key is not pressed within 100 milliseconds (ms) of the key being touched, then the touch event is issued. However, if the key is pressed within 100 ms, then the output action is not sent.

iii. Touch Gestures

In some embodiments, the touch sensitive keys can be used to issue various gestures. The touch gestures may be specified within the OS or a process that operates in conjunction with the touch sensitive keyboard of some embodiments. Such touch gestures includes drag, expand, contract, rotate, and swipe gestures as some examples. Applications can invoke different output actions in response to one or more of the touch gestures.

In some such embodiments, the OS or a process that operates in conjunction with the enhanced keyboard processes the touch events that are produced by the touch sensitive keyboard. The touch events are processed to determine whether a touch gesture was issued. Specifically, the motion, angle, direction, and number of touches are analyzed to determine whether a touch gesture was issued.

When the touch events produce a touch gesture, the touch gesture is passed to the frontmost application. In some embodiments, the frontmost application may include various output actions that are invoked in response the touch gesture.

Figure 25:
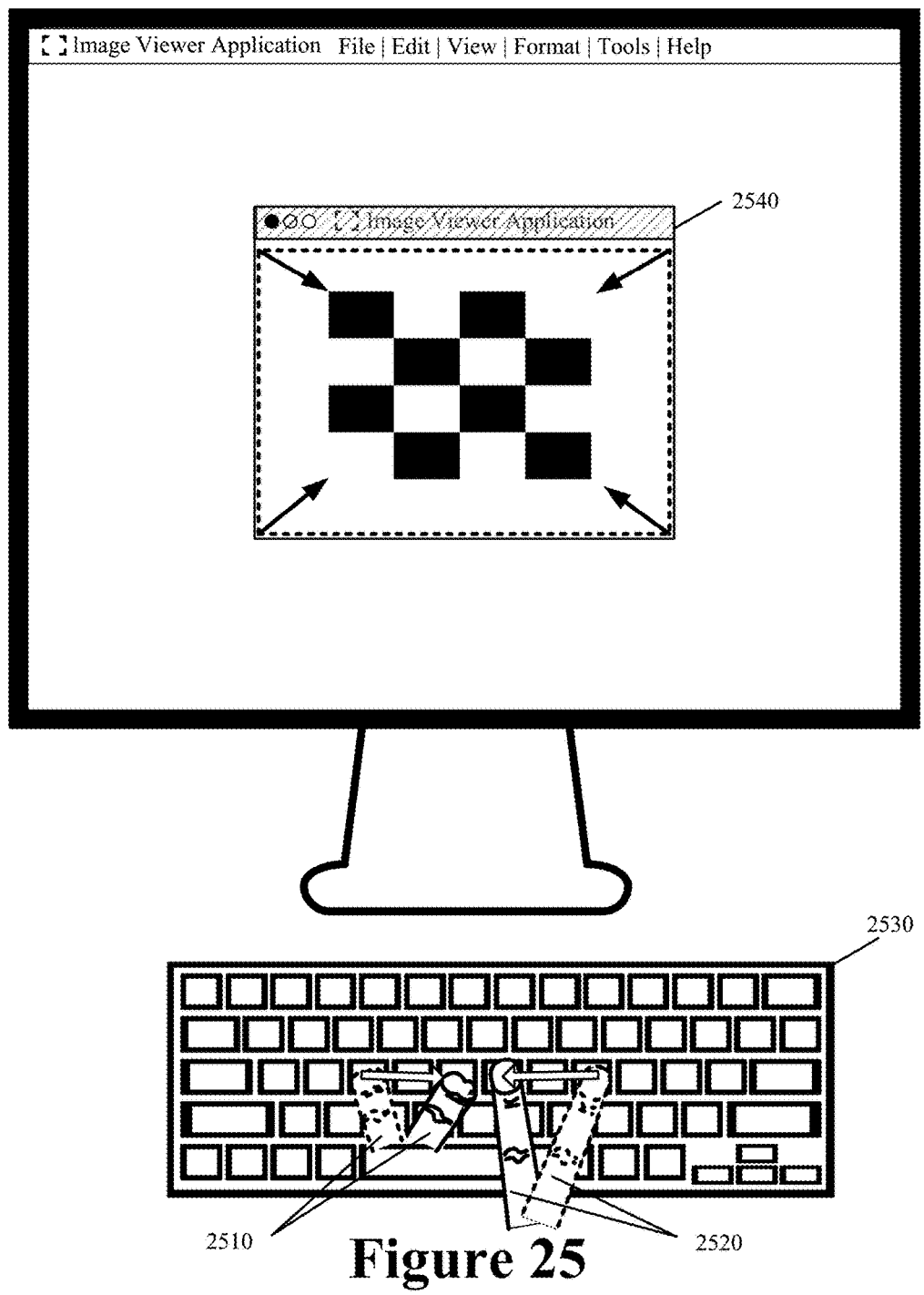
FIG. 25 illustrates adapting a touch gesture issued from a touch sensitive keyboard to invoke a particular output action in accordance with some embodiments.

FIG. 25 illustrates adapting a touch gesture issued from a touch sensitive keyboard to invoke a particular output action in accordance with some embodiments. In this figure, the user issues a contract gesture by sliding a thumb 2510 and a finger 2520 towards each other over the touch sensitive keys of the enhanced keyboard 2530. The keyboard 2530 detects the two separate touches and passes them to the OS. The touches are analyzed to determine whether the touches satisfy any of a predefined set of touch gestures. In this figure, the touches produce a contract gesture. Accordingly, the OS issues a contract gesture event to the frontmost application 2540 for processing.

The frontmost application 2540 can ignore the contract gesture event or perform a particular output action in response to the contract gesture event. As shown, the image in the application 2540 is shrunk in response to the contract gesture event.

iv. Trackpad Emulation

Some embodiments adapt the touch sensitive keys to emulate the operation of a trackpad for performing GUI navigation. Specifically, movement of one or more fingers over one or more of the touch sensitive keys translates to on-screen pointer movements. In some embodiments, the trackpad emulation is used in conjunction with the KEI system such that the user's hands no longer leave the keys of the enhanced keyboard when performing on-screen pointer movements, invoking output actions, and inserting text. In some embodiments, trackpad emulation is provided by any of the keyboard keys when the KEI engine is in the ABC operational mode, by any key that does not invoke an output action when other operational modes are active, or by any key when a particular function key is held down to enable the trackpad emulation.

In some embodiments, the touches that are detected over the touch sensitive keys are converted into mouse coordinate movements by the controller, keyboard device driver, OS, or other application (e.g., KEI system). The mouse coordinates are then converted to on-screen pointer movements.

Figure 26:
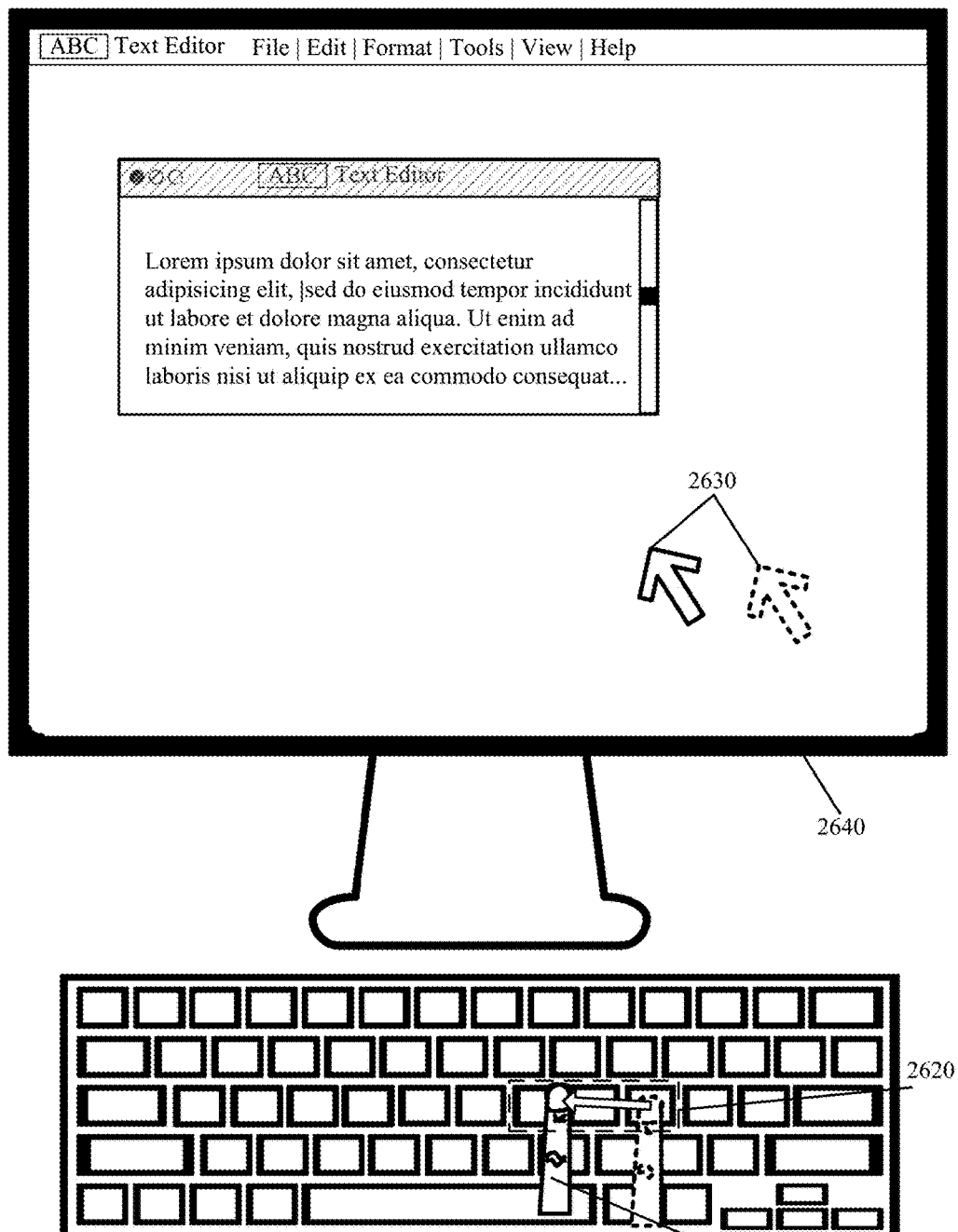
FIG. 26 illustrates controlling pointer movements using touch movements across the touch sensitive keys of the enhanced keyboard of some embodiments.

FIG. 26 illustrates controlling pointer movements using touch movements across the touch sensitive keys of the enhanced keyboard of some embodiments. As shown, the user's finger 2610 slides atop the touch sensitive keys 2620. The finger motion follows a horizontal path with a slight upwards motion at the last key. The finger motion produces the pointer motion 2630 shown in the graphical display 2640.

The distance of the pointer motion 2630 is determined by the distance the user's finger travels atop the touch sensitive keys. The greater the number of keys traversed, the greater the pointer motion. In some embodiments, there is a one to one correspondence between the distance of the physical touch movement and the distance of the on-screen pointer movement. In some other embodiments, there is a proportional correspondence (e.g., 1:2 correspondence) between the distance of the physical touch movement and the distance of the on-screen pointer movement. The proportional correspondence may be determined from the screen resolution. As one skilled in the art would understand in light of the present description, various response curves and accelerations can be used to correspond touch tracking keyboard keys to mouse pointer movements.

Figure 27:
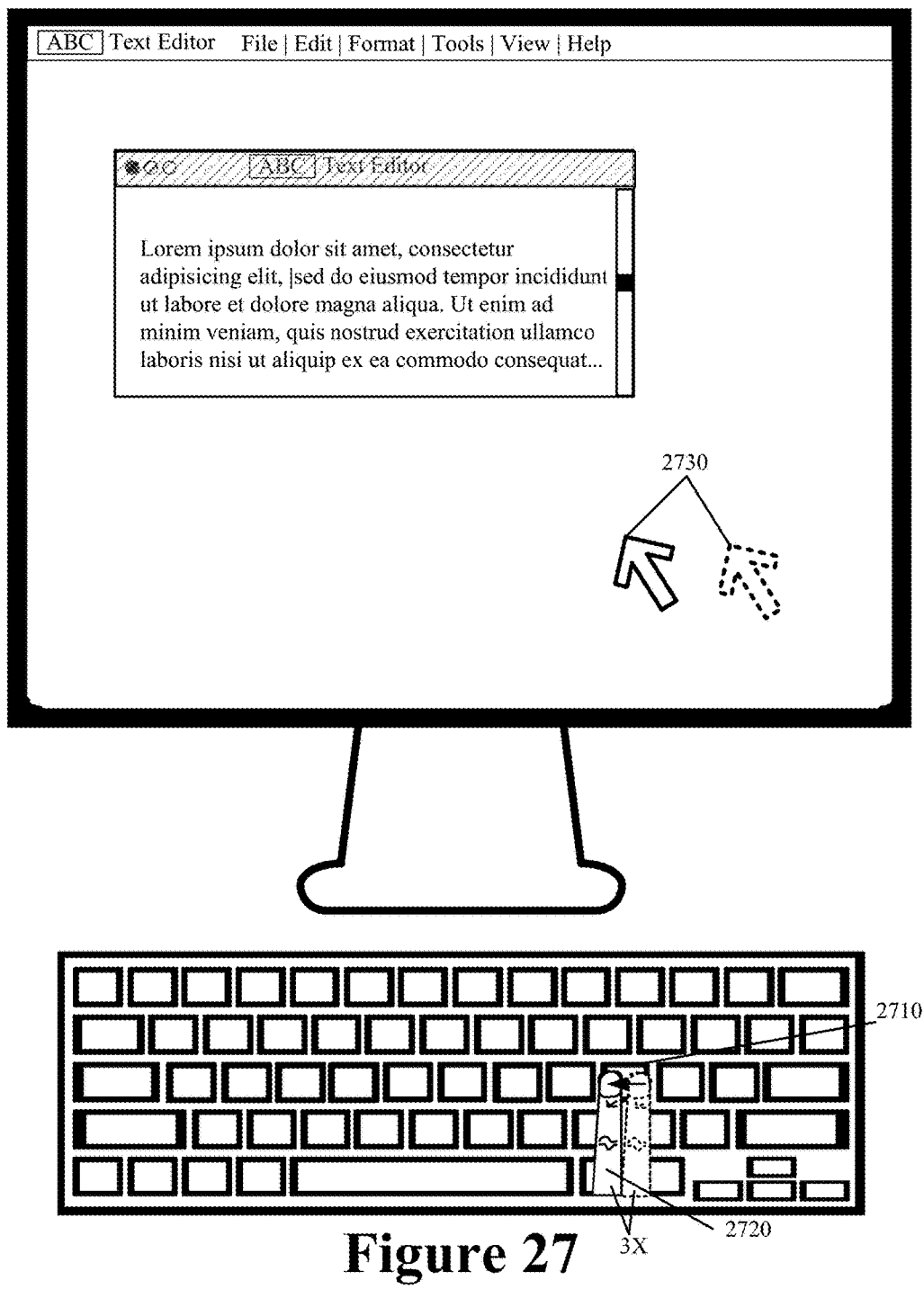
FIG. 27 illustrates controlling pointer movements using touch movements over a single key in accordance with some embodiments.

Furthermore, as one skilled in the art would understand in light of the present description, the same pointer motion 2630 of FIG. 26 is reproducible using a single touch sensitive key of the enhanced keyboard of some embodiments. FIG. 27 illustrates controlling pointer movements using touch movements over a single key in accordance with some embodiments. In FIG. 27, the user reproduces the pointer motion of FIG. 26 by issuing multiple touches over a single key 2710. Specifically, the user repeatedly slides the user's finger 2720 over the single key 2710 until the distance traveled by the pointer 2730 in the graphical display is that of the pointer motion 2630. Therefore, rather than slide a finger across three keys, the user slides the finger 2720 over the same key three times to reproduce the same pointer motion of FIG. 26.

Figure 28:
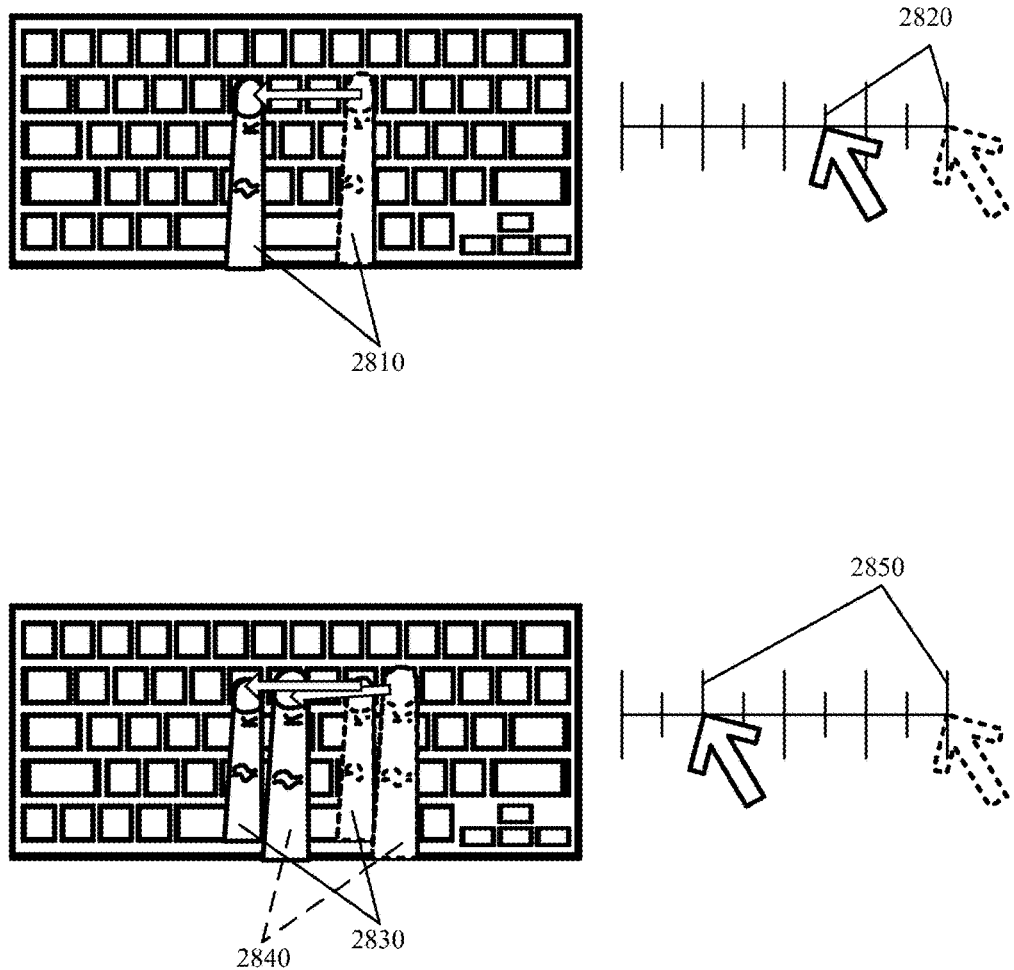
FIG. 28 illustrates using a finger slide over a particular number of touch sensitive keys to move a pointer a distance across the screen.

In some embodiments, the distance the pointer travels for each touch sensitive key that is traversed by the user's touch is variable based on the number of fingers that are used to perform the touch. As shown in FIG. 28, when the user slides one finger 2810 over a particular number of touch sensitive keys, the pointer travels a first distance 2820 across the screen. When the user simultaneously slides two fingers 2830 and 2840 over the same particular number of touch sensitive keys, the pointer travels a second distance 2850 across the screen where the second distance is greater than the first distance. In this manner, the user can traverse the screen quicker while on-the-fly adjusting the distance that the pointer moves for each touch sensitive key that is traversed.

Figure 29:
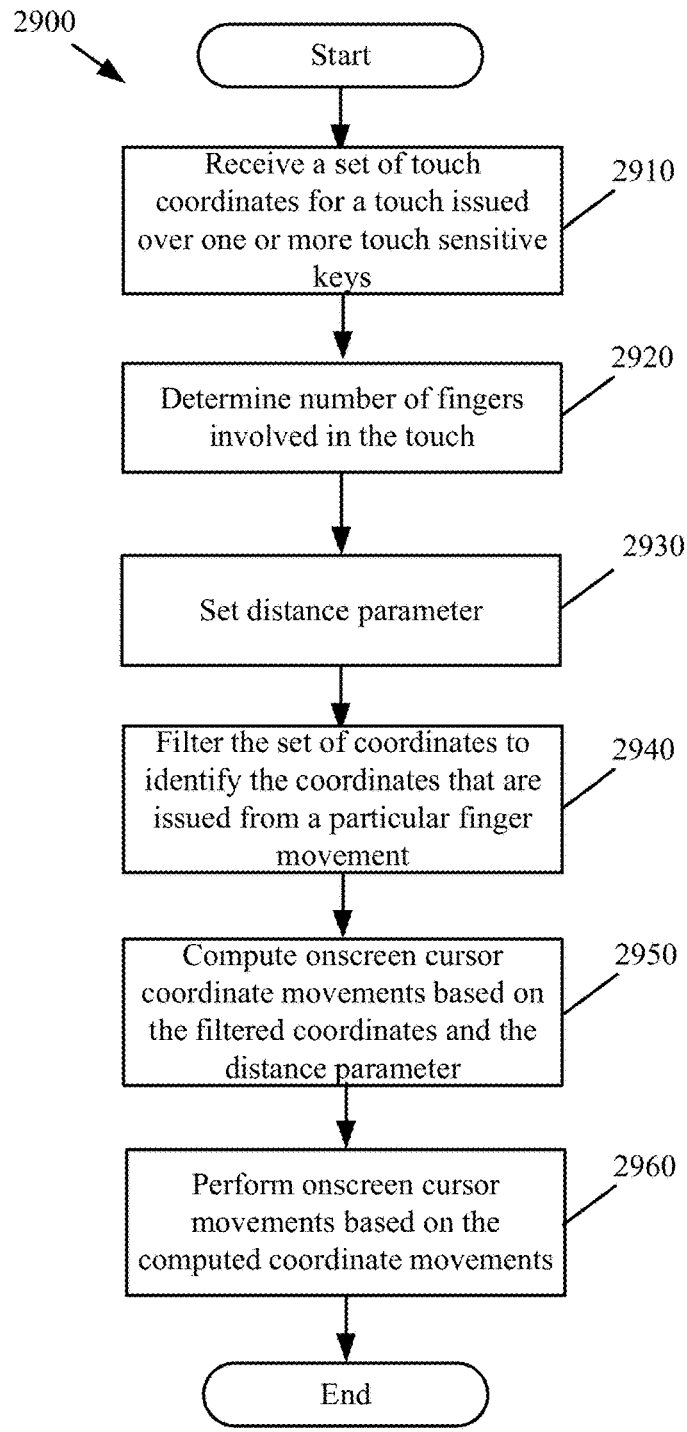
FIG. 29 presents a process for converting touches across the touch sensitive keys of the enhanced keyboard into on-screen pointer movements in accordance with some embodiments.

FIG. 29 presents a process 2900 for converting touches across the touch sensitive keys of the enhanced keyboard into on-screen pointer movements in accordance with some embodiments. In some embodiments, the process 2900 is performed by the OS or an application (e.g., KEI system).

The process 2900 begins when a set of touch coordinates are received (at 2910) from the touch sensitive keyboard. The process analyzes the coordinates to determine (at 2920) the number of fingers involved. For example, a single finger slide issues a continuous set of coordinates as the finger sliders over one or more keys. A two finger slide simultaneously issues coordinates from two different keys. When a first finger is placed on the "F" key and the second finger is placed on the "D" key and both fingers are slid, the controller issues coordinates for the first finger movement and the second finger movement. Accordingly, the process is able to determine the number of fingers involved in the touch based on the intermixed coordinates.

Based on the number of detected fingers, the process sets (at 2930) a distance parameter that controls the distance the on-screen pointer moves for each touch sensitive key that is traversed by the user issued touch. By using this parameter, the process can determine the on-screen pointer movement from a single set of coordinates while ignoring the coordinates that are issued by other fingers involved in the touch. Accordingly, the process filters (at 2940) the coordinates to identify the coordinates that are issued from a particular finger movement.

Next, the process computes (at 2950) on-screen pointer coordinate movements from the filtered coordinates and the distance parameter as described in FIG. 28 above. The process performs (at 2960) the on-screen pointer movements and the process ends.

Figure 30:
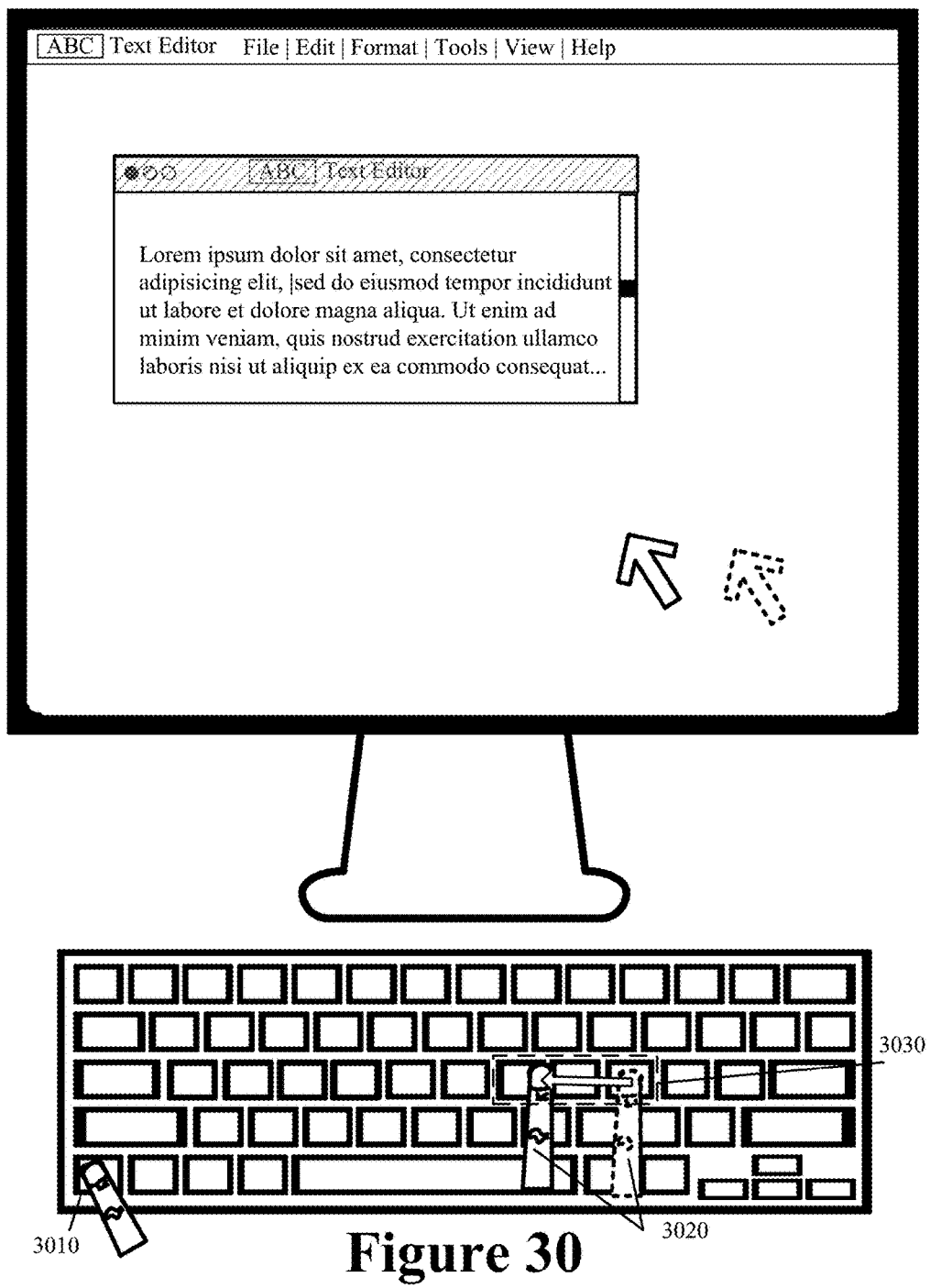
FIG. 30 illustrates using a hold of a function key with one finger to activate the trackpad emulation and slide another finger across keys to move the pointer on-screen.

In some embodiments, the trackpad emulation is functional at all times. In some other embodiments, the user may activate the trackpad emulation using a particular key press or touch on the enhanced keyboard. For example in FIG. 30, the user holds the function or flag key 3010 with one finger to activate the trackpad emulation and slides finger 3020 across keys 3030 to move the pointer on-screen. In this example, when the function or flag key 3010 is not held, sliding the finger 3020 across keys 3030 does not produce a pointer movement on-screen. In some other embodiments, holding down a first key activates clicking or dragging functionality using one or more second keys. For example, when the on-screen point is located over a particular UI element, the user can down press a first keyboard key to activate dragging functionality such that subsequently issued touches over a second key of the keyboard can be used to drag the particular UI element to a different on-screen location.

In some embodiments, different keys are used to activate different levels of trackpad functionality. Some embodiments designate certain keyboard keys, such as the space bar, to activate such functionality when the touch sensing capabilities of the keys are used to emulate trackpad functionality. Specifically, when the space bar is not pressed down and touches are applied over the space bar, a single finger touch is used to perform on-screen pointer movement and a two finger touch is used to perform scrolling. Then, when the space bar is pressed down or when one finger performs a stationary touch on the space bar, one or more other touches applied on the space bar are usable to perform operations that emulate trackpad button clicks, taps, or holds. For example, when the space bar is pressed down and a single finger performs a touch movement on the space bar, this action is used to perform a click and drag operation of whichever UI element the on-screen pointer hovers over. Specifically, pressing the space bar down selects or clicks the UI element and the subsequent movements can be used to adjust the position of the UI element on-screen or adjust a value within a range of values of the UI element (e.g., an indicator bar, scroll bar, radial slider, etc.).

Figure 31A:
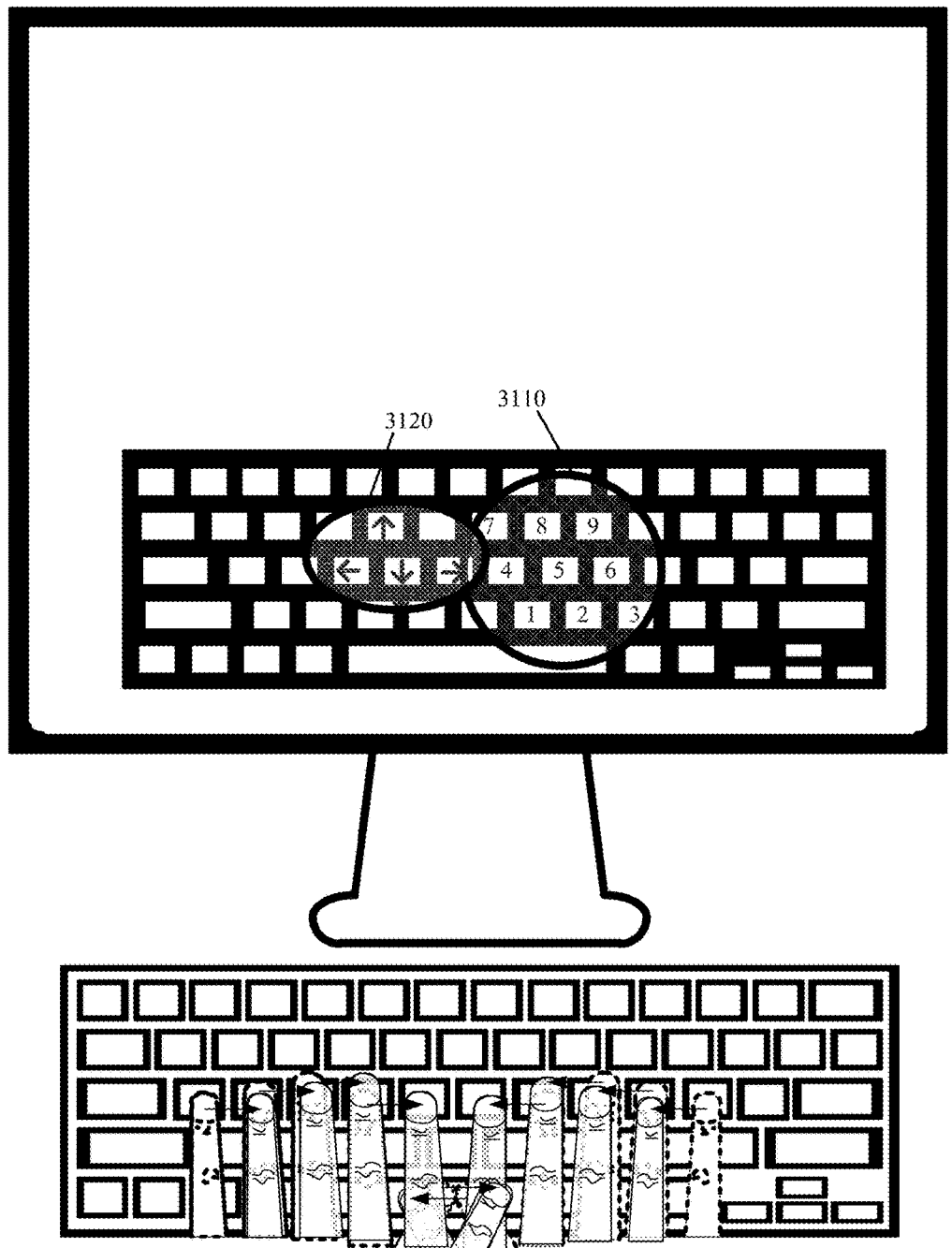
FIG. 31a illustrates sliding the touches of the right hand one key to the left and the touches of left hand one key to the right of the home positions in order to change the output actions for the surrounding keys.

In some embodiments, different touch actions are used to activate different functionality in the KEI system. In some such embodiments, when the user's hands are resting at the home position keys, sliding the touches of left hand one keyboard key to the right of the home position and sliding the touches of the right hand one keyboard key to the left of the home position enables access to a particular set of output actions that are identified by the KEI viewer. As shown in FIG. 31a, sliding the touches of the left and rights hands one key away from the home position, changes the output actions for the surrounding keys. Specifically, keyboard keys corresponding to the graphical keys over which the symbols 3110 are displayed can be used to invoke numeric keypad functionality and keyboard keys corresponding to the graphical keys over which the symbols 3120 are displayed can be used to perform directional arrow key functionality.

v. Gesture-secured Passwords

The KEI system can also leverage the touch sensitive keys of the present invention for the purposes of secure password generation and authentication. Typically, passwords are specified as a sequence of characters that may be comprised of letters, numbers, and symbols that are accessible from a standard keyboard. To make passwords more secure, the touch sensitive keys of the present invention in conjunction with the KEI system allow for passwords to be defined with a directional aspect associated with any or all of the characters. Specifically, instead of just pressing the "A" key to specify the character "a" as part of a password, the KEI system can detect and associate a downward, upward, leftward, or rightward directional modifier with the specification of the "a" character. This additional directional modifier makes passwords more secure, because knowledge of the password character sequence is not sufficient to obtain access to a password-protected item. The characters of the password must be repeated using the same directional modifiers that were used to initially define the gesture-secured password.

Figure 31B:
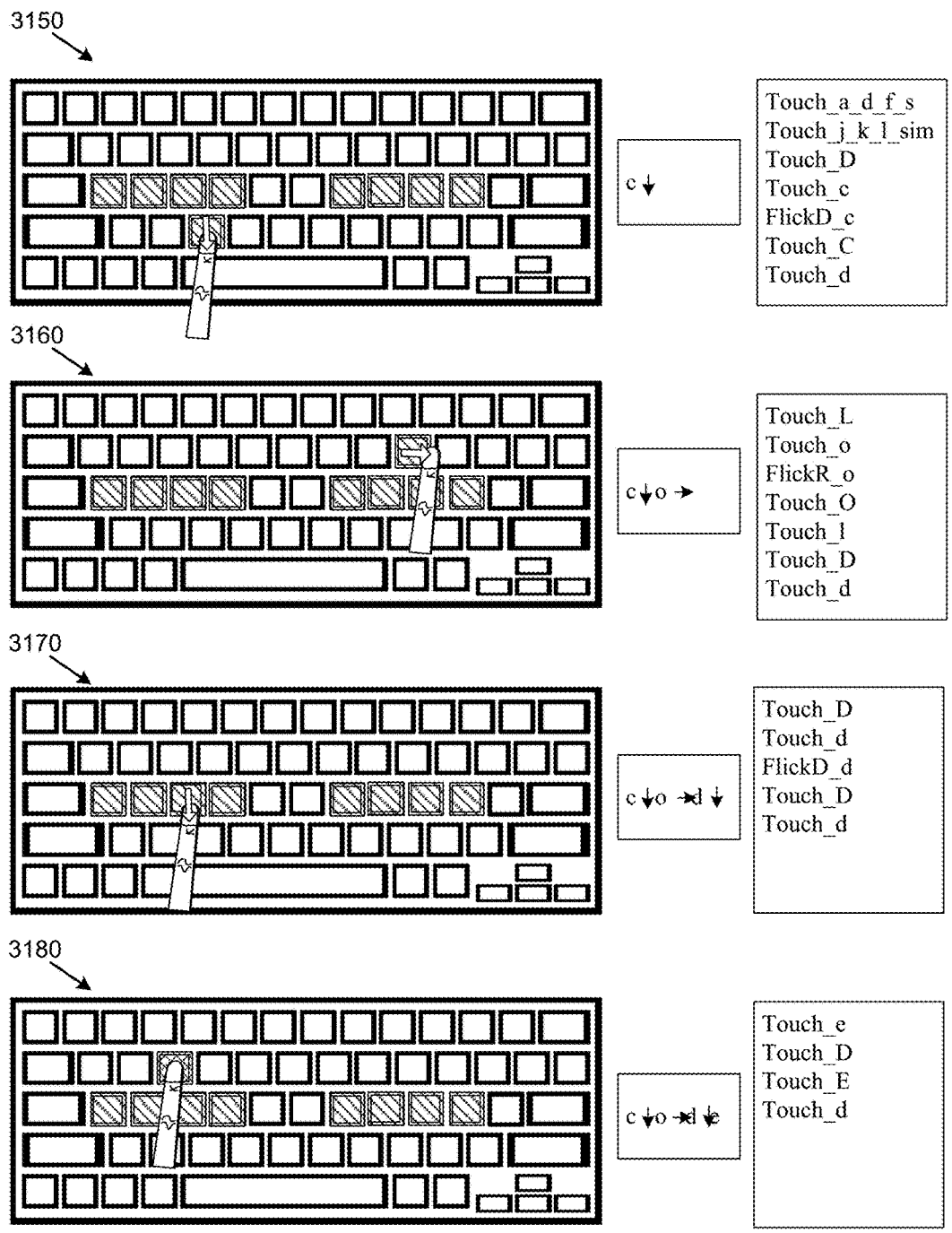
FIG. 31b illustrates defining a secure password using the functionality of touch sensitive keyboard and the KEI system in accordance with some embodiments.

FIG. 31b illustrates defining a gesture-secured password using the functionality of a touch sensitive keyboard as described above, and the KEI system in accordance with some embodiments. In this example, the user defines the four character password "code" with each character of the password being associated with a directional modifier. It should be noted that the textual representations depicted in FIG. 31b are shown as an ASCII representation for the sake of clarity. In practice, one skilled in the art would recognize that, in a password setting, the series of flicks, touches, taps, etc. that comprise the password is mathematically processed to create a hashed representation, which serves as the actual data used to determine authentication status. Especially in insecure environments, a hash chain is commonly used rather than a plain text password when authentication is transmitted to a remote web site for verification.

At 3150, the user defines the "c" character and the associated directional modifier for the password by performing a downward flick on the "C" touch sensitive keyboard key; at 3160, the user defines the "o" character and the associated directional modifier for the password by performing a rightward flick on the "O" touch sensitive keyboard key; at 3170, the user defines the "d" character and the associated directional modifier for the password by performing a downward flick on the "D" touch sensitive keyboard key; and at 3180, the user defines the "e" character without a directional modifier by tapping the "E" touch sensitive keyboard key. Assuming this password is used to lock a device, the device cannot be unlocked by the user simply typing the word "code" into a password entry field. Instead, the user must repeat the same sequence of flicks over the same sequence of characters in order to successfully enter the password and unlock the device.

In some embodiments, touch data other than the flicks described above are used in combination with gesture-secured passwords. For example, a password may be considered valid only if the user is touching (or not touching) certain keys of the touch sensitive keyboard in a manner similar to that described with reference to FIG. 30a above. In this case, the user may enter a password with the right hand, while sliding the home position of the left hand down to the "zxcv" keys, for example. These resting touches would be required when the user seeks to later use the password to successfully authenticate. The KEI system accomplishes this by, in some embodiments, considering the real-time data of the touch device as part of the password hash. Such real-time data can be seen on the right side of FIG. 31b.

vi. Time-secured Passwords

Existing password verification is based upon a system confirming only that a particular sequence of characters entered by a user matches a previously specified sequence of characters comprising a stored password. Because no other characteristics further qualify the password, a sufficiently complex series of characters must be used to gain a minimally acceptable level of security. Such complexity unacceptably increases the memory burden on the user, or encourages poor password key generation. By adding the additional element of time, and the above referenced element of touch and motion, security is gained by vastly increasing the complexity of the password key, and doing so in a manner that better conforms to actual human use capacity.

Some embodiments of the KEI system with or without touch-sensitive keys can incorporate the use of timing information as a further method of generating and authenticating secure passwords. Timing information can consist of delays between the entry of individual password characters, durations of the various key presses and releases, as well as the overall duration. Thus, in addition to entering a particular sequence of characters to define a password, a user may perform the key entry sequence with various delays, key taps and key holds, multiple-same-key-repeats and multiple-key combinations, to create a unique performance characteristic within an overall period of time, resulting in a time-secured password. In a touch-enabled context (i.e., a touch sensitive keyboard, a touch pad, a touch screen, etc.), the timing characteristics of touches and gestures is considered in a likewise manner. For the sake of clarity and brevity, an embodiment within the context of a non-touch sensitive keyboard is used for the purposes of this disclosure. As referenced above, some touch-enabled processing occurs in the KEI system, and some other touch processing occurs in the TEI system. Further reference to the TEI system is provided in the incorporated U.S. provisional application 61/465,309. Again for the sake of clarity, reference to either system will be written simply as the KEI/TEI system.

Validation of a time-secured password requires a user to match both the specific sequence of password characters, and to perform the character sequence in a significantly accurate recreation of the original timed performance characteristic. A significantly accurate recreation exists when the KEI/TEI system determines that the timing information of a password entry attempt matches, within specified tolerances, to the performance characteristics of the stored time-secured password.

Figure 31C:
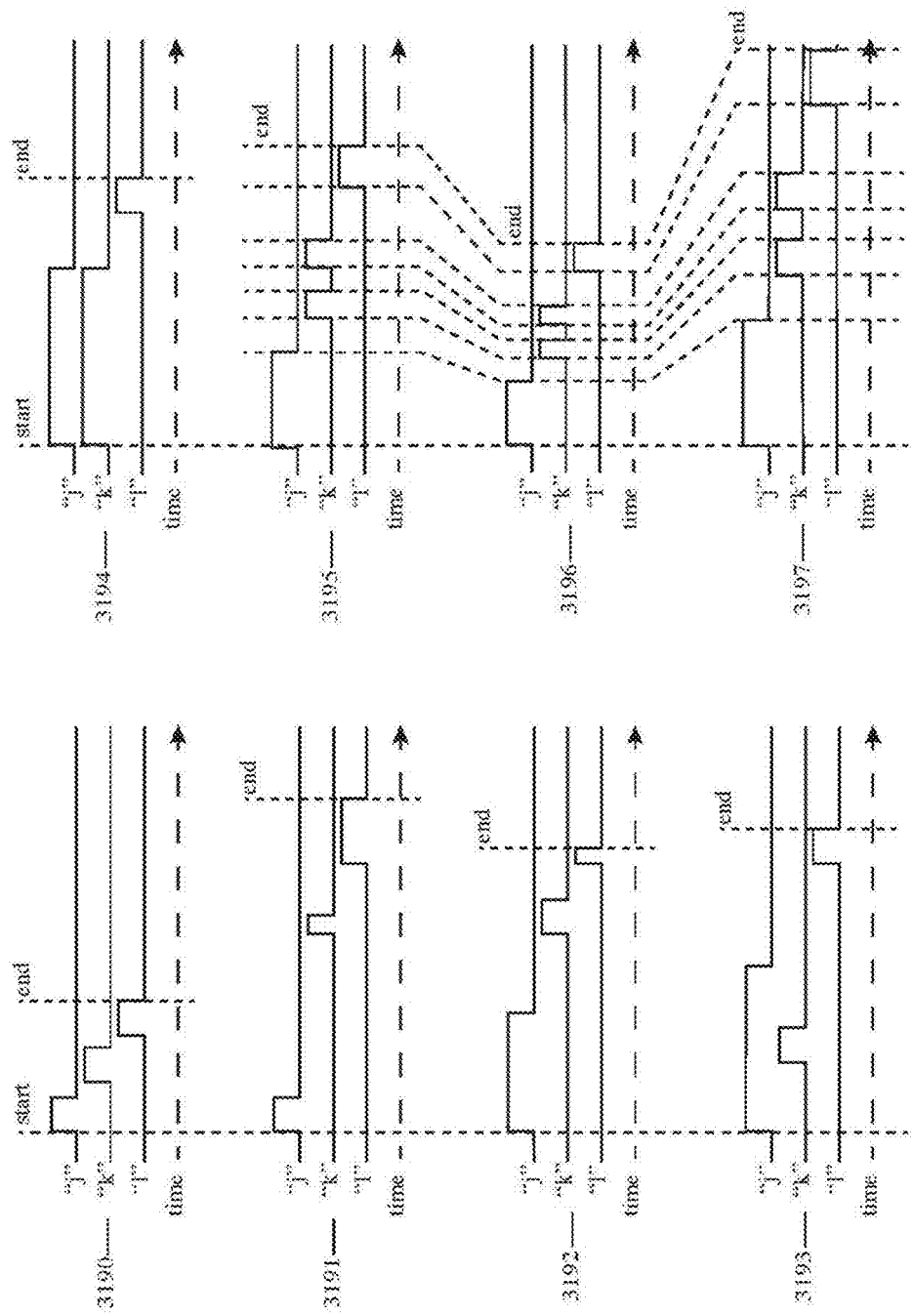
FIG. 31c illustrates defining a secure password using timing characteristics of character entry and the KEI system in accordance with some embodiments.

FIG. 31c provides a timing chart which illustrates the entering of a simple character sequence password using the "jkl" keys with different performance characteristics 3190 through 3197. Each individual character key is represented by a horizontal baseline that becomes elevated to indicate the point in time when the associated character key indicated is pressed, and returns to baseline level at the point in time when the associated character key is released. The horizontal axis represents the passage of time, with each example 3190 through 3197 representing the same time scale. The horizontal distance between a key press and the same key release represents a key press duration, and the horizontal distance between a key press and a subsequent key press represents a delay. All examples are shown referenced to a same particular start time, which is the time at which the first key press of a password entry attempt begins. Each example also indicates an end time for the complete password entry attempt so that the total duration of each password entry attempt can be compared to the other examples. These examples therefore illustrate the individual time relationships of each key press and release to each other key press and release, and the total elapsed duration of a password entry attempt, further allowing the direct comparison of the effects of various performance characteristics on password entry and verification.

It is assumed and not specifically indicated in FIG. 31c that following the completion of each password entry attempt example, a user then presses "return" or "enter", or selects another system-specific means of signaling to the system that the password entry attempt has been completed, which then submits the password entry attempt for processing and evaluation by the system. In some embodiments, a password entry can forego this explicit password entry termination and submission requirement. When so enabled, the KEI/TEI system continuously monitors each stage of the password entry sequence, so that when the last required step is performed, an explicit "enter" is not required. During the modal password entry process, the user may always cancel an authentication attempt and exit the mode by tapping a specified key (e.g., "escape") or by clicking on a specified UI button. In embodiments running on hardware that is touch-enabled, explicit password termination and entry is also optional. When so enabled, the all-up state (wherein all touches are released) is used as the point where the KEI/TEI system evaluates the password attempt for possible acceptance.

Referring to FIG. 31c, in example 3190, the password "jkl" is entered, each character in sequence, and each character key is released before the subsequent character key is pressed. In both examples 3191 and 3192, the password "jkl" is again entered, each character in sequence, and each character is released before the subsequent character key is pressed. To an existing password verification process, all the performance characteristics are not relevant and therefore represent a valid password match to a stored password consisting of the character sequence "jkl" because all timing information, both key-specific and overall duration, is disregarded. The KEI system is capable of recognizing each example 3190, 3191, and 3192 as unique and distinct because of the addition of durations and delays comprising timing information which creates a unique performance characteristic resulting in a time-secured password. Therefore, if the time-secured password "jkl" is stored as performed in example 3190 and a user types or performs the password "jkl" as shown in either of examples 3191 or 3192, the KEI system determines that the time-secured password has not been matched, and denies the user access to the time-secured password-protected item.

The KEI/TEI system provides a variable tolerance factor, which allows for timing variations in time-secured password entry. This accommodates the natural minor or insignificant variations in human performance abilities from one password attempt to the next. Example 3193 illustrates entry of the password "jkl" where the "j" key is held down while the "k" key is pressed and released. An existing authentication system that evaluates only key presses to determine the character entry order in a password would interpret the character entry order in example 3193 to be "jkl" and therefore it would be a valid match to the password entries in examples 3190, 3191 and 3192. The KEI system recognizes both key presses and releases in any order and therefore would interpret example 3193 as uniquely distinct from all other examples 3190 through 3192 and 3194 through 3197.

Example 3194 illustrates a near-simultaneous press and release of the "j" and "k" keys followed by the press and release of the "k" key. Regardless of the subjective appearance or intent of simultaneity by the user pressing both the "j" and "k" keys together, processing systems must recognize one key event or character at a time in the order received, even if the time difference is minimal or imperceptible to a user. Therefore, an existing authentication system that depends upon key presses or releases to determine the character entry order might or might not recognize the character entry order of example 3194 as a match to examples 3190 through 3192, depending on which key event or character is actually recognized first by the system. The KEI system is able to recognize example 3194 as being unique and distinct from all other examples 3190 through 3193 and 3195 through 3197 because it interprets such closely actuated keys as a single "chord" event. Thus, the user's expectation of simultaneity is realized, and use of chords in authentication sequences is acceptable, repeatable and reliable. Additionally, while the KEI system is able to disregard the potential sequential variance of the near-simultaneous press of the "j" and "k" keys by incorporating a particular timing tolerance, the KEI system is also able to disregard the timing of the release of each of the keys when a chord has been previously designated.

Examples 3195, 3196 and 3197 illustrate proportionate scalability in time-secured password recognition of some embodiments of the present invention. The performance characteristic in example 3195 is proportionately compressed in example 3196 and proportionately expanded in example 3197. Similar in concept to the speeding up or slowing down of a piece of music, the overall time compression or expansion does not render the music unrecognizable. The KEI/TEI system recognizes and accepts proportionate timing changes such as in examples 3196 and

3197 as valid variations on the same time-secured password as represented by example 3195, and allows a user access to the time-secured password-protected item. This allows a user to enter a particular password sequence without trying to match a particular "tempo" so that the overall duration matches the stored password key. This relative timing aspect is much more reliable for users to re-create than would be an attempt to accurately match any specific exact tempo.

With embodiments of the KEI/TEI system which incorporate time-secure passwords, a user who knows only the password character string from 3190 would not be able to successfully gain access to a time-secured password protected item of any of the examples 3191 through 3197, and may not even be able to perform example 3190 with enough accuracy to gain access if the user creates a password key of sufficient complexity.

An embodiment of the KEI/TEI system that enables time-secured passwords is a significantly more secure system than existing authentication systems which allow anyone with knowledge of (or guesses about) the password character string to gain access to the password-protected item. In an embodiment of the KEI/TEI system where performance characteristics such as touch, gestures and timing are incorporated, a higher level of security results, because the particular timing pattern or touch gesture chosen by a user for a password is not as easily observable or reproducible by an unauthorized user. Furthermore, cognitive burden on the user is lowered by trading long character strings with numbers and symbols for more secure, efficient and human-friendly alternatives.

vii. Authentication Contexts and Feedback

Passwords in general may be local to the user's system, and utilized to restrict access to items on the user's system that the user has chosen to protect with a password (e.g., a volume, directory, file, etc.). Other passwords are non-local to the user's system, such as a password providing access to a website or external system where the user has, for example, defined a password to prevent unauthorized access to remotely stored data or to a bank account. In some embodiments, the KEI/TEI system detects when a user's system is entering a password-entry context or mode and provides a method or interface to the user for the purpose of generating or performing either a password that may include both gesture and time components. When the user is generating a secured password, the KEI/TEI system requires the user to confirm the password by repeating the performance characteristic containing gestures, timing or combinations thereof. If the user is attempting to access a password-protected item, the KEI/TEI system evaluates a completed password entry attempt and determines a match or non-match, thereby providing or denying access to a local password-protected item or submitting the confirmed password to a non-local system in a form acceptable to the non-local system, typically in a secure manner using well known industry-wide techniques such as a hash chain.

In some embodiments, an audio and/or graphical icon-based vocabulary for each component of a gesture-secured password context may be depicted on-screen either in an animation or in successive figures. Such sounds, animations and figures are automatically generated so as to aid the user in recalling, visualizing and verifying a newly created gesture-secured password as a confirmation before it is validated, accepted or stored by the OS.

To assist a user in the generation or authentication of a gesture-secured or time-secured password, some embodiments of the KEI/TEI system provide audible and/or visual feedback to the user in the form of sounds, graphical representations or on-screen text during the generation and/or authentication of the password. The character and manner of the feedback can be determined from a default setting provided by the KEI/TEI system, or it can be user-modified. The feedback type does not need to be obviously or directly representative of the action or actions taken by the user, or make sense to a non-participating observer, but should be, or will become, meaningful and useful to the user. To assist a user in recalling a gesture-secured or time-secured password, the KEI/TEI system, in some embodiments, provides audible or visual hints to the user when the system enters a gesture-secured and/or time-secured password context. The content and type of hint is user-defined and can be provided by the KEI/TEI system automatically or by means of a user-prompted action.

viii. Password Rehearsal

Some embodiments employ a multi-step password confirmation process, wherein the user must accurately confirm the previously entered password a number of times over a period of time to fully validate a new password. Depending on device usage, such confirmation requests are instantiated by the KEI/TEI system at increasing time intervals (e.g., 1 minute, 5 minutes, 20 minutes, 1 hour, etc.), in order to refresh the memory of the user and acclimate the user to any timing and gestural characteristics of the new password, so that muscle memory is acquired. Such confirmation requests vary in frequency and number based on the accuracy and speed of confirmation attempt entries. If the user has trouble performing the new password (including the requisite gestural and timing components), audible or visual hints may be displayed in the animation or figure formats described above. In some embodiments, such password confirmation requests may be delayed by the user until a more convenient time. Previous passwords are not erased from KEI/TEI system memory until a number of accurate and non-hesitant password confirmations are successfully performed.

With repeated use, the user will naturally require less and less time to enter gesture- and time-secured passwords. In some embodiments, such entry timing cues are monitored so that slower than normal passwords may be rejected. Such gesture- and time-secured passwords are immune from key logger malware, and can be made even more secure by requiring more steps or complexity, or employing a sequence of directional modifiers that require dexterity or practice to successfully enter within a certain timeframe.

Figure 32A:
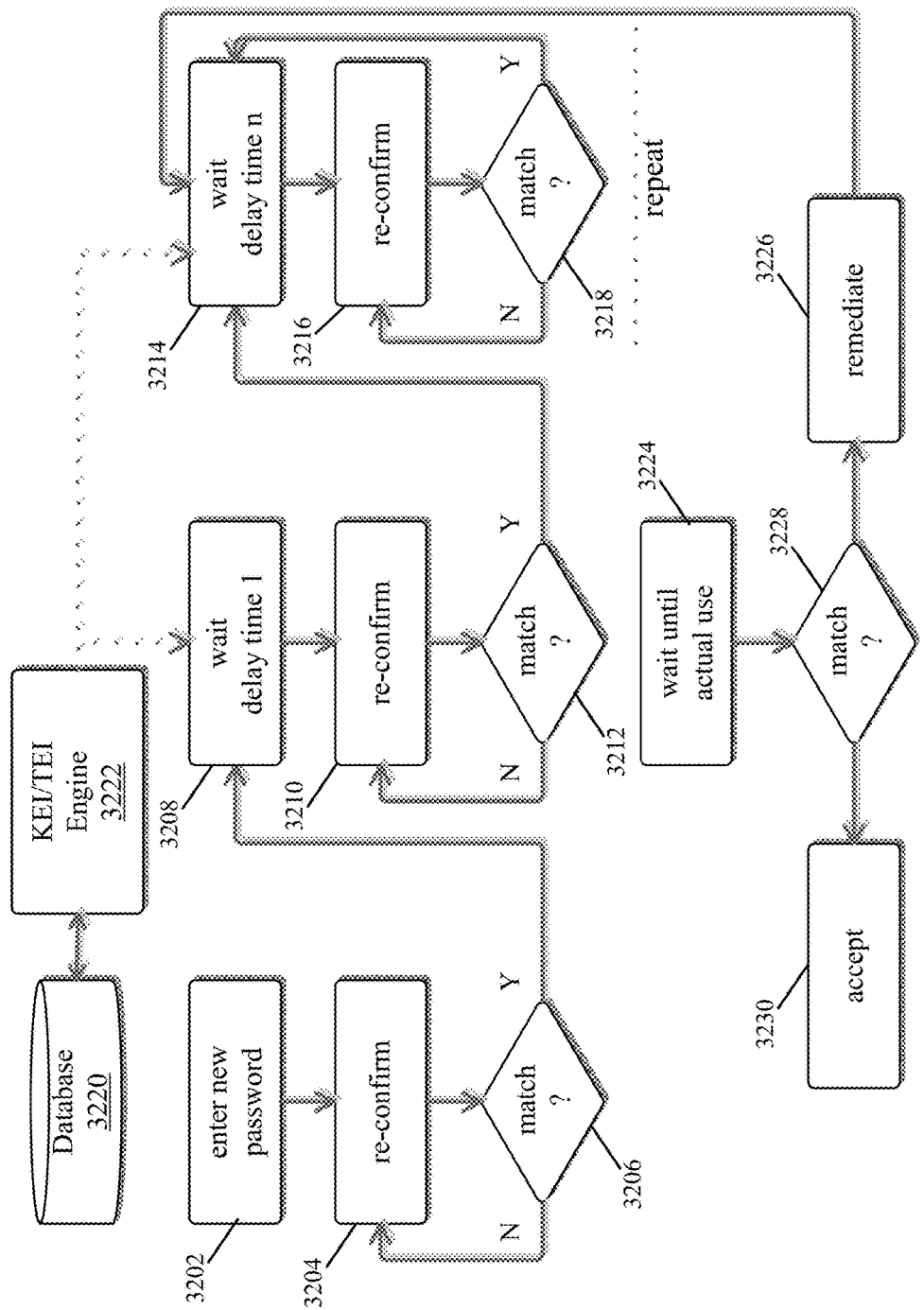
FIG. 32a illustrates the use of the multi-step password confirmation process.

FIG. 32a illustrates the use of the multi-step password confirmation process. When a new password is created by the user (at 3202), they must immediately confirm a substantially equivalent performance (at 3204). When confirmed (at 3206), the KEI/TEI engine (at 3222) records and timestamps this successful password confirmation in the KEI/TEI database (at 3220). The KEI/TEI engine then determines a time for a first re-confirmation based on past user history and the complexity of the password gesture sequence. At the appointed time, the KEI/TEI engine initiates another confirm process (at 3210). Based on the timing and number of attempts required in this re-confirmation process, the KEI/TEI engine in concert with the KEI/TEI database, uses AI techniques to determine when to invoke another re-confirmation process (at 3216). The KEI/TEI engine repeats this process of asking for confirmation until there is no hesitancy or mistakes on the part of the user, and the password sequence is engrained in the user's muscle memory. When the password sequence is subsequently utilized (at 3224), the KEI/TEI engine utilizes the same AI techniques to determine if additional (at 3226) cycles of re-confirmation are necessary.

C. Pressure Sensitive Keyboard

Some embodiments provide an enhanced key-based input device that includes a pressure sensitive layer beneath the keys. The pressure sensitive layer issues a continuous pressure value when one or more keys are held down and then downward force is applied over one or more keys. The pressure value may be used to (1) adjust the frequency with which key events are issued or (2) invoke various output actions depending on a particular pressure range, or set various parameters or attributes.

Figure 32B:
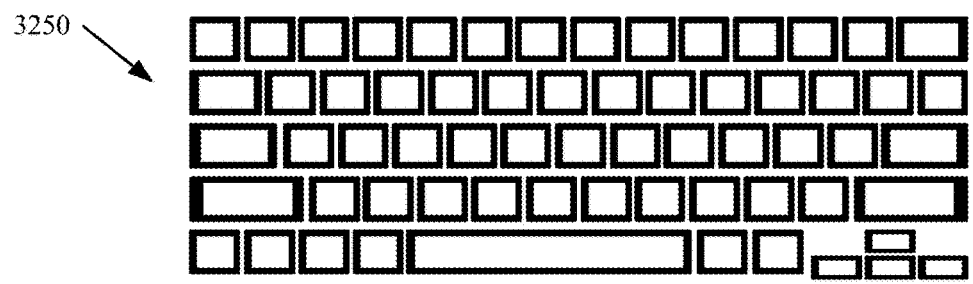
FIG. 32b illustrates an enhanced keyboard that includes a pressure sensitive layer in accordance with some embodiments.
Figure 32B:
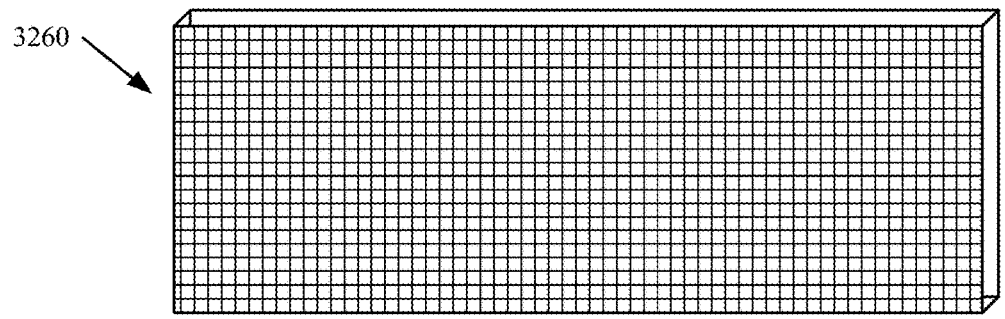
Figure 32B:
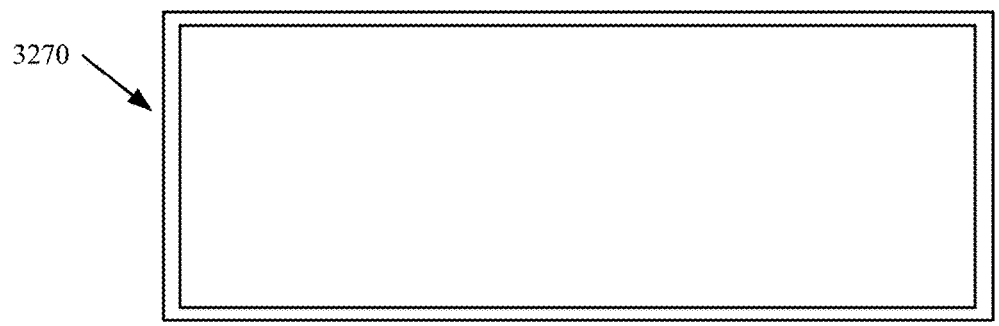

Any number of methods which would be known to one skilled in the art may be utilized to obtain this control output. One such method embodied in FIG. 32b illustrates an enhanced keyboard that includes a pressure sensitive layer 3260 in accordance with some embodiments. The topmost layer 3250 of the device includes keys of a keyboard. A pressure sensitive layer 3260 is placed in between the topmost layer 3250 and the frame 3270 of the enhanced keyboard. The pressure sensitive layer 3260 is composed of a flexible conducting material that provides some degree of physical resistance in order to regulate the force applied to the key or keys. A voltage is placed across the pressure sensitive layer 3260 and the voltage is measured by an analog-to-digital converter (ADC) of the enhanced keyboard. A controller (not shown) of the keyboard then converts the voltage measurement into a pressure value. The controller then interfaces with the KEI system or other software to pass the pressure value and other key event outputs using a protocol such as USB or Bluetooth.

When force is applied to a key that is being held down, the force with which the key impacts the pressure sensitive layer 3260 produces a variance in the voltage that is measured by the ADC. The controller interfaces with the ADC to obtain the voltage variance and to convert the variance into a quantifiable pressure value. The greater the force that is applied, the greater the pressure value that is output. In some embodiments, the pressure value is not output with regular key taps so as to not interfere with regular text insertion. In some such embodiments, the pressure value is output when a key is held down and force is applied to the key that is being held down.

In some embodiments, the pressure sensitive layer 3260 is global, in that a single pressure value is output regardless of the number of keys that are held down with variable force. The pressure value may correspond to the overall combined force applied to all depressed keys. The pressure sensitive keyboard may be implemented differently in different embodiments. For example, a pressure sensitive layer may be included that provides a mechanism by which a distinct pressure value for each key is available.

In some embodiments, the KEI system, the KEI engine, or other software (e.g., OS) interprets the pressure value to produce modified behavior. For example, the frequency with which characters, words, or lines are selected increases when the pressure value increases. As another example, the frequency with which a character is inserted into a text field increases when the pressure value increases. The increase in the pressure value represents greater pressure being applied to the particular key. The pressure value may also be interpreted to provide modified output action behavior. The pressure value is used to change a parameter or attribute of an output action when the output action is invoked with a key press.

Figure 33:
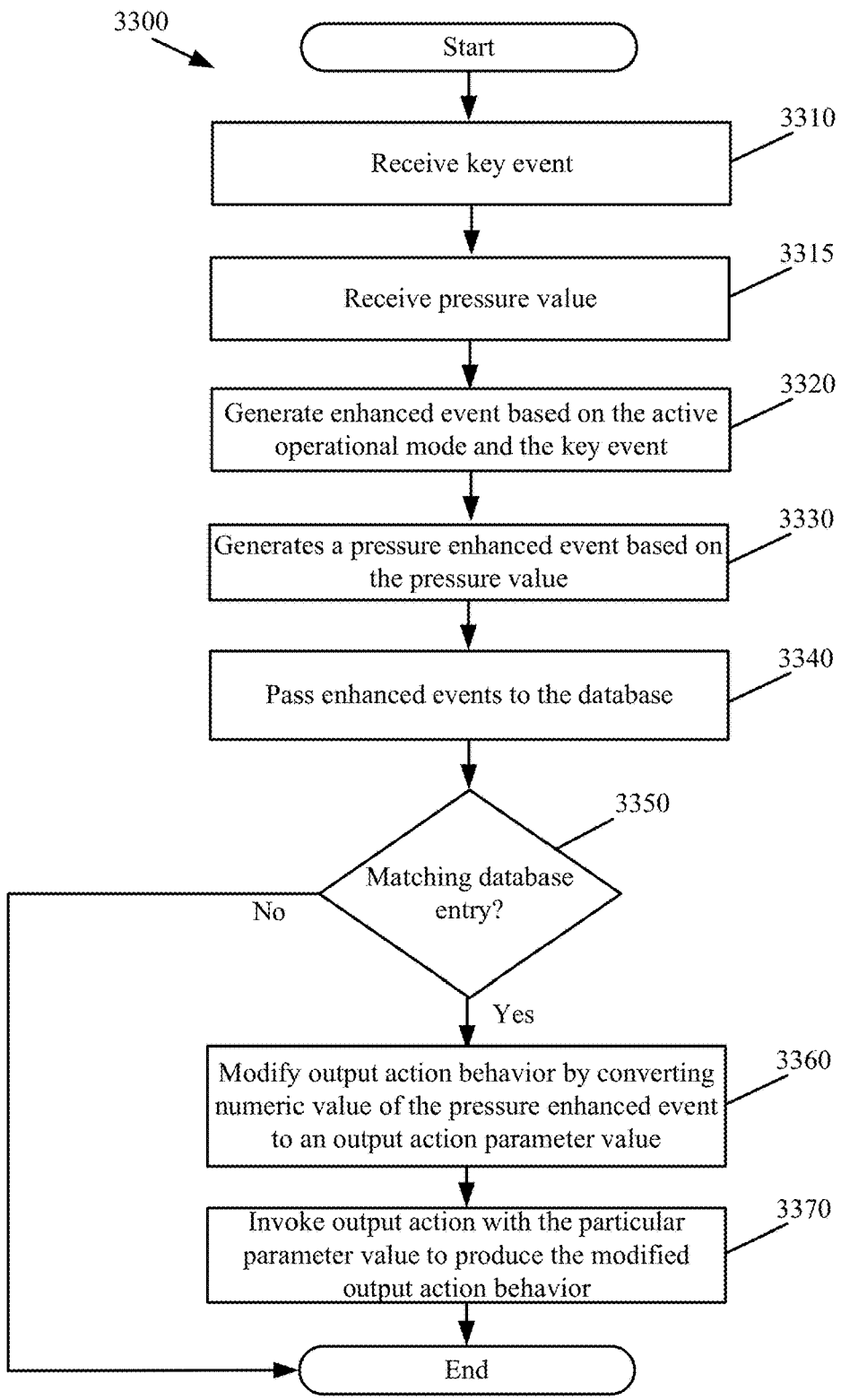
FIG. 33 presents a process performed by the KEI engine of some embodiments to modify output action behavior based on pressure values.

FIG. 33 presents a process 3300 performed by the KEI engine of some embodiments to modify output action behavior based on pressure values. The process 3300 begins when the KEI engine receives (at 3310) a key event. The process also receives (at 3315) one or more pressure values from the controller of the enhanced keyboard. As noted above, the pressure value is issued by the enhanced keyboard when the key corresponding to the key event is held down and downward force is applied to the key. The process may continually receive pressure values at 3315 as the user adjusts the amount of pressure that is applied to the key being held down. For exemplary purposes and for the sake of clarity, the process 3300 is described relative to a single pressure value.

The process generates (3320) an enhanced event based on the active operational mode and the key event. Additionally, the process generates (at 3330) a pressure enhanced event based on the received pressure value. For example, holding the "A" key without applying a measurable pressure issues the enhanced event:

$$\text{MOD\_a} \tag{19}$$

Holding the "A" key while applying a first range of pressure issues the MOD enhanced event (19) and a pressure enhanced event:

$$\text{PRESS\_50} \tag{20}$$

The numeric value in the enhanced event (20) represents the quantified pressure value that is being applied on the keyboard. Holding the "A" key while applying a second range of pressure issues the MOD enhanced event (19) and a pressure enhanced event with a different numeric value:

$$\text{PRESS\_100} \tag{21}$$

The process passes (at 3340) the enhanced events to the database to determine (at 3350) whether the enhanced events identify an output action for invocation. When no output action is identified, the enhanced events are ignored and the process ends. When an output action is identified, the process modifies (at 3360) the output action behavior by converting the numeric value of the pressure enhanced event to an output action parameter value or attribute value. In some embodiments, the process can ignore the pressure enhanced event when the pressure value does not impact the output action behavior.

In some embodiments, the numeric value of the pressure enhanced event is converted to an output action parameter value. When the numeric value of the pressure enhanced event exceeds a first defined pressure threshold value for an identified output action, a first output action parameter value is used to invoke (at 3370) the output action with a first behavior and when the numeric value of the pressure enhanced event exceeds a second pressure threshold value for the identified output action, a second output action parameter value is used to invoke (at 3370) the output action with a second behavior.

As an example, when the output action performs a "fast-forward" operation for a media player application, the process modifies the behavior of the fast-forward output action by invoking the output action with a particular fast-forward parameter value. The possible pressure values are compared against a set of defined pressure threshold values that are associated with different fast-forward parameter values (e.g., double, 4×, 10×, 50×). A particular parameter value is selected based on which one or more pressure threshold values the received pressure value equals or exceeds. For example, a pressure value in the range of 1-49 exceeds a first pressure threshold value (of 0) and invokes the fast-forward output action with a first fast-forward parameter value that produces a first incremental fast-forwarding (e.g., double) in the media player application. A pressure value in the range of 50-100 exceeds the first pressure threshold value and a second pressure threshold value and invokes the fast-forward output action with a second fast-forward parameter value that produces a greater second incremental fast-forwarding (e.g., 4×) in the media player application.

In some embodiments, the pressure values produce modified output action behavior independent of the KEI engine. In some such embodiments, the frontmost application that receives the key event with the pressure value internally modifies its own output action behavior based on the pressure value. In some embodiments, the different pressure values can be used to control the speed for scrolling within an application, control the speed with which a graphical slider slides, etc.

D. Keyboard with Touch Controls

Some embodiments provide an enhanced key-based input device with a trackpad near the center. In this configuration, the keys are ergonomically positioned such that the user's hands are not placed directly adjacent to one another. Additionally, the user can perform GUI navigation with either hand while the other hand remains over the keys. In some embodiments, the trackpad is replaced with a trackball or other pointer navigating device.

Figure 34:
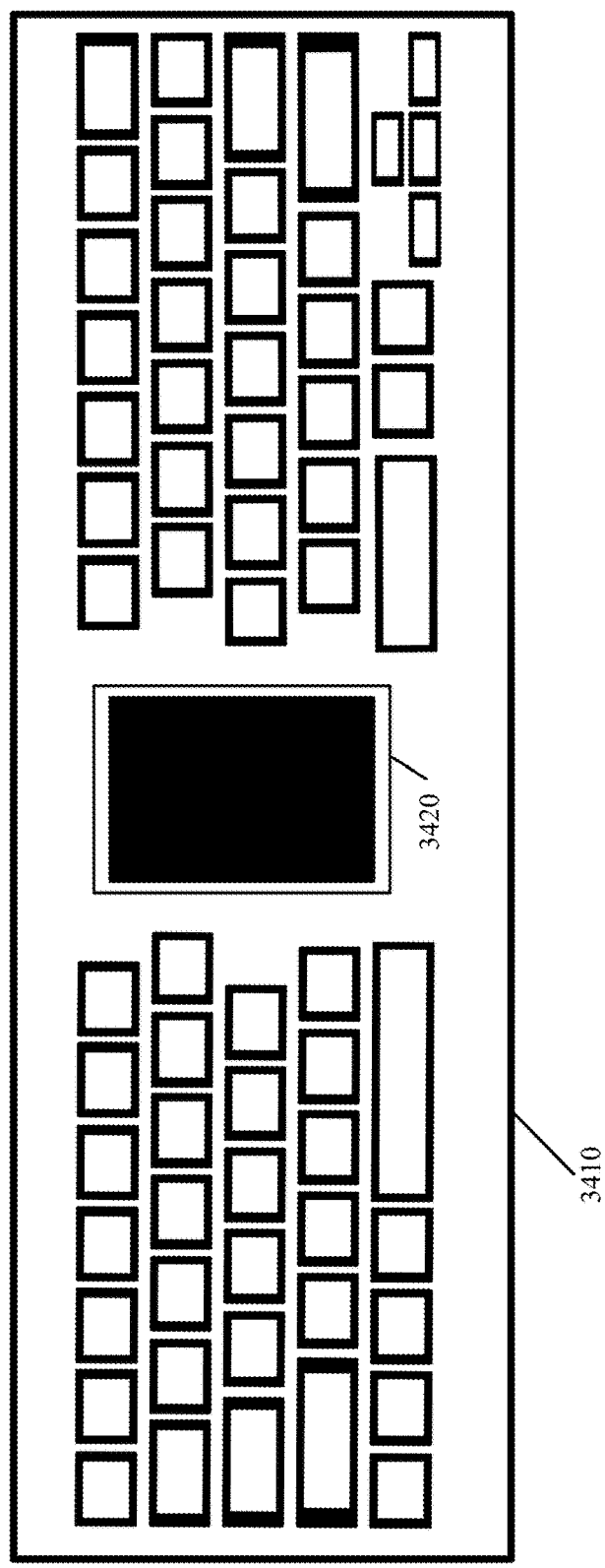
FIG. 34 presents an enhanced keyboard with a trackpad at the center in accordance with some embodiments.

FIG. 34 presents the enhanced keyboard 3410 with a trackpad 3420 at the center in accordance with some embodiments. The keyboard keys that are ordinarily accessed by the left hand are split to the left of the trackpad 3420 and the keyboard keys that are ordinarily accessed by the right hand are split to the right of the trackpad 3420. For a "qwerty" keyboard, the keys "T", "G", "B", and the keys to the left of these keys are split for use by the left hand and the keys "Y", "H", "N", and the keys to the right of these keys are split for use by the right hand. In this configuration, the space bar is split into two separate keys. Since most users consistently insert a space with either the thumb of the right hand or left hand, some embodiments adapt one of the space bar keys for space insertion and the other space bar key for use as a modifier key such as a flag key, a key that invokes an output action when used with the KEI system, or a key that can enable or disable other hardware functionality such as the trackpad 3420.

In some embodiments, the keys are split at an angle that provides ergonomic comfort and better access to the trackpad 3420. In some embodiments, the keys towards the center of the keyboard 3410 are elevated higher than the keys towards the outer edges of the keyboard 3410. Elevating the keys in this manner provides additional ergonomic comfort so that the user's hands rest at an angle over the keys. The trackpad 3420 may internally include one or more clickable buttons such that when the trackpad 3420 is pressed a button is clicked.

Some embodiments provide a touchscreen instead of the trackpad near the center of the keyboard. The touchscreen enables access to similar functions that could be accessed with the trackpad at the center. Additionally, the touchscreen provides visual information that could be used to further enhance user interface functionality. For example, the touchscreen may display the TEI viewer described in Section I above. In this manner, the user can invoke various output actions and perform text insertion without need for a separate input device (e.g., trackpad, mouse, etc.). For further flexibility, the keys of the keyboard may be used in conjunction with the KEI system and the touchscreen may be used in conjunction with the TEI system thereby allowing different direct means through which users can invoke output actions without having to use a separate input device apart from the keyboard.

The keyboard may further be modified to include a docking interface so as to allow a portable electronic device such as a smartphone (e.g., iPhone) to be docked to the keyboard. When docked, the touchscreen functionality of the portable electronic device can be used to enhance the keyboard functionality as described above in the paragraph above. Additionally, the user will be provided access to the data on the portable electronic device.

Figure 35:
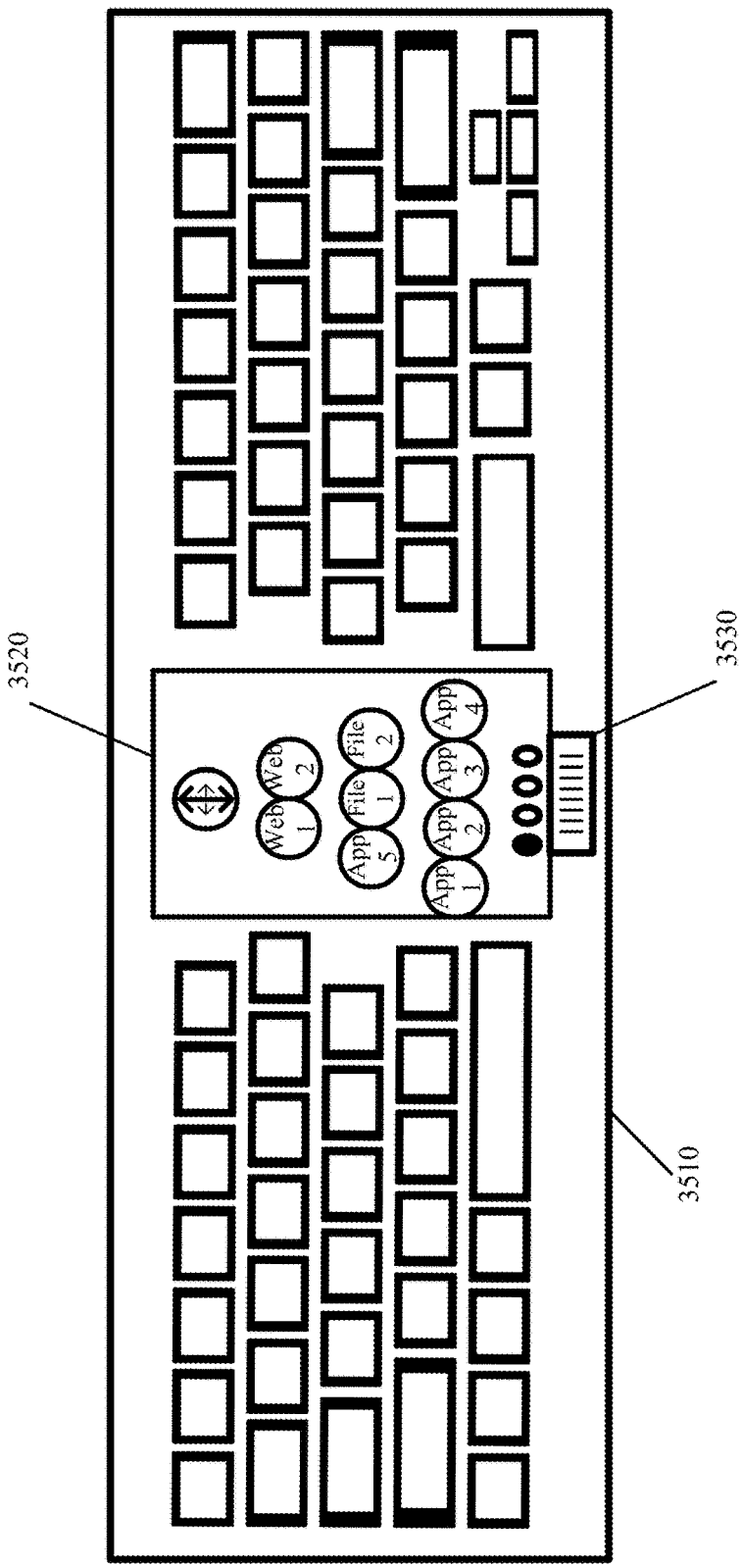
FIG. 35 illustrates an enhanced keyboard that includes a central touchscreen with a docking interface in accordance with some embodiments.

FIG. 35 illustrates an enhanced keyboard 3510 that includes a central touchscreen with a docking interface in accordance with some embodiments. The keyboard 3510 includes a touchscreen 3520 near the center of the keyboard. The touchscreen 3520 may include any capacitive, resistive, or other touch sensing technology and may range between 3-6 inches in diagonal size. The touchscreen 3520 allows for mouse emulated controls and for operation of the TEI system which may be displayed on the touchscreen 3520 as an example.

Furthermore, the keyboard 3510 includes a docking interface 3530 for coupling a portable electronic device such as a smartphone to the keyboard. The docking interface 3530 may include a standard 30 pin Apple® interface for connecting iPhone, iPod Touch, or other touch based devices. The docking interface 3530 couples the docked device to the computer system through a USB interface. Once a device is docked, the device can be charged, synched, or used as a storage device. In some embodiments, software such as the OS of the computer system, KEI system, or TEI system can modify the display of the docked device and intercept and adapt the touch gestures that are performed on the device in order to perform operations on the computer system, KEI system, or TEI system.

E. Touch Positioning of Graphical Keyboard

Touchscreen devices often include a graphical keyboard to allow text to be inserted. In many cases, the graphical keyboard is positioned at a fixed screen location typically towards the bottom of the screen. For example, the iPad® provides a graphical keyboard at the bottom of the screen that adjusts to either landscape or portrait mode. The graphical keyboard is displayed at a first fixed location and a first size when in landscape mode and at a second fixed location and a second size when in portrait mode. The fixed position and predefined sizes of the graphical keyboard limits the customizability of the graphical keyboard and makes the graphical keyboard difficult to use for users with different preferences.

Therefore, some embodiments of the present invention provide an enhanced graphical keyboard whose position is user specifiable using a specified touch gesture. Additionally, some embodiments provide an enhanced graphical keyboard that is dynamically sized according to the touch gestures used to invoke the enhanced graphical keyboard.

Figure 36:
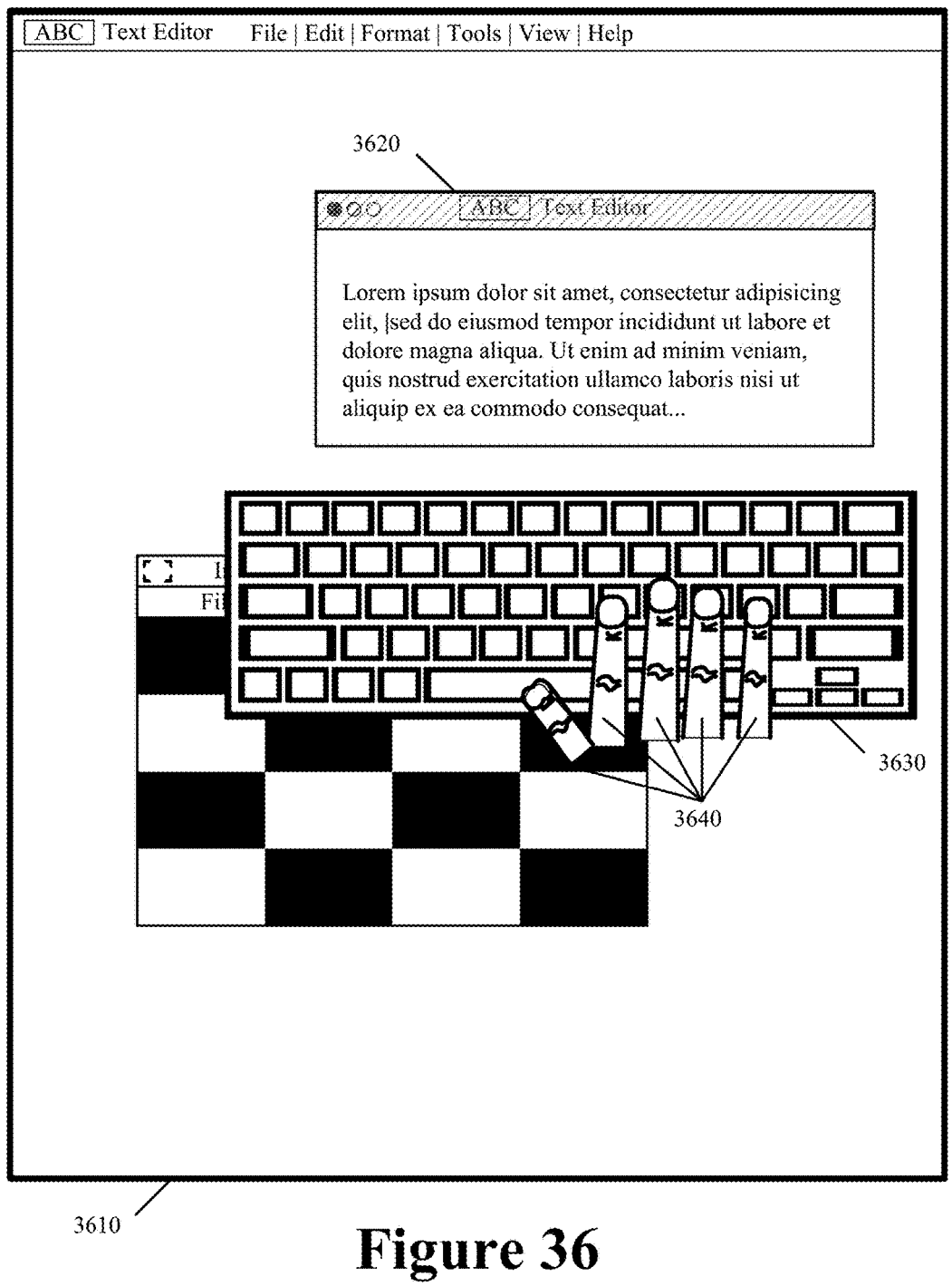
FIG. 36 illustrates a user performing a multiple touch gesture on the screen of a touchscreen device at a position directly below a text editing application.

In FIG. 36, a user performs a multiple touch gesture on the screen of a touchscreen device 3610 at a position directly below a text editing application 3620. Based on the detected multiple touch gesture, the device 3610 displays a graphical keyboard 3630 directly under the finger positioning of the user. Specifically, the user issues a five finger touch with the user's right hand 3640. The graphical keyboard 3630 is displayed with the "J", "K", "L", and ";" home keys below the index, middle, ring, and little fingers of the right hand 3640 with the space bar positioned over the thumb. The graphical keyboard 3630 is sized to display the home keys directly below the user's fingers of the right hand 3640.

The custom display position allows a user to invoke the graphical keyboard 3630 near desired applications or UI elements. Furthermore, the device 3610 can display the graphical keyboard 3630 whenever the user invokes the input interface as opposed to always displaying the graphical keyboard for certain applications (e.g., text editor and email). The user is thereby provided more screen space to perform non-text entry related tasks or can move the graphical keyboard to another position if necessary. Alternative means in addition or instead of the five finger touch may be used to invoke the graphical keyboard 3630. For examples, users can apply a four finger touch or touches of two thumbs to invoke the graphical keyboard 3630.

Figure 37:
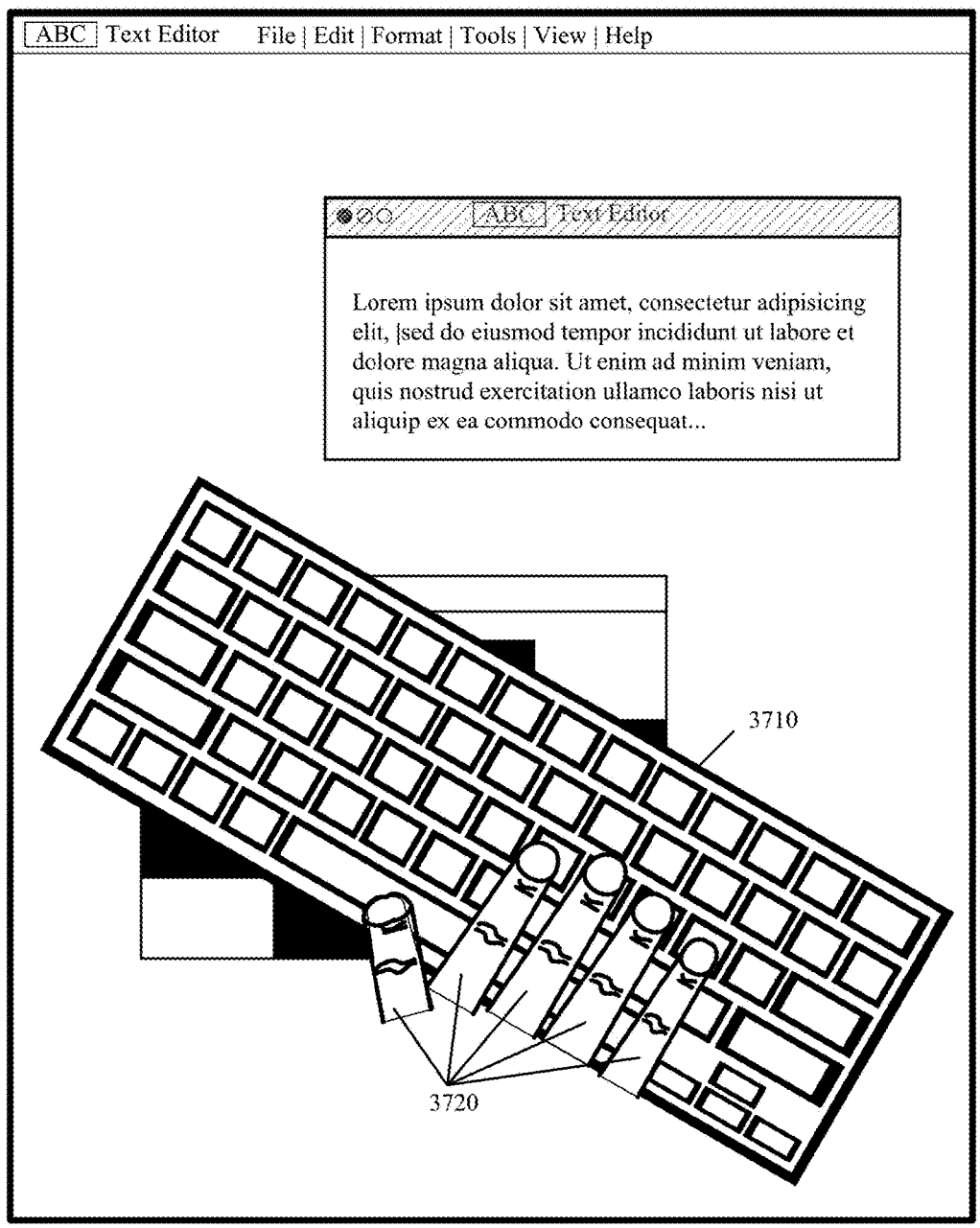
FIG. 37 illustrates resizing the graphical keyboard based on the finger positioning that is used to invoke the graphical keyboard in accordance with some embodiments.
Figure 38:
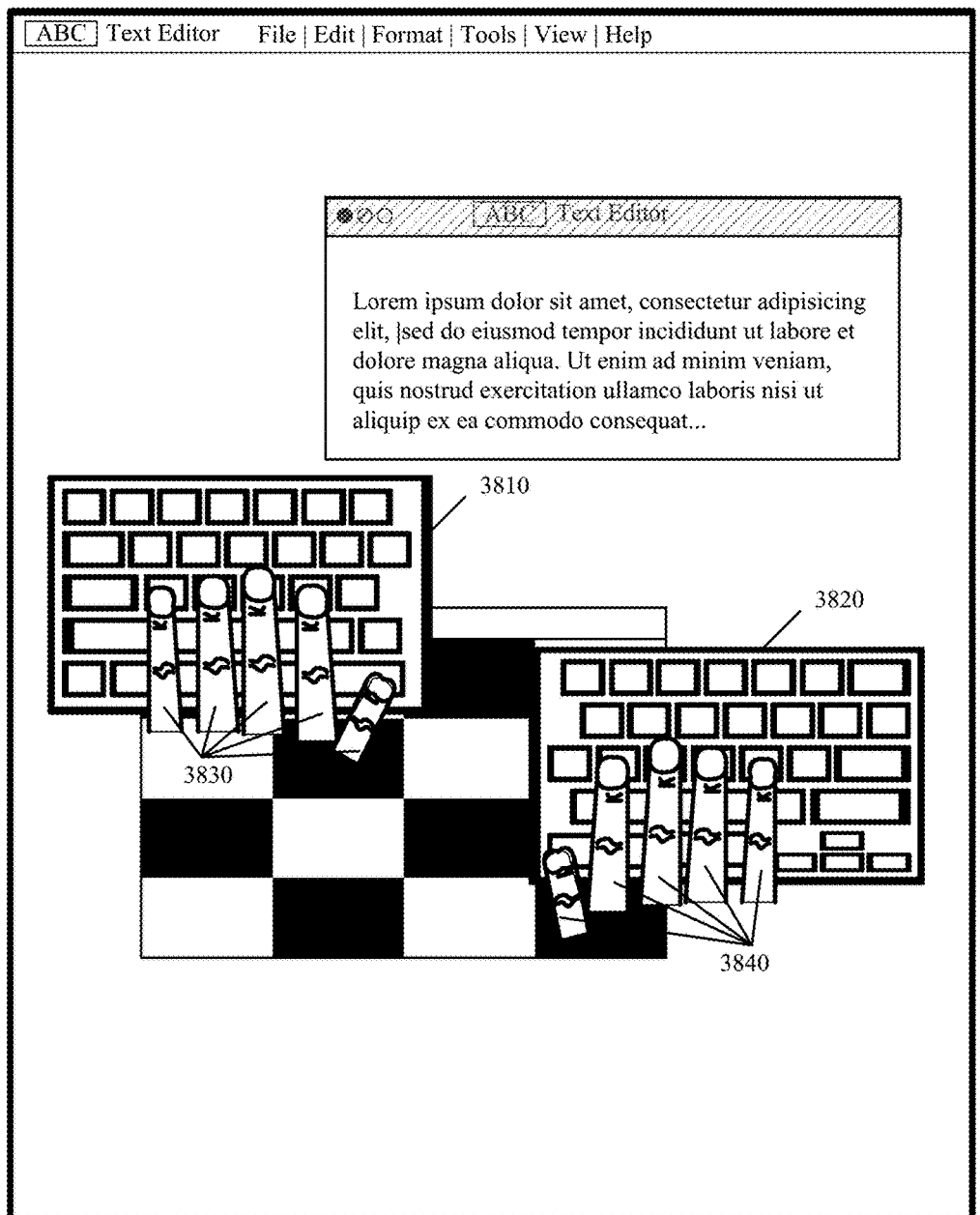
FIG. 38 illustrates invoking a split graphical keyboard and in a touchscreen device in accordance with some embodiments.

FIGS. 37 and 38 present additional examples for invoking the graphical keyboard in accordance with some embodiments. FIG. 37 illustrates resizing the graphical keyboard 3710 based on the finger positioning 3720 that is used to invoke the graphical keyboard 3710 in accordance with some embodiments. In comparison to FIG. 36, the user's hand in FIG. 37 is larger and the finger positioning 3720 is further apart. As a result, some embodiments display a larger graphical keyboard 3710 so that the user's fingers are at the home key position when the graphical keyboard 3710 is displayed. For users with smaller hands or for users that desire a smaller keyboard layout, the finger positioning will be closer together and a smaller graphical keyboard is displayed. In this manner, the enhanced graphical keyboard of some embodiments adjusts to the user. This is in contrast to fixed or predefined sized graphical keyboards to which the user must adjust.

FIG. 38 illustrates invoking a split graphical keyboard 3810 and 3820 in a touchscreen device 3805 in accordance with some embodiments. In this figure, the user issues a first five finger touch gesture 3830 with the left hand at a first location on the touchscreen device 3805 and a second five finger touch gesture 3840 with the right hand at a different location on the touchscreen device 3805. Upon detection of the first and second multiple finger touch gestures 3830 and 3840, the touchscreen device 3805 displays a split graphical keyboard 3810 and 3820. Each half of the graphical keyboard 3810 and 3820 is aligned so that the first and second multiple finger touch gestures 3830 and 3840 are at the home key position of the corresponding graphical keyboard 3810 and 3820.

Figure 39:
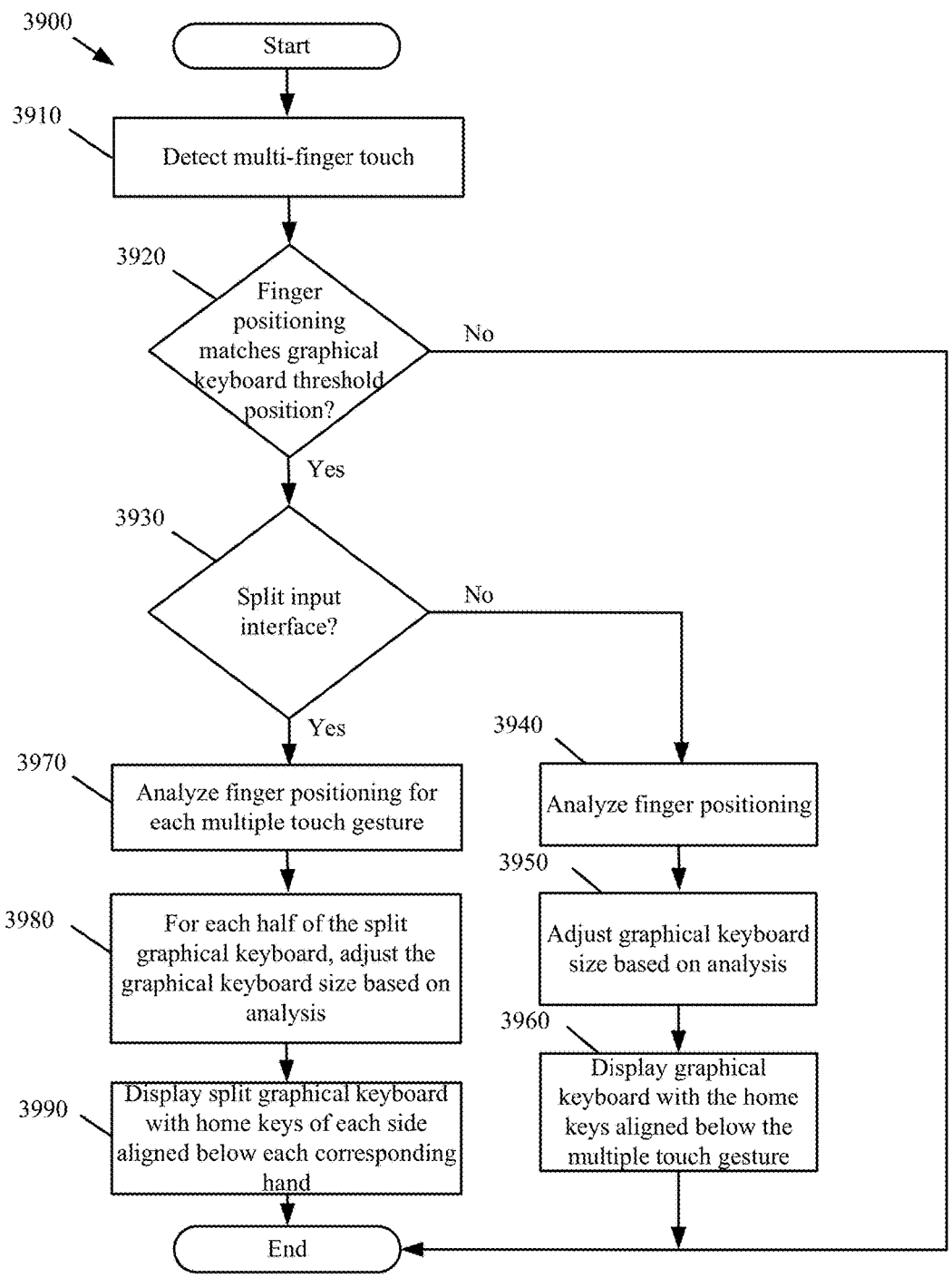
FIG. 39 presents a process for displaying the graphical keyboard at a user specified position in accordance with some embodiments.

FIG. 39 presents a process 3900 for displaying the graphical keyboard at a user specified position in accordance with some embodiments. The process 3900 is performed by a modified OS, application, or API of a touchscreen device.

The process 3900 begins by detecting (at 3910) a multiple touch gesture. In some embodiments, the multiple touch gesture includes five fingers that are placed on the touchscreen. The process determines (at 3920) whether the finger positioning matches a specified finger positioning pattern. For example, the process determines whether the five fingers are touching the screen in an offset manner that matches a hand configuration, wherein the hand configuration defines the specified finger positioning pattern. For example, whether the index, middle, ring, and little fingers are in a linear adjacent manner and whether the thumb is within a distance and relative angle of the index finger.

When the finger positioning does not satisfy the finger positioning pattern at 3920, the process ends. When the finger positioning satisfies the finger positioning pattern at 3920, the process determines (at 3930) whether a split graphical keyboard is invoked. As shown in FIG. 38, the split graphical keyboard is invoked by issuing two multiple touch gestures at different locations on the touchscreen.

When a split graphical keyboard is not invoked, the process analyzes (at 3940) the finger positioning associated with the multiple touch gesture. In some embodiments, the analysis (at 3940) includes computing the distance between each finger in order to size the graphical keyboard accordingly. The analysis (at 3940) may also include identifying which hand was used to invoke the graphical keyboard. In some embodiments, this analysis is accomplished by determining the lengths of each finger touch relative to the other. For example, the index finger will be lower than the middle finger and the pinky finger will be lower than the ring finger which is lower than the middle finger.

The process adjusts (at 3950) the size of the graphical keyboard relative to the analyzed finger positioning. The graphical keyboard is displayed (at 3960) with the home keys aligned below the multiple touch gesture that was used to invoke the graphical keyboard.

When a split graphical keyboard is invoked, the process analyzes (at 3970) the finger positioning for each of the two multiple touch gestures. As before, the analysis includes (1) identifying finger positioning in order to resize each side of the split graphical keyboard and (2) identifying which hand is used to invoke which side of the split graphical keyboard. For each half of the split graphical keyboard, the process adjusts (at 3980) the size of the graphical keyboard. The process then displays (at 3990) the graphical keyboard with the home keys for each side of the split graphical keyboard aligned below each corresponding multiple touch gesture and the process ends.

Figure 40:
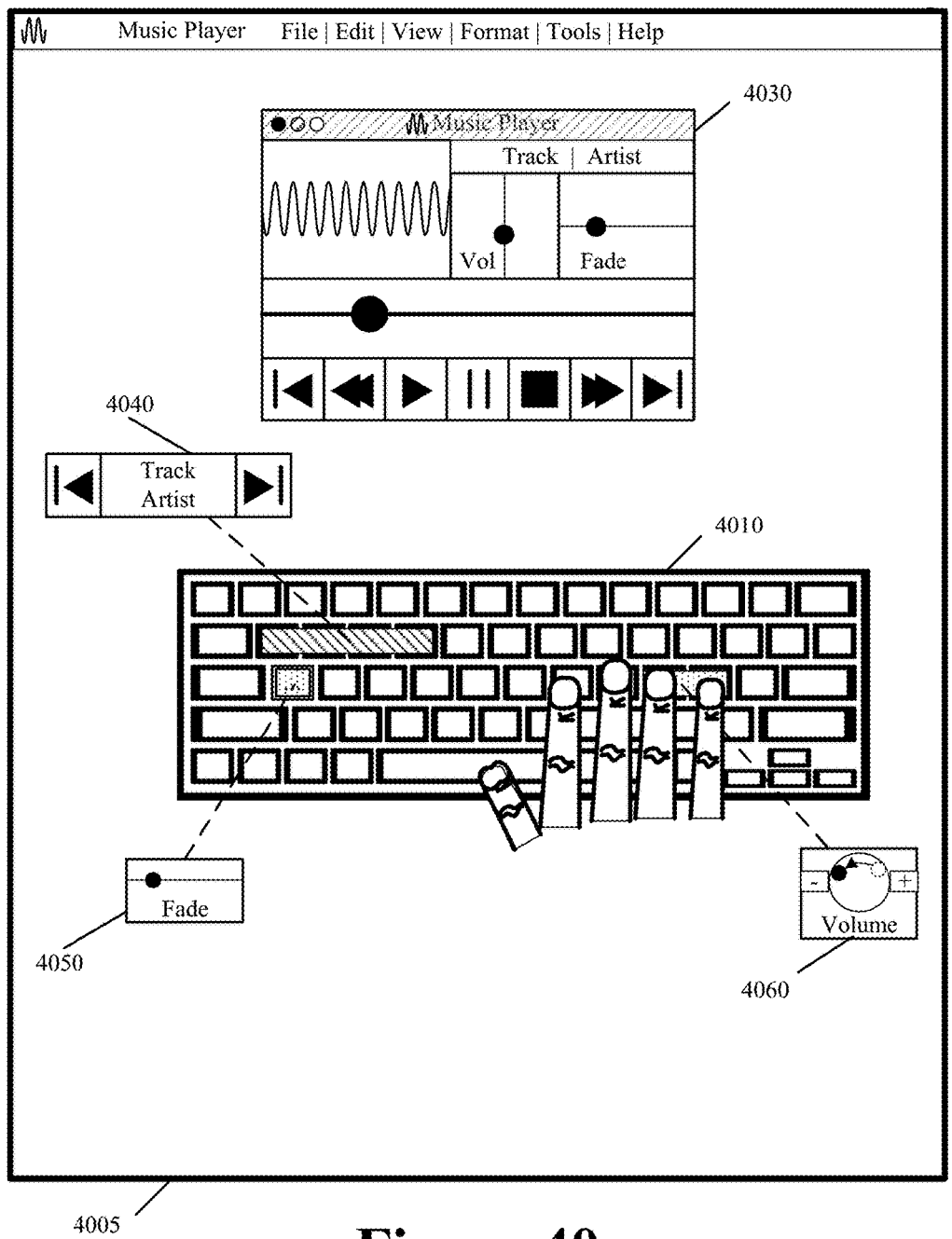
FIG. 40 illustrates the enhanced graphical keyboard operating in conjunction with the KEI engine and the KEI viewer of some embodiments.

The enhanced graphical keyboard may be adapted to work in conjunction with the KEI engine and the KEI viewer described in Section I above. In some such embodiments, the enhanced graphical keyboard can be used to invoke output actions through the KEI engine while the KEI viewer displays the corresponding symbols and widgets over the graphical keys of the enhanced graphical keyboard. FIG. 40 illustrates the enhanced graphical keyboard 4010 operating in conjunction with the KEI engine and the KEI viewer of some embodiments.

In FIG. 40, a touchscreen device 4005 displays the frontmost application 4030 and the enhanced graphical keyboard 4010. Since the focus of the frontmost application 4030 is not text-based, the KEI engine is in the PRO operational mode. Consequently, the enhanced graphical keyboard 4010 does not display alphanumeric keyboard keys. Rather, the graphical keyboard 4010 displays symbols and widgets 4040-4060 that identify output actions that are specific to the frontmost application 4030. These output actions can be invoked directly using the graphical keys of the graphical keyboard 4010. When the frontmost application changes, the symbols and widgets displayed over the graphical keyboard 4010 also change to identify the output actions that can be invoked for the new frontmost application based on the active operational mode.

In some embodiments, the graphical keyboard 4010 is adapted to provide the color coding functionality described above. Accordingly, groups of related output actions are color-coded. As shown, the widget 4040 for controlling the tracks is colored with a first color (as denoted by the diagonal lines) and the widgets 4050 and 4060 for controlling sounds settings are colored with a second color (as denoted by the dotted shading).

III. Other Input Device Enhancements

A. Spiral/Circular Scrolling

Some embodiments provide enhancements to the mouse input device, trackpad, and touchscreen input interface to improve GUI navigation and invocation of output actions.

Figure 41:
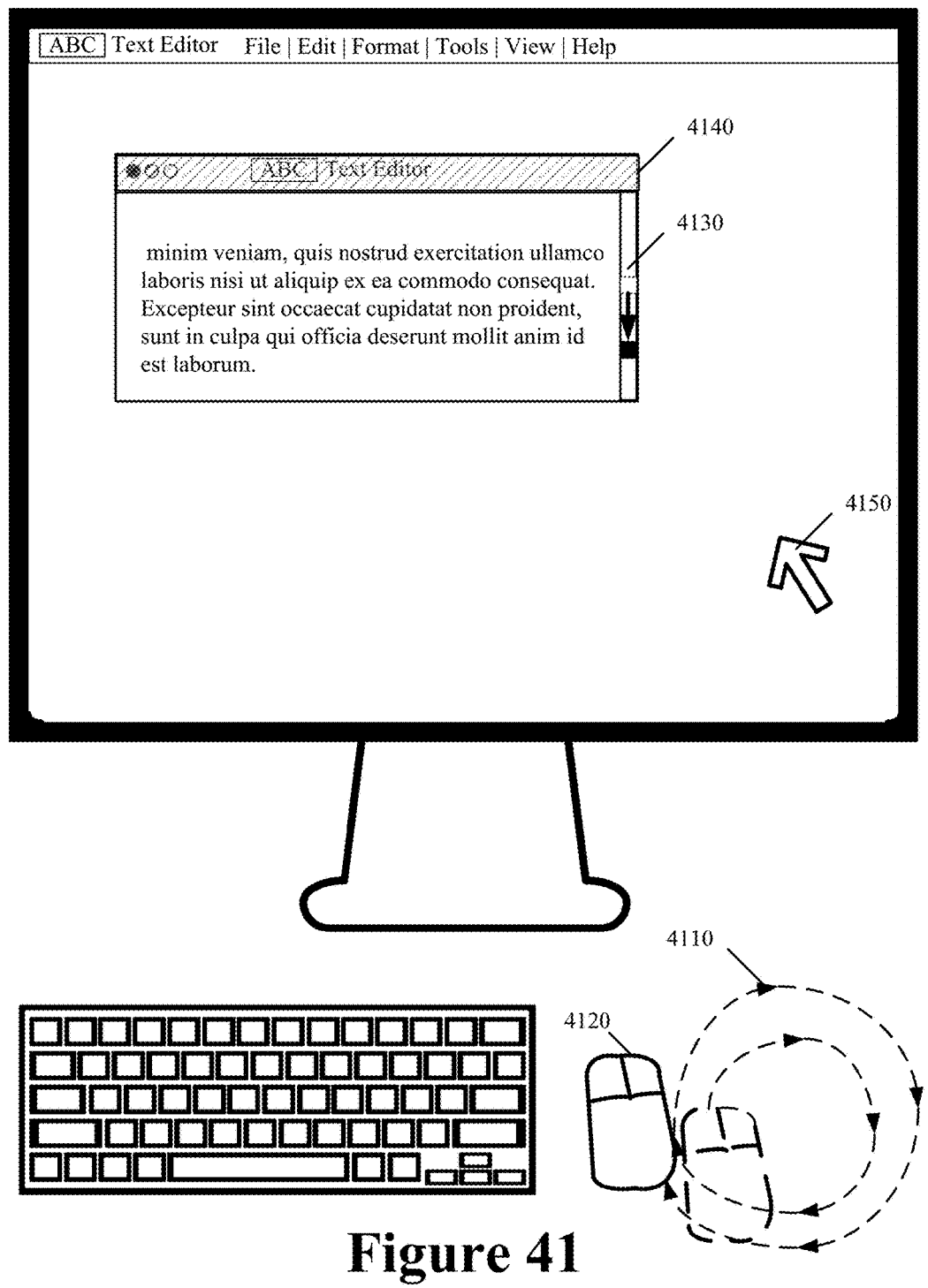
FIG. 41 illustrates using a clockwise spiral rotation of the mouse to cause downward scrolling within the frontmost application.
Figure 42:
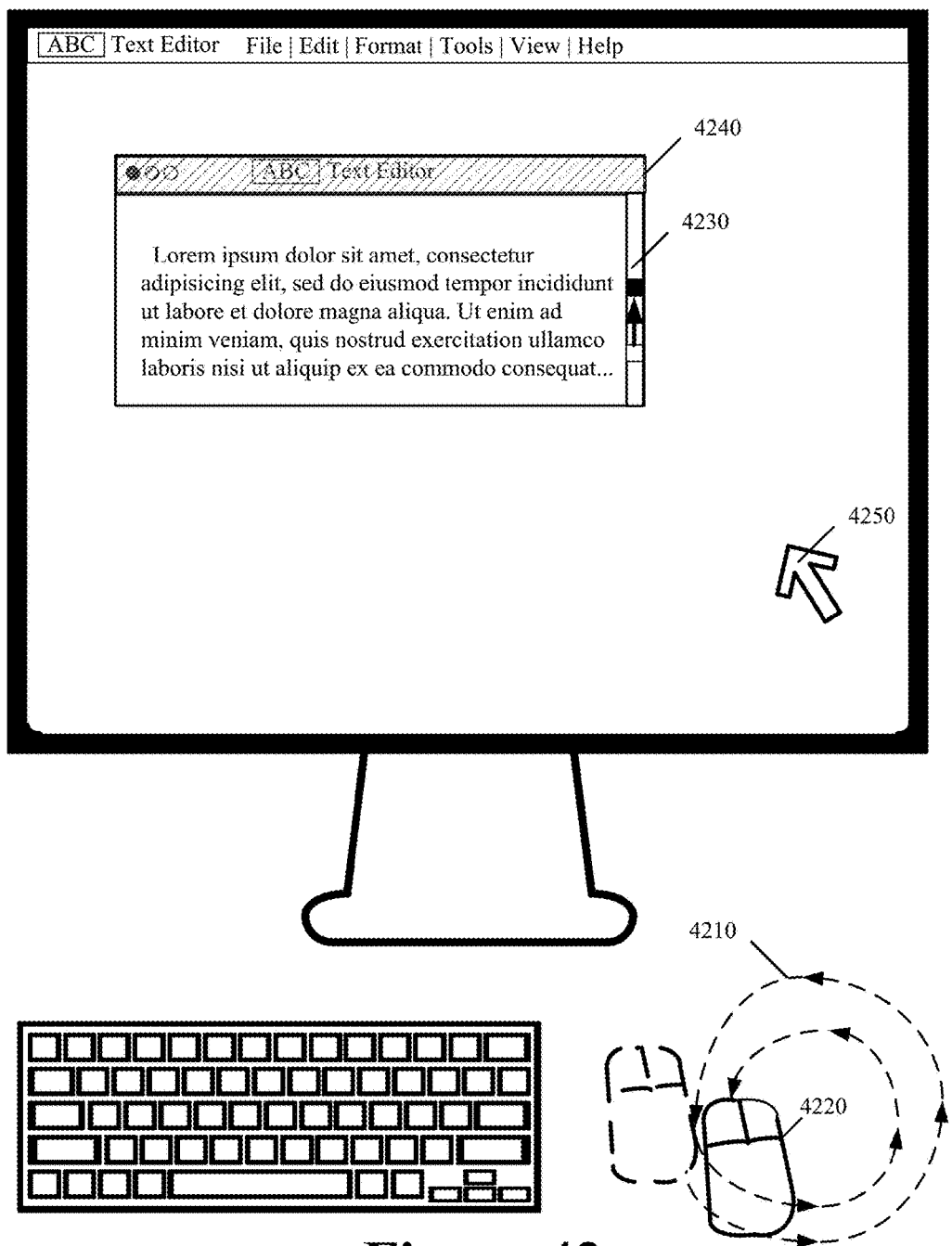
FIG. 42 illustrates using a counter-clockwise spiral rotation of the mouse to cause upward scrolling within the frontmost application.

For simplification of the discussion, the enhancements below are explained and demonstrated with a mouse input device. However, the enhancements are similarly applicable to trackpads, touchscreen input interfaces, and other spatially dependent input devices. Additionally, the enhancements below are explained and demonstrated using spiral movements. However, the same or similar functionality can be obtained using circular movements. FIGS. 41 and 42 illustrate performing scrolling within an application by using spiral movements in accordance with some embodiments.

In FIG. 41, a clockwise spiral rotation 4110 of the mouse 4120 causes downward scrolling 4130 within the frontmost application 4140. In FIG. 42, a counter-clockwise spiral rotation 4210 of the mouse 4220 causes upward scrolling 4230 within the frontmost application 4240. In some embodiments, the frontmost window or element within the window which has key focus is responsive to spiral scroll motions, regardless of the initial position of the on-screen cursor.

In FIGS. 41 and 42, scrolling occurs when the mouse is moved in a spiral pattern. Other mouse movements or patterns produce regular movements of the pointer 4150 and 4250 on-screen. In this manner, the spiral movements that produce the scrolling do not interfere with the regular operation of the mouse since a majority of mouse movements occur linearly (e.g., diagonally, horizontally, and vertically) and do not require circular motions.

By using the spiral pattern to perform scrolling, the user does not need to navigate to the scrollbar before being able to scroll. Moreover, the user does not need a separate scroll wheel, mouse button, gesture, or function key press to perform scrolling. The spiral pattern allows a user to perform a continuous scroll, whereas a scroll wheel requires the user to reset the finger position after every rotation of the scroll wheel. Such spiral movements when performed on a trackpad or touchscreen input interface can be adapted to perform the above described scrolling.

In some embodiments, the amount of the scrolling for every spiral rotation is variable based on the radius of the spiral patterns. A larger spiral pattern radius produces a greater amount of scrolling per spiral rotation. In this manner, users are able to vary the scroll speed as they scroll.

Figure 43:
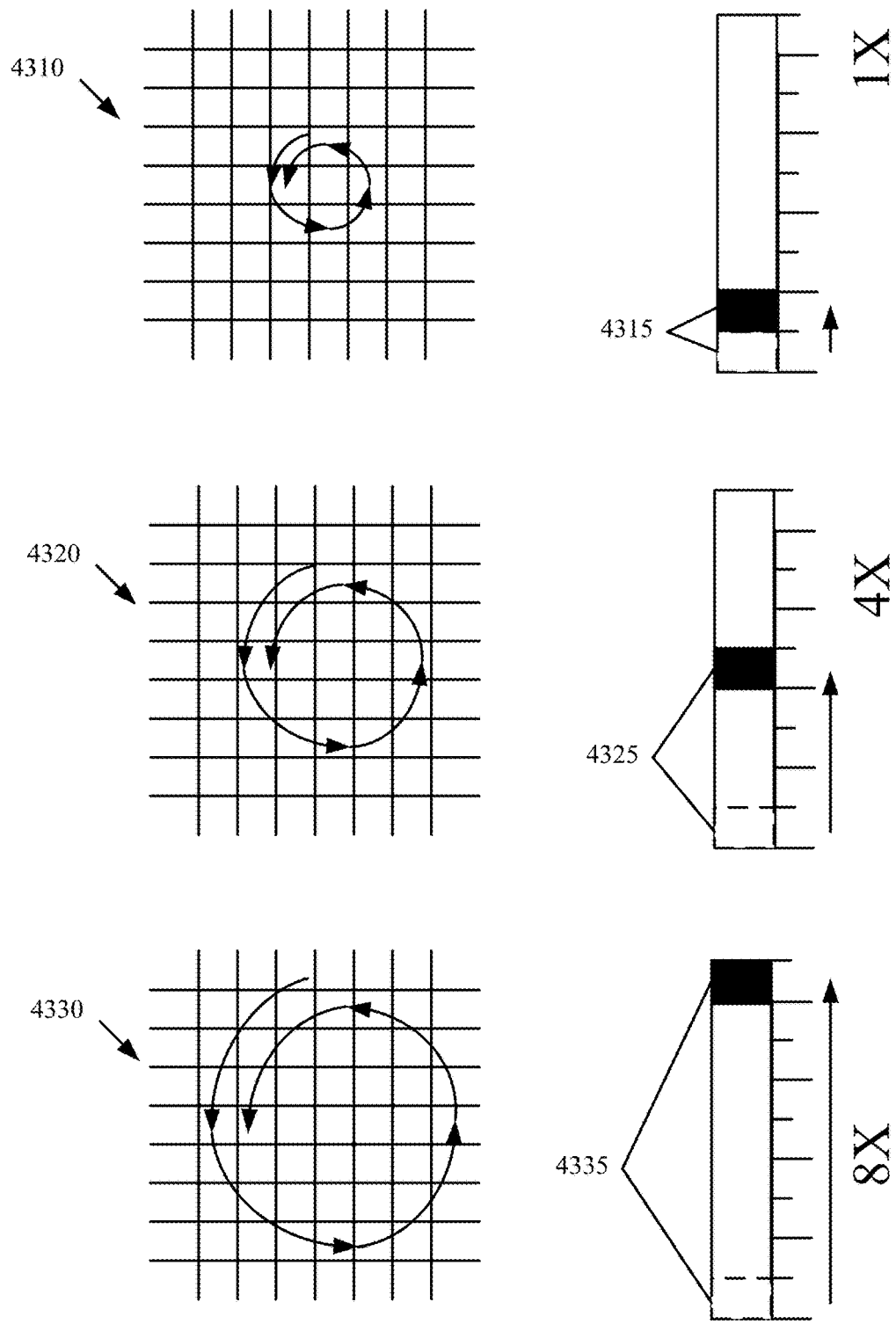
FIG. 43 illustrates modifying the scroll amount based on a radius of the spiral pattern in accordance with some embodiments.

FIG. 43 illustrates modifying the scroll amount based on a radius of the spiral pattern in accordance with some embodiments. The figure presents three spiral patterns 4310, 4320, and 4330 with increasing radii and the corresponding amount of scrolling 4315, 4325, and 4335 that occurs per spiral rotation.

The topmost spiral pattern 4310 has the smallest radius of the three patterns (i.e., 4310, 4320, and 4330) and one rotation of the spiral pattern 4310 produces the least amount of scrolling 4315 on-screen. The spiral pattern 4320 has a larger radius than the spiral pattern 4310. Performing one rotation of the spiral pattern 4320 produces four times the amount of scrolling 4325 on-screen than performing one rotation of the spiral pattern 4310. Spiral pattern 4330 has the largest radius. Therefore, one rotation of the spiral pattern 4330 produces the largest amount of scrolling 4335. The variable scrolling determined by the spiral radius provides new functionality not present in current scroll wheels. It allows a user to perform continuous scrolling while on-the-fly adjusting the scroll speed in an intuitive, natural way.

As one skilled in the art would understand in light of the present description, there may be more than one scrolling window or element simultaneously present on-screen, certain of which may be frontmost or have key focus. Spiral scrolling of content in non-frontmost windows or elements may be effectuated by first moving the cursor to any position within the confines of the desired window or element before commencing spiral movements. This ability to scroll various elements is similar to currently practiced scroll wheel operation embodied in some existing operating systems. The present invention, however, provides the option to continue scrolling an element in which scrolling has already been established, even when the cursor travels outside the bounds of the scrolling element.

In some embodiments while a spiral scroll is in progress, the actual location of the cursor may remain stationary, or the normal range of the cursor positioning may be scaled or confined to a certain area. In such cases, the cursor may change to a symbol or animated symbols which communicate to the user that a scroll process is in progress. Furthermore, in some embodiments the scrolled UI element is highlighted or otherwise changes in appearance to indicate that a scroll is in progress, and optionally displays the position and proportion of the displayed content relative to the totality of the scrolled content.

The spiral motion is not limited to changing the value of the scroll position of scrollable UI elements, but instead may change the actual value represented by the UI element itself. For instance, in some embodiments a particular UI element (e.g., scrollbar, graphical slider, numeric field, etc.) changes its value in response to spiral motions made when the cursor is positioned over it. In some embodiments, a particular UI element that is selected or has key focus changes value in relation to spiral motions until a different UI element is selected or obtains key focus. In some embodiments, such value changes occur only when a particular key (such as the "V" key) is first pressed and held. When used in conjunction with the KEI system, the pressing of the "V" key has no deleterious effect because "typing" of that key is temporarily suppressed.

Furthermore, some embodiments provide for certain keypress activations to correlate with specific value adjustments. In a drawing application, for example, the color of the currently selected object may be modified by pressing the "B" key and then using spiral motions to adjust the brightness. Similarly, when the user presses the "T" key, the tint of the selected object may be altered by subsequent spiral motions. On release of the key or keys, normal operation resumes. In some embodiments, there may be a HUD or other temporary indication of the changing value, or may be no on-screen indicator at all. As described above, the radius of the spiral movements may be used to determine the rate at which the value is modified.

In some embodiments, the spiral scroll functionality is implemented within a controller of the mouse (i.e., firmware), a modified OS, or a process of the computer system that monitors mouse movements. The functionality is implemented in some embodiments by continually monitoring and analyzing mouse movements. In some embodiments, the monitoring and analyzing includes receiving data points from the input device (e.g., mouse, trackpad, or touchscreen) and determining whether a spiral pattern is being issued based on the received data points.

Figure 44:
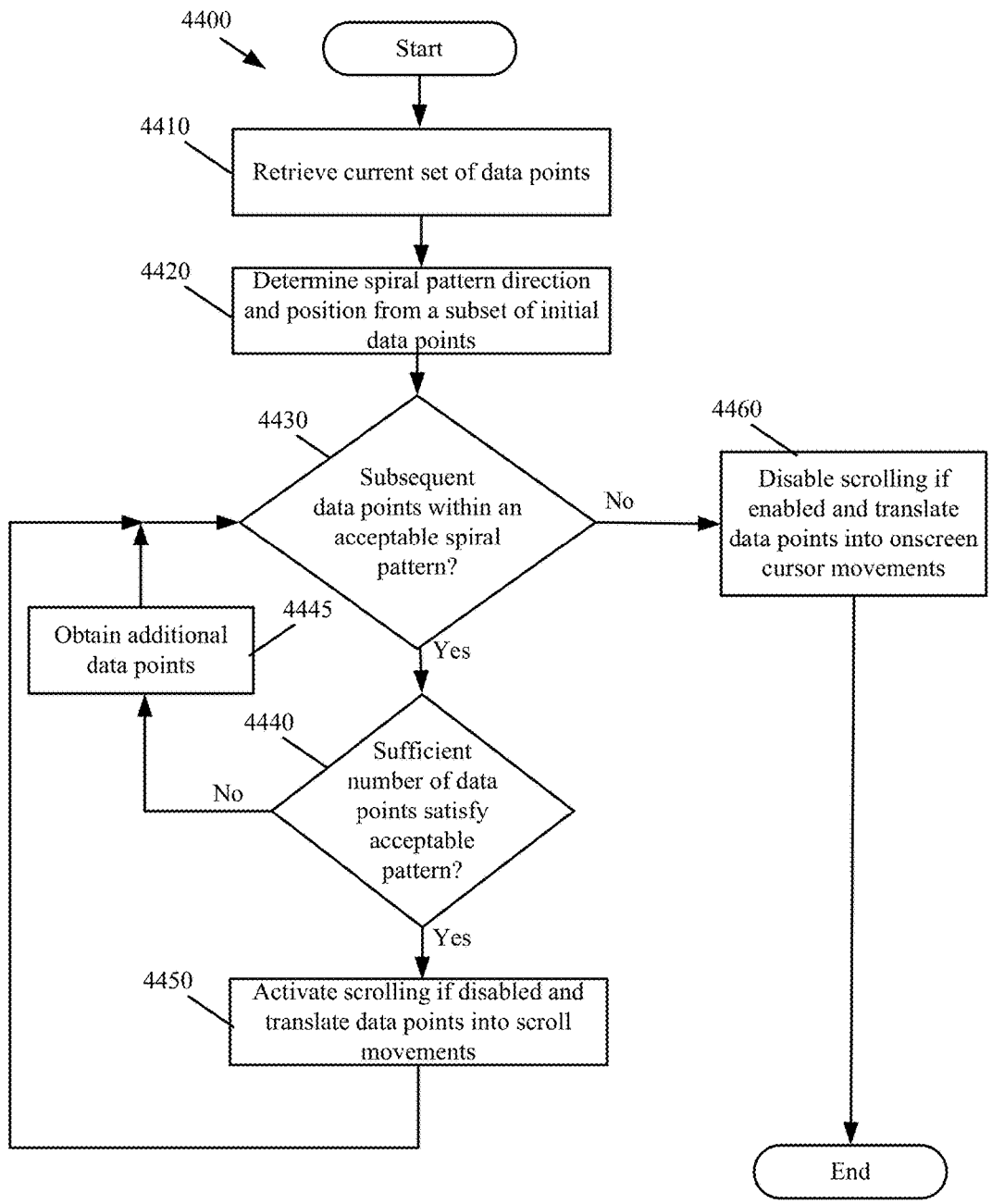
FIG. 44 presents a process for identifying a spiral pattern from a set of data points in accordance with some embodiments.

FIG. 44 presents a process 4400 for activating and deactivating scroll messages based on the identification of a spiral pattern from a set of data points in accordance with some embodiments. The process 4400 may be performed by a mouse controller, modified OS, process, or application. The process begins by retrieving (at 4410) a set of data points. The data points may be obtained from a mouse, trackpad, or touchscreen input interface. The data points identify user actions that in some embodiments specify on-screen pointer movements. In some embodiments, a set of data points is continually stored within a queue. The retrieved set of data points includes a sample size sufficient to determine a spiral pattern (e.g., thirty mouse position coordinates).

From a subset of initial data points, the process determines (at 4420) a possible spiral pattern direction (e.g., clockwise or counter-clockwise) and position. Each subsequent data point is then analyzed (at 4430) to determine whether it falls within acceptable characteristics (i.e., an acceptable spiral pattern) for continuing the spiral pattern in the determined direction and position. These characteristics may include angle, distance, and quadrant as some examples. As an example, when the direction is clockwise and the position is at a four o'clock position, a next data point that satisfies the acceptable characteristics should have a negative x-coordinate and a negative y-coordinate.

When a sufficient number of data points do not satisfy (at 4440) the acceptable characteristics, the process obtains (at 4445) additional data point based on subsequent movements of the mouse or other device producing the data points. When a sufficient number of data points satisfy (at 4440) the acceptable characteristics, scrolling functionality is activated (at 4450) (if disabled) and data points are translated into scroll messages. Scrolling continues so long as subsequent data points satisfy (at 4430) the acceptable spiral pattern. When the pattern is broken, scrolling functionality is disabled if previously enabled (at 4460) and the subsequent data points are translated to on-screen pointer movements. The process ends or restarts with a different set of data points.

When a sufficient number of data points do not satisfy (at 4430) the current scroll pattern, scrolling is disabled (at 4460) (if previously enabled) and the data points are translated to on-screen pointer movements as they normally do. The process ends or restarts with a different set of data points. In some embodiments, when scrolling is already enabled and the user changes the direction of the spiral movement (e.g., from clockwise to counter-clockwise or from counter-clockwise to clockwise), the process 4400 is modified such that the direction of the scrolling is immediately reversed without the need to reestablish the acceptable spiral pattern with a sufficient number of data points which conform with a spiral pattern in the opposite direction starting from the same position.

Figure 45:
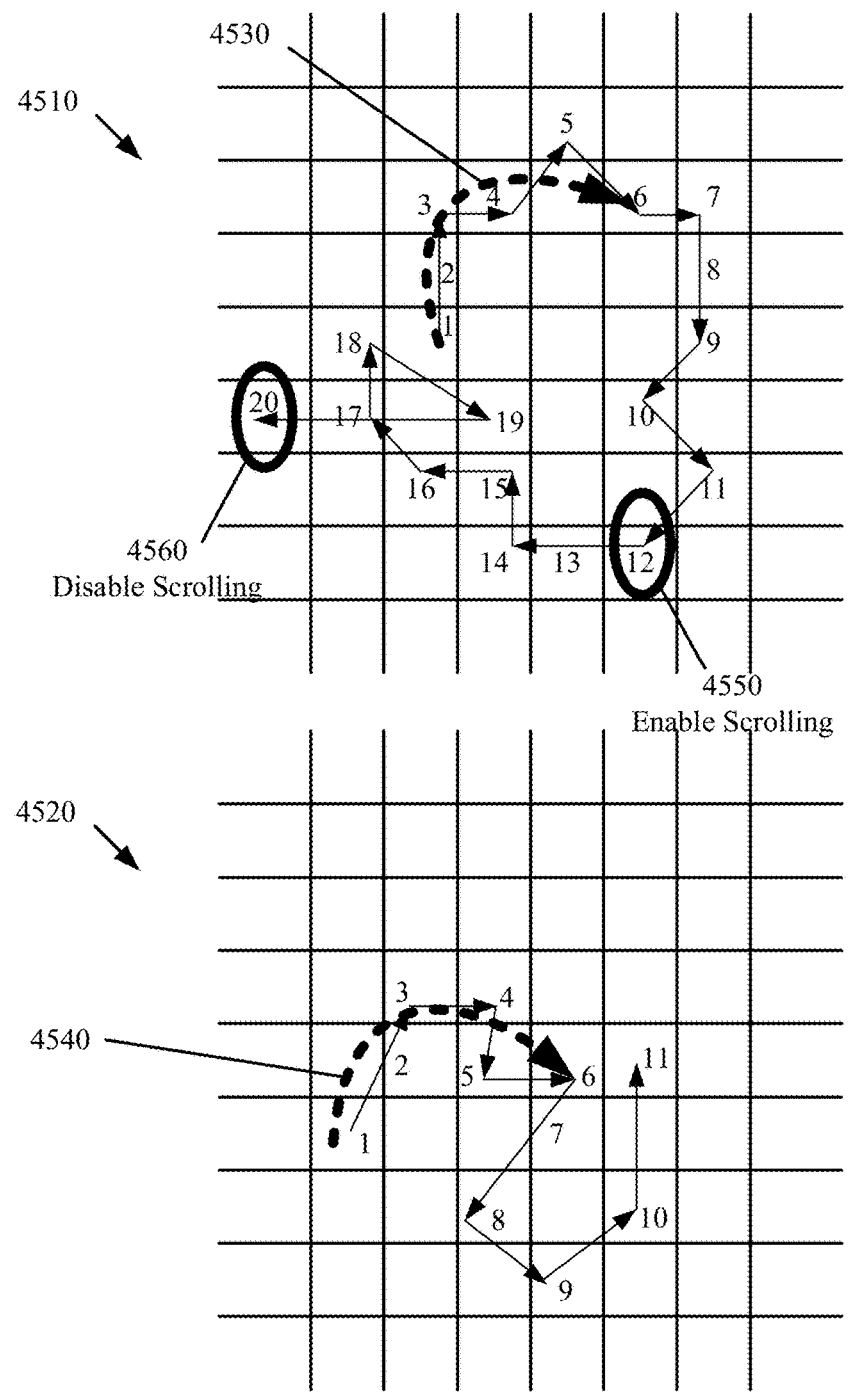
FIG. 45 illustrates two sets of data points that do and do not satisfy an acceptable spiral pattern.

FIG. 45 illustrates two sets of data points 4510 and 4520 with data points 4510 that satisfy the acceptable spiral pattern and data points 4520 that do not. The first 6 data points in each set of data points 4510 and 4520 are used to identify the spiral pattern direction and position. The first 6 data points of 4510 (i.e., 4530) identify a clockwise rotation and a one o'clock position. The first 6 data points of 4520 (i.e., 4540) identify a clockwise rotation and a two o'clock position.

Subsequent data points in 4510 (e.g., data points 7-18) continue to conform with the spiral clockwise rotation pattern except for data points 10 and 11. However, the acceptable spiral pattern allows for some number of deviations within the sample set of data points. In this example, once twelve data points satisfy the spiral pattern (at 4550), scrolling is enabled. Scrolling functionality continues until data point twenty (4560) where a sufficient number or degree of deviation has been detected to break the scroll pattern. Therefore, at 4560, scrolling is disabled and subsequent data points are converted to on-screen pointer movements.

For the set of data points 4520, there is an insufficient number of data points that satisfy the acceptable spiral pattern. Specifically, data points 9, 10, and 11 substantially deviate from the spiral pattern. In some embodiments, this amount of deviation exceeds the acceptable spiral pattern and therefore the spiral scrolling functionality is not enabled. Consequently, the data points are translated to pointer movements on-screen.

B. Dynamic Pointer Sizing

In many instances, the position of the on-screen pointer is difficult to identify when the pointer has been stationary for a period of time and the user has lost track of the current location. Locating the position of the pointer becomes more difficult as screens become larger and users utilize multiple screens. Accordingly, some embodiments enhance the functionality of the mouse or trackpad to make the pointer more readily identifiable on-screen when the pointer is moving. Specifically, when there is sufficient movement within a particular duration, the pointer dynamically changes in size on-screen.

In some embodiments, the change in size of the pointer is determined by the cumulative distance the pointer moves during a particular duration. For example, the pointer grows increasingly larger the greater the cumulative distance that is covered within the particular duration.

In some embodiments, each stage of the pointer size change is determined by different size progression thresholds, wherein the size progression thresholds for determining the changes to the pointer size are computed based on absolute distance traversed in a particular duration. For example, when the cumulative distance over the particular duration satisfies a first size progression threshold, the pointer grows to the corresponding size associated with that first size progression threshold. In some embodiments, the size progression thresholds are determined based on the screen resolution. In some embodiments, the size progression thresholds may be user specifiable. The pointer shrinks back down to its default or original size when the cumulative distance covered within the particular duration does not satisfy or falls below the first size progression threshold.

The duration is continually updated so that the pointer growth and/or shrinking occurs smoothly and dynamically in real-time. For example, some embodiments retain the cumulative distance the mouse or gesture on a trackpad has moved over the last two seconds. In this example, the pointer will retain an enlarged size so long as the cumulative distance covered satisfies the first size progression threshold over the last two seconds. When the cumulative distance covered in the last two seconds is insufficient, the pointer shrinks back down to its original size.

Figure 46:
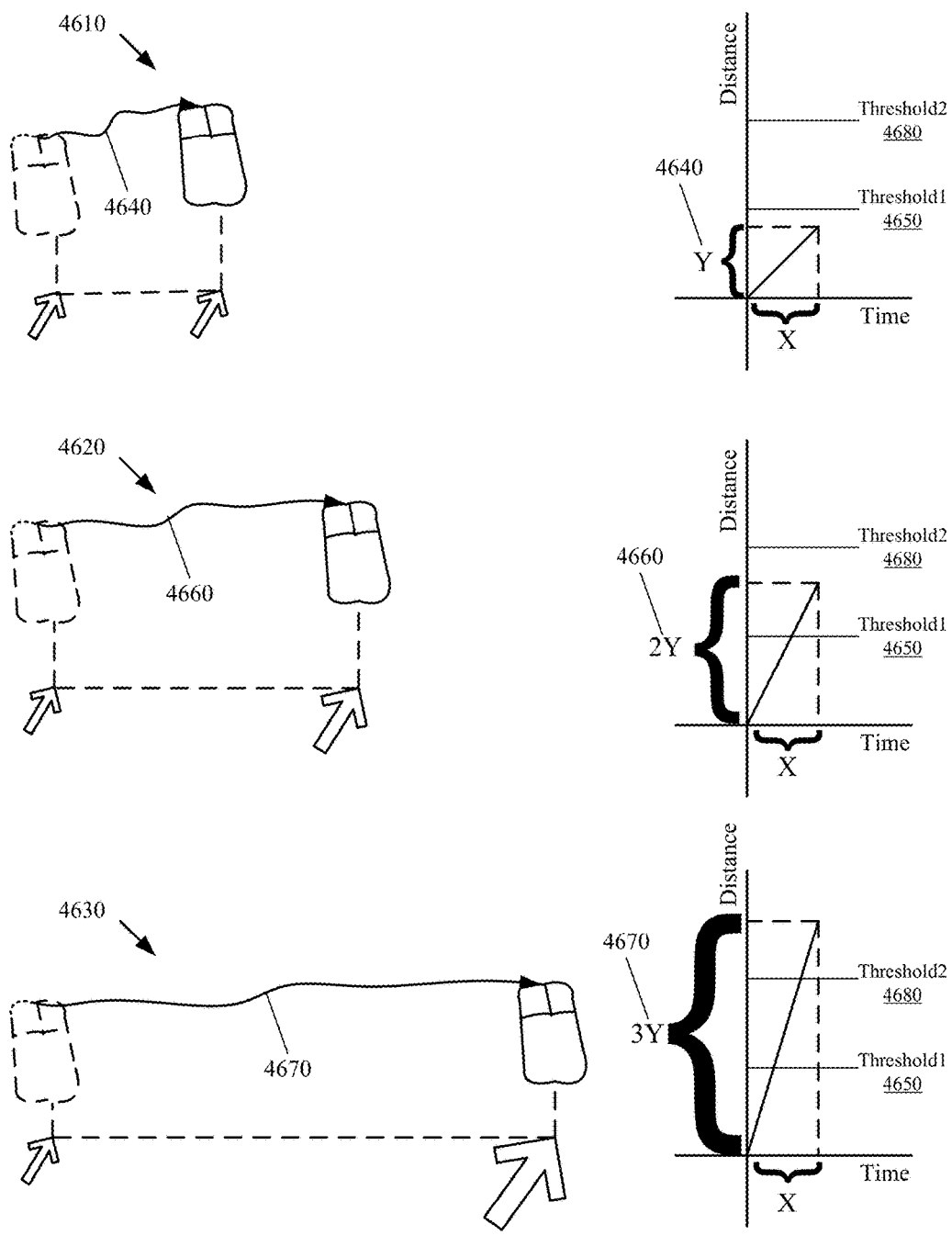
FIG. 46 illustrates the dynamic growth of the pointer in accordance with some embodiments.

FIG. 46 illustrates the dynamic growth of the pointer in accordance with some embodiments. In this figure, three different mouse movements 4610, 4620, and 4630 are shown during the same particular duration identified by the time X.

The first mouse movement 4610 travels a cumulative distance 4640 in the duration X that is less than the first size progression threshold 4650 for dynamic pointer growth. The first mouse movement 4610 does not result in any growth in the pointer size.

The second mouse movement 4620 travels a cumulative distance 4660 in the duration X that is greater than the first size progression threshold 4650. As a result, the pointer grows in size to become more readily identifiable on-screen.

The third mouse movement 4630 travels a cumulative distance 4670 in the duration X that is greater than the first size progression threshold 4650 and greater than the cumulative distance 4660. The cumulative distance 4670 passes a second size progression threshold 4680 and as result the pointer grows even larger in size than that of the second mouse movement 4620.

In some embodiments, the pointer growth and shrinking is animated. Accordingly, for example, the pointer incrementally increases in size the greater the cumulative distance that is covered during the duration for the size progression thresholds. Similarly, the pointer is incrementally decreased in size in reverse order to the increasing in size when shrinking back down to the original size.

In some embodiments, initial pointer growth is dependent on moving the mouse or touch on a trackpad a particular defined distance during a specified interval to a first size progression threshold. Subsequent increases in pointer size occur as a result of each additional unit of movement beyond the distance needed to satisfy the first size progression threshold. For example, the pointer retains its default size until the cumulative distance traversed in a specified duration satisfies the first size progression threshold. Once the threshold is satisfied, the pointer is increased in size. Each additional unit of movement that the cumulative distance exceeds the threshold by within the particular duration results in an additional increase in pointer size. Additional units of movement may be measured by on-screen pixels or other units of measure. For example, every pixel moved in the specified duration beyond the pixels defined for first size progression threshold results in an additional increase in pointer size until a maximum pointer size is reached. In this manner, changes to the pointer size occur seamlessly.

To further assist in the identification of the pointer, some embodiments change the symbol of the pointer in addition to or instead of dynamically increasing the size of the pointer. For example, an insertion beam pointer typically includes a symbol similar to "I". Some embodiments change the insertion beam pointer to a more readily identifiable symbol (e.g., arrow indicator) when the pointer is moved to exceed a size progression threshold that is defined by a specified distance to be traversed in a specified duration of time. The pointer is returned to its default symbol when the cumulative distance no longer exceeds the size progression threshold.

The enhanced functionality for dynamically increasing the pointer size on-screen may be implemented within the mouse controller (i.e., firmware), trackpad controller, OS, or an application (e.g., mouse driver or standalone application). Moreover, this functionality may be adapted for use on a trackball, stylus, and other spatially dependent input devices.

C. Haptic Feedback

Some embodiments adapt various forms of haptic technology in touchscreen devices with the KEI system. One form of haptic technology for touchscreen use provides users with realistic feel when interacting with virtual or graphical items on the touchscreen display. In some such devices, electric signals are used to physically or virtually alter the touch surface so that users sense the graphical or virtual objects that they interact with. Some embodiments adapt this form of haptic feedback for use with the KEI viewer. Specifically, some embodiments of the KEI system operate in conjunction with a haptic equipped touchscreen to provide realistic touch controls over the displayed symbols of the KEI viewer. Haptic feedback is provided for each displayed symbol of the KEI viewer. In this manner, users can interact with the symbols to invoke output actions using touch instead of sight.

The KEI system maintains the on-screen position of the KEI viewer symbols and instructs the haptic controls of the touch device to establish haptic feedback at those positions. As the symbols of the KEI viewer change in response to the changes in operational modes, the KEI system instructs the haptic controls to alter the touch surface so that haptic feedback changes in relation to the changing of the on-screen symbols.

IV. Computer System

Many of the above-described processes and modules are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computer system are meant in their broadest sense, and may include any electronic device with a processor that executes instruction stored on computer-readable media or that are obtained remotely over a network connection. Examples of computer-readable media include, but are not limited to, CD-ROMs, flash drives, RAM chips, hard drives, EPROMs, etc. Further, wherever a server, computer, or computer system is identified as a component of the embodied invention, it is understood that the server, computer, or computer system may be a single physical machine, a cluster of multiple physical machines performing related functions, virtualized machines co-resident on a single physical machine, or various combinations of the above.

Figure 47:
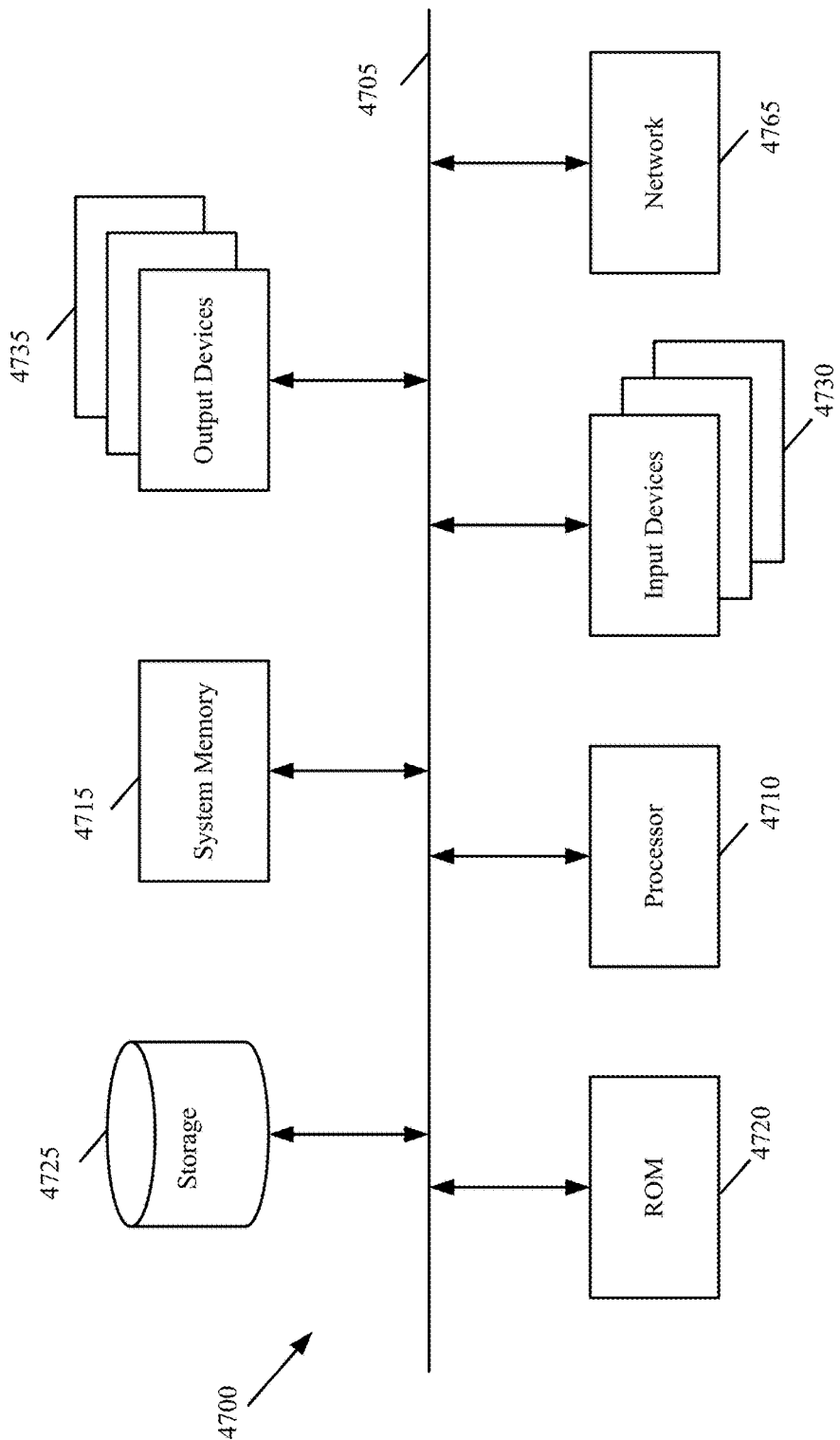
FIG. 47 illustrates a computer system with which some embodiments are implemented.

FIG. 47 illustrates a computer system with which some embodiments are implemented. Such a computer system includes various types of computer-readable mediums and interfaces for various other types of computer-readable mediums that implement the various processes, modules, viewers, and engines described above (e.g., KEI of Section I). Computer system 4700 includes a bus 4705, a processor 4710, a system memory 4715, a read-only memory 4720, a permanent storage device 4725, input devices 4730, and output devices 4735.

The bus 4705 collectively represents all system, peripheral, and chipset buses that communicatively connect the numerous internal devices of the computer system 4700. For instance, the bus 4705 communicatively connects the processor 4710 with the read-only memory 4720, the system memory 4715, and the permanent storage device 4725. From these various memory units, the processor 4710 retrieves instructions to execute and data to process in order to execute the processes of the invention. The processor 4710 is a processing device such as a central processing unit, integrated circuit, graphical processing unit, etc.

The read-only-memory (ROM) 4720 stores static data and instructions that are needed by the processor 4710 and other modules of the computer system. The permanent storage device 4725, on the other hand, is a read-and-write memory device. This device is a non-volatile memory unit that stores instructions and data even when the computer system 4700 is off. Some embodiments of the invention use a mass-storage device (such as a magnetic or optical disk and its corresponding disk drive) as the permanent storage device 4725.

Other embodiments use a removable storage device (such as a flash drive) as the permanent storage device. Like the permanent storage device 4725, the system memory 4715 is a read-and-write memory device. However, unlike the storage device 4725, the system memory is a volatile read-and-write memory, such as random access memory (RAM). The system memory stores some of the instructions and data that the processor needs at runtime. In some embodiments, the processes are stored in the system memory 4715, the permanent storage device 4725, and/or the read-only memory 4720.

The bus 4705 also connects to the input and output devices 4730 and 4735. The input devices enable the user to communicate information and select commands to the computer system. The input devices 4730 include any of a capacitive touchscreen, resistive touchscreen, any other touchscreen technology, a trackpad that is part of the computing system 4700 or attached as a peripheral, a set of touch sensitive buttons or touch sensitive keys that are used to provide inputs to the computing system 4700, or any other touch sensing hardware that detects multiple touches and that is coupled to the computing system 4700 or is attached as a peripheral. The input devices 4730 also include alphanumeric keypads (including physical keyboards and touchscreen keyboards), pointing devices (also called "cursor control devices"). The input devices 4730 also include audio input devices (e.g., microphones, MIDI musical instruments, etc.). The output devices 4735 display images generated by the computer system. For instance, these devices display the KEI. The output devices include printers and display devices, such as cathode ray tubes (CRT) or liquid crystal displays (LCD).

Finally, as shown in FIG. 47, bus 4705 also couples computer 4700 to a network 4765 through a network adapter (not shown). In this manner, the computer can be a part of a network of computers (such as a local area network ("LAN"), a wide area network ("WAN"), or an Intranet, or a network of networks, such as the Internet. For example, the computer 4700 may be coupled to a web server (network 4765) so that a web browser executing on the computer 4700 can interact with the web server as a user interacts with a GUI that operates in the web browser.

As mentioned above, the computer system 4700 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A method of dynamically adjusting pointer size in a graphical user interface (GUI), the method comprising:
    displaying a pointer within the GUI with a first size;
    tracking a distance traversed by each of a plurality of movements of the pointer in any of a plurality of directions during a particular duration, wherein the plurality of movements are in response to user inputs during the particular duration;
    computing a cumulative distance the pointer moves in said GUI during the particular duration based on a sum of the distance traversed by each of the plurality of movements independent of a direction of each movement; and
    displaying the pointer in the GUI with a different second size that is larger than the first size in response to the cumulative distance during the particular duration exceeding a distance threshold.

2. The method of claim 1 further comprising reducing the pointer from the second size to the first size or one or more intermediate sizes between the second size and the first size in response to either a reduction in the cumulative distance of pointer movements or cessation of pointer movement for a subsequent duration.

3. The method of claim 1 further comprising displaying the pointer at the second size for a specified duration in response to the cumulative distance during the particular duration exceeding the first distance threshold and decreasing the pointer size from the second size or one or more intermediate sizes between the second size and the first size after said specified duration.

4. The method of claim 1, wherein displaying the pointer in the GUI with the different second size comprises changing an onscreen representation of the pointer for greater visibility.

5. A method for improving pointer visibility in a graphical user interface (GUI), the method comprising:
    tracking a cumulative distance traversed without regard to direction by a first set of movements of the GUI pointer during a first duration;
    scaling the GUI pointer from a default size to an increased size in response to the cumulative distance satisfying a movement threshold and the first set of movements comprising random directional movements of the GUI pointer, wherein the GUI pointer at the increased size occupies additional GUI pixels relative to the GUI pointer at the default size;
    displaying the GUI pointer within the GUI at the increased size for a second duration; and
    scaling the GUI pointer from the increased size to the default size after the second duration.

6. The method of claim 5, wherein the second duration is a predefined amount of time for displaying the GUI pointer at the increased size.

7. The method of claim 5, wherein scaling the GUI pointer from the increased size to the default size comprises decreasing the GUI pointer size in response to a second set of movements occurring during the second duration not satisfying the movement threshold.

8. A system comprising:
    a display;
    a touch sensitive mechanical keyboard comprising a plurality of physical keys, each physical key of the plurality of physical keys comprising (i) a switch generating a first output in response to a downward movement of the physical key based on a physical press of the physical key or an upward movement of the physical key based on a release of the physical press of the physical key and (ii) a touch sensor generating a second output in response to sensing a user touch over the physical key; and
    a processor performing a first set of operations in response to the first output generated based on the press or the release of one or more of the plurality of physical keys, and performing a different second set of operations involving performing at least one of pointer movements, scrolling, touch gestures, and user interface (UI) element adjustment in response to the second output generated based on sensing the user touch over one or more of the plurality of physical keys.

9. The system of claim 8, wherein performing the second set of operations comprises moving the pointer within the display in relation to second output produced from sensing a user touch traversing one or more adjacent physical keys from the plurality of physical keys.

10. The system of claim 8, wherein performing the second set of operations comprises scrolling within the display.

11. The system of claim 10, wherein said scrolling is performed in relation to second output produced from sensing at least one distinct user touch traversing one or more physical keys from the plurality of physical keys.

12. The system of claim 8, wherein performing the second set of operations comprises adjusting a value of a UI element after first output produced from pressing and holding of a first physical key of the plurality of physical keys followed by second output produced from sensing a directional movement of a user touch over a second physical key of the plurality of physical keys.

13. The system of claim 8, wherein performing the second set of operations comprises increasing a value of a particular UI element in response to the second output produced from sensing a movement of a user touch in a first direction over a particular physical key of the plurality of physical keys and decreasing the particular UI element value in response to the second output produced from sensing a movement of a user touch in a second direction over the particular physical key that is opposite to the first direction.

14. The system of claim 8, wherein the display presents a graphical keyboard comprising a plurality of graphical keys corresponding to the plurality of physical keys of the touch sensitive mechanical keyboard, and wherein performing the second set of operations further comprises presenting a set of graphical indicators over a set of the plurality of graphical keys of the graphical keyboard in response to the second output produced from sensing user touches on a corresponding set of the plurality of physical keys of the touch sensitive mechanical keyboard.

15. The system of claim 14, wherein the performing the second set of operations further comprises modifying positions of the set of graphical indicators over the set of graphical keys to move in conjunction with sensing changes to user touches over the set of physical keys.

16. The system of claim 8, wherein the touch sensor of each particular physical key of the plurality of physical keys generates different second outputs in response to sensing touch at different locations of the particular physical key.

17. The system of claim 16, wherein the touch sensor of a particular physical key generates a second output identifying a directional motion for a touch moving from a first location of the particular physical key to a second location of the particular physical key or an adjacent physical key.

18. The system of claim 8, wherein performing the second set of operations comprises performing a two finger touch gesture in response to simultaneous second output from a first physical key and second output from a second physical key.

19. The system of claim 8, wherein performing the second set of operations further comprises controlling a first UI element in response to second output generated by the touch sensor of a first physical key from the plurality of physical keys and controlling a different second UI element in response to second output generated by the touch sensor of a different second physical key from the plurality of physical keys.

* * * * *